US011615923B2

(12) United States Patent
Macaluso

(10) Patent No.: US 11,615,923 B2
(45) Date of Patent: *Mar. 28, 2023

(54) METHODS, SYSTEMS AND APPARATUS FOR POWERING A VEHICLE

(71) Applicant: Anthony Macaluso, San Diego, CA (US)

(72) Inventor: Anthony Macaluso, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/332,824

(22) Filed: May 27, 2021

(65) Prior Publication Data
US 2021/0313121 A1 Oct. 7, 2021

Related U.S. Application Data

(63) Continuation-in-part of application No. 17/141,518, filed on Jan. 5, 2021, now Pat. No. 11,133,729, which
(Continued)

(51) Int. Cl.
B60L 50/40 (2019.01)
H01G 11/08 (2013.01)
(Continued)

(52) U.S. Cl.
CPC ............ H01G 11/08 (2013.01); B60K 1/04 (2013.01); B60K 6/28 (2013.01); B60L 50/40 (2019.02);
(Continued)

(58) Field of Classification Search
CPC .......... B60L 50/40; B60L 53/00; B60L 53/14; B60L 53/24; B60K 1/04; B60K 6/28;
(Continued)

(56) References Cited

U.S. PATENT DOCUMENTS 2,451,965 A 10/1948 Longenecker
2,660,443 A 11/1953 Miller
(Continued)

FOREIGN PATENT DOCUMENTS

CH 00372/21 4/2021
CN 107804326 1/2020
(Continued)

OTHER PUBLICATIONS

International Search Report and Written Opinion dated Nov. 5, 2020 in application No. PCT/US2020/036172.
(Continued)

Primary Examiner — Richard Isla
Assistant Examiner — Johali A Torres Ruiz
(74) Attorney, Agent, or Firm — Knobbe, Martens, Olson & Bear, LLP

(57) ABSTRACT

This application is directed to an apparatus for providing electrical charge to a vehicle. The apparatus comprises a driven mass configured to rotate in response to a kinetic energy of the vehicle, the driven mass coupled to a shaft, where rotation of the driven mass causes the shaft to rotate. The apparatus further comprises a hardware controller. The hardware controller identifies output power parameters for the vehicle and generate a control signal based on the identified output power parameters for the vehicle. The apparatus also comprises a generator that generates an electrical output based on a mechanical input and a conditioning circuit electrically coupled to the generator. The conditioning circuit receives the electrical output from the generator and the control signal from the hardware controller, generates a charge output based on the electrical output and the control signal, and conveys the charge output to the vehicle.

20 Claims, 55 Drawing Sheets

Related U.S. Application Data is a continuation-in-part of application No. 16/847,538, filed on Apr. 13, 2020.

(60) Provisional application No. 62/858,902, filed on Jun. 7, 2019, provisional application No. 62/883,523, filed on Aug. 6, 2019, provisional application No. 62/967,406, filed on Jan. 29, 2020, provisional application No. 63/164,474, filed on Mar. 22, 2021, provisional application No. 63/140,805, filed on Jan. 23, 2021.

(51) Int. Cl.
*B60K 1/04* (2019.01)
*B60L 53/24* (2019.01)
*B60L 53/14* (2019.01)
*B60L 53/00* (2019.01)
*B60K 6/28* (2007.10)

(52) U.S. Cl.
CPC .............. *B60L 53/00* (2019.02); *B60L 53/14* (2019.02); *B60L 53/24* (2019.02); *H02J 2207/50* (2020.01); *Y02T 10/92* (2013.01)

(58) Field of Classification Search
CPC ...... H01G 11/08; H02J 2207/50; Y02T 10/70; Y02T 10/92; Y02T 10/7072; Y02T 90/14; B60Y 2400/114
See application file for complete search history.

(56) References Cited

U.S. PATENT DOCUMENTS

| | | | |
|---|---|---|---|
| 3,859,589 A | 1/1975 | Rush | |
| 3,891,044 A | 6/1975 | Tiede | |
| 3,943,370 A | 3/1976 | Watanabe | |
| 3,961,678 A | 6/1976 | Hirano et al. | |
| 3,978,936 A | 9/1976 | Schwartz | |
| 4,214,160 A | 7/1980 | Fies et al. | |
| 4,314,160 A | 2/1982 | Boodman et al. | |
| 4,364,448 A | 12/1982 | Ikuma | |
| 4,476,947 A | 10/1984 | Rynbrandt | |
| 4,579,188 A | 4/1986 | Facer | |
| 5,045,646 A | 9/1991 | Musachio | |
| 5,078,227 A | 1/1992 | Becker | |
| 5,086,857 A | 2/1992 | Dale | |
| 5,105,776 A * | 4/1992 | Tsuchiya | H02J 7/14 |
| | | | 123/192.1 |
| 5,316,101 A | 5/1994 | Gannon | |
| 5,412,293 A | 5/1995 | Minezawa et al. | |
| 5,491,390 A | 2/1996 | McGreen | |
| 5,671,821 A | 9/1997 | McGreen | |
| 5,680,907 A | 10/1997 | Weihe | |
| 5,735,363 A | 4/1998 | Horovitz et al. | |
| 5,767,663 A | 6/1998 | Lu | |
| 5,921,334 A | 7/1999 | Al-Dokhi | |
| 5,992,553 A | 11/1999 | Morrison | |
| 6,065,557 A | 5/2000 | von Keyserling | |
| 6,220,381 B1 | 4/2001 | Damron et al. | |
| 6,390,215 B1 | 5/2002 | Kodama | |
| 6,502,842 B2 | 1/2003 | Ko | |
| 6,531,838 B2 | 3/2003 | Parks | |
| 6,703,716 B2 | 3/2004 | Chiu | |
| 6,717,280 B1 | 4/2004 | Bienville | |
| 6,987,327 B1 | 1/2006 | Lucatero | |
| 7,183,746 B1 | 2/2007 | Carter | |
| 7,279,799 B1 | 10/2007 | McCauley | |
| 7,514,803 B2 | 4/2009 | Wilks | |
| 7,547,980 B2 | 6/2009 | Harrison | |
| 7,753,010 B2 | 7/2010 | Rutledge | |
| 7,913,783 B2 | 3/2011 | Elmaleh | |
| 8,063,609 B2 | 11/2011 | Salasoo et al. | |
| 8,206,263 B2 | 6/2012 | Tsuchikawa | |
| 8,347,999 B2 | 1/2013 | Koelsch et al. | |
| 8,573,346 B2 | 11/2013 | Duignan | |
| 8,643,201 B2 | 2/2014 | Scott | |
| 8,712,620 B2 | 4/2014 | Jackson | |
| 8,723,344 B1 * | 5/2014 | Dierickx | F03G 7/08 |
| | | | 290/1 R |
| 8,872,368 B1 | 10/2014 | Kim et al. | |
| 8,907,631 B1 | 12/2014 | Gurries | |
| 9,236,761 B2 | 1/2016 | Strothmann | |
| 9,242,698 B2 | 1/2016 | Frieden | |
| 9,321,357 B2 | 4/2016 | Caldeira et al. | |
| 9,376,971 B2 | 6/2016 | Luther et al. | |
| 9,415,660 B2 | 8/2016 | Koelsch | |
| 9,457,666 B2 | 10/2016 | Caldeira et al. | |
| 9,981,553 B2 | 5/2018 | Schafer et al. | |
| 10,077,056 B1 | 9/2018 | Fields et al. | |
| 10,293,702 B2 | 5/2019 | Tu et al. | |
| 10,513,180 B2 | 12/2019 | Quill | |
| 10,787,089 B1 | 9/2020 | Macaluso | |
| 10,797,564 B1 | 10/2020 | Griggs | |
| 10,889,186 B2 | 1/2021 | Schutt | |
| 10,903,679 B2 | 1/2021 | Schmalzrieth et al. | |
| 11,007,878 B2 | 5/2021 | Kamino et al. | |
| 11,072,254 B1 | 7/2021 | Macaluso | |
| 11,117,481 B2 | 9/2021 | Macaluso | |
| 11,130,415 B2 | 9/2021 | Macaluso | |
| 11,133,729 B2 | 9/2021 | Macaluso | |
| 11,222,750 B1 | 1/2022 | Macaluso | |
| 11,289,974 B2 | 3/2022 | Macaluso | |
| 11,299,054 B2 | 4/2022 | Macaluso | |
| 11,318,856 B2 | 5/2022 | Macaluso | |
| 11,322,311 B2 | 5/2022 | Macaluso | |
| 11,472,306 B1 | 10/2022 | Macaluso | |
| 2003/0071464 A1 | 4/2003 | Chiu | |
| 2003/0139859 A1 | 7/2003 | Hanada | |
| 2003/0184258 A1 * | 10/2003 | VonderHaar | H02J 7/342 |
| | | | 320/103 |
| 2004/0012205 A1 | 1/2004 | Sua-An | |
| 2005/0224263 A1 | 10/2005 | Vasilantone | |
| 2006/0238258 A1 | 10/2006 | D'Amore | |
| 2007/0075677 A1 | 4/2007 | Alvarez-Troncoso | |
| 2007/0090702 A1 | 4/2007 | Schiller | |
| 2007/0187957 A1 * | 8/2007 | Harrison | F03G 7/08 |
| | | | 290/1 R |
| 2008/0066979 A1 | 3/2008 | Carter | |
| 2008/0223637 A1 | 9/2008 | Bartilson | |
| 2008/0289890 A1 | 11/2008 | Stoltzfus | |
| 2008/0297109 A1 | 12/2008 | Sandberg et al. | |
| 2009/0033254 A1 | 2/2009 | Nagashima et al. | |
| 2009/0079417 A1 | 3/2009 | Mort et al. | |
| 2009/0145674 A1 | 6/2009 | Lee | |
| 2009/0230766 A1 | 9/2009 | Miyama | |
| 2010/0019718 A1 | 1/2010 | Salasoo et al. | |
| 2010/0117600 A1 * | 5/2010 | Fazakas | H02J 7/345 |
| | | | 320/128 |
| 2010/0327600 A1 | 12/2010 | Koelsch | |
| 2011/0106329 A1 | 5/2011 | Donnelly et al. | |
| 2011/0163717 A1 * | 7/2011 | Gale | B60L 53/14 |
| | | | 320/109 |
| 2011/0189507 A1 | 8/2011 | Reis | |
| 2011/0200193 A1 | 8/2011 | Blitz et al. | |
| 2011/0320074 A1 | 12/2011 | Erlston et al. | |
| 2012/0012406 A1 | 1/2012 | Stoicoviciu | |
| 2012/0237799 A1 * | 9/2012 | Jiang | B60L 50/64 |
| | | | 429/7 |
| 2012/0309455 A1 | 12/2012 | Klose et al. | |
| 2013/0081886 A1 | 4/2013 | Jaberian | |
| 2013/0096759 A1 | 4/2013 | Breton et al. | |
| 2013/0119665 A1 | 5/2013 | Berbari | |
| 2013/0257145 A1 | 10/2013 | Caldeira et al. | |
| 2013/0266826 A1 | 10/2013 | Cowperthwaite | |
| 2013/0332014 A1 * | 12/2013 | Jackson | B60L 50/51 |
| | | | 701/22 |
| 2014/0091573 A1 | 4/2014 | Berbari | |
| 2014/0132155 A1 | 5/2014 | Strothmann | |
| 2014/0197780 A1 * | 7/2014 | Imamura | H02J 7/0049 |
| | | | 320/107 |
| 2014/0210398 A1 * | 7/2014 | Powell | B60L 53/20 |
| | | | 320/104 |

(56) References Cited

U.S. PATENT DOCUMENTS

| | | |
|---|---|---|
| 2014/0244082 A1* | 8/2014 | Caron .................. B60K 23/08 |
| | | 290/40 R |
| 2014/0266004 A1 | 9/2014 | Andrews, Jr. |
| 2014/0266070 A1 | 9/2014 | Kurtzman |
| 2014/0285209 A1 | 9/2014 | Stichowski et al. |
| 2014/0368041 A1 | 12/2014 | Tu et al. |
| 2015/0008867 A1 | 1/2015 | Smychkovich |
| 2015/0089981 A1* | 4/2015 | Renfro .................. E05B 73/00 |
| | | 70/164 |
| 2015/0197780 A1 | 7/2015 | Xu |
| 2015/0249362 A1 | 9/2015 | Bridgelall et al. |
| 2015/0260835 A1 | 9/2015 | Widmer et al. |
| 2015/0343909 A1* | 12/2015 | Hikiri .................. B60W 20/13 |
| | | 318/139 |
| 2016/0089981 A1 | 3/2016 | Kodawara |
| 2016/0111907 A1 | 4/2016 | Lynds |
| 2016/0164373 A1 | 6/2016 | Liao et al. |
| 2016/0236578 A1 | 8/2016 | Liao |
| 2016/0243960 A1 | 8/2016 | Wood |
| 2016/0348788 A1 | 12/2016 | Lemmers |
| 2017/0063124 A1 | 3/2017 | Yu et al. |
| 2017/0117720 A1* | 4/2017 | Yung .................. H02J 7/342 |
| 2017/0131999 A1 | 5/2017 | Dolby et al. |
| 2017/0176540 A1 | 6/2017 | Omi |
| 2017/0191459 A1 | 7/2017 | Zhang |
| 2017/0366017 A1 | 12/2017 | Clay et al. |
| 2018/0009329 A1 | 1/2018 | Tellez |
| 2018/0083469 A1 | 3/2018 | Bauer et al. |
| 2018/0154779 A1 | 6/2018 | Choi |
| 2018/0156144 A1 | 6/2018 | Inoue |
| 2018/0166750 A1 | 6/2018 | Chang |
| 2018/0215272 A1 | 8/2018 | Vitullo et al. |
| 2018/0254732 A1 | 9/2018 | Smolenaers |
| 2018/0312159 A1 | 11/2018 | Jent, II |
| 2019/0001804 A1 | 1/2019 | Wilhide |
| 2019/0004580 A1 | 1/2019 | Wilhide |
| 2019/0077254 A1* | 3/2019 | Stanley, II ............. B60K 16/00 |
| 2019/0140245 A1 | 5/2019 | Mensch |
| 2019/0184843 A1 | 6/2019 | Jung et al. |
| 2019/0245375 A1 | 8/2019 | Schmalzrieth et al. |
| 2019/0329650 A1 | 10/2019 | Quill |
| 2019/0351895 A1 | 11/2019 | Ben-Ari |
| 2019/0351899 A1 | 11/2019 | Adam |
| 2019/0351948 A1 | 11/2019 | Derissaint |
| 2019/0359080 A1 | 11/2019 | Hellgren |
| 2020/0039379 A1 | 2/2020 | Schlosser |
| 2020/0094695 A1 | 3/2020 | Bowman |
| 2020/0207209 A1 | 7/2020 | Engel |
| 2020/0381784 A1 | 12/2020 | Yamamoto |
| 2020/0384873 A1 | 12/2020 | Macaluso |
| 2021/0001737 A1 | 1/2021 | Hoess et al. |
| 2021/0023954 A1 | 1/2021 | Macaluso |
| 2021/0046833 A1 | 2/2021 | Macaluso |
| 2021/0126509 A1 | 4/2021 | Macaluso |
| 2021/0197687 A1 | 7/2021 | Searcy |
| 2021/0206282 A1 | 7/2021 | Macaluso |
| 2021/0206283 A1 | 7/2021 | Macaluso |
| 2021/0229564 A1 | 7/2021 | Macaluso |
| 2022/0016941 A1 | 1/2022 | Sams |
| 2022/0028625 A1 | 1/2022 | Macaluso |
| 2022/0028627 A1 | 1/2022 | Macaluso |
| 2022/0052582 A1 | 2/2022 | Giannotta |
| 2022/0068570 A1 | 3/2022 | Macaluso |
| 2022/0167134 A1 | 5/2022 | Macaluso |
| 2022/0301775 A1 | 9/2022 | Macaluso |
| 2022/0360141 A1 | 11/2022 | Macaluso |

FOREIGN PATENT DOCUMENTS

| | | |
|---|---|---|
| EP | 1 253 698 | 10/2002 |
| WO | WO 09/149769 | 12/2009 |
| WO | WO 10/133863 | 11/2010 |
| WO | WO 20/191367 | 9/2020 |
| WO | WO 2022/219510 | 10/2022 |

OTHER PUBLICATIONS

U.S. Appl. No. 16/847,538, filed Apr. 13, 2020, Methods and Apparatus For Powering a Vehicle.

U.S. Appl. No. 16/861,110 (U.S. Pat. No. 10,787,089), filed Apr. 28, 2020, Methods and Apparatus for Powering a Vehicle.

U.S. Appl. No. 17/035,488, filed Sep. 28, 2020, Methods and Apparatus for Powering a Vehicle.

U.S. Appl. No. 17/084,531, filed Oct. 29, 2020, Methods and Apparatus for Powering a Vehicle.

U.S. Appl. No. 17/208,641, filed Mar. 22, 2021, Methods and Apparatus for Powering a Vehicle.

U.S. Appl. No. 17/208,657, filed Mar. 22, 2021, Methods and Apparatus for Powering a Vehicle.

U.S. Appl. No. 17/208,726, filed Mar. 22, 2021, Methods and Apparatus for Powering a Vehicle.

U.S. Appl. No. 17/208,524, filed Mar. 22, 2021, Methods and Apparatus for Powering a Vehicle.

U.S. Appl. No. 17/141,518, filed Jan. 5, 2021, Methods and Apparatus for Providing Electricity to a Vehicle.

U.S. Appl. No. 17/332,824, filed May 27, 2021, Methods, System and Apparatus for Powering a Vehicle.

International Search Report and Written Opinion dated May 2, 2022 in application No. PCT/US2022/011141.

* cited by examiner

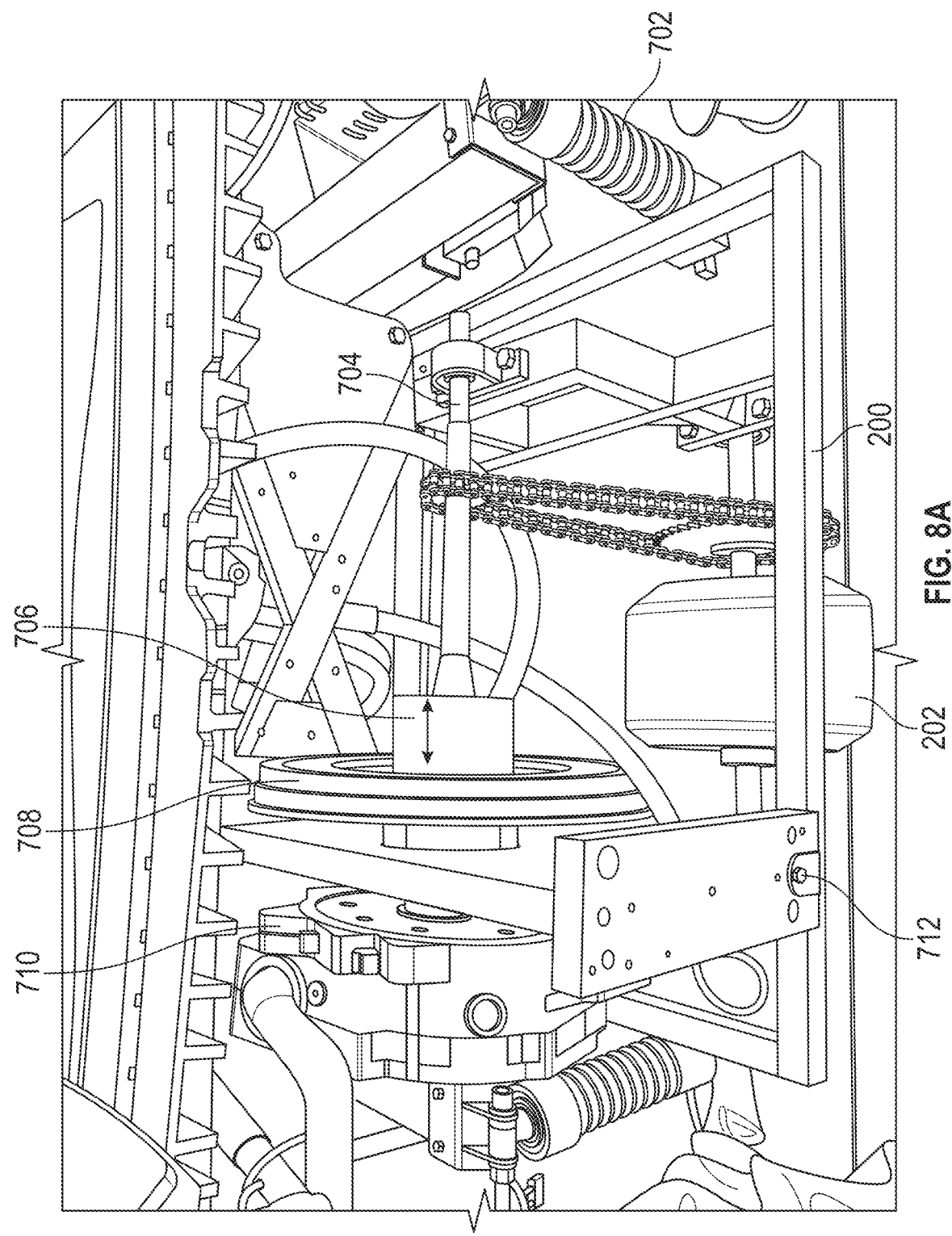

| Name | Value | Unit |
|---|---|---|
| ☐ Electrical machine actual torque ⊙ | -57.4 | Nm |
| ☐ Electrical machine current (feed line, phase w) ⊙ | -5.31 | A |
| ☐ Electrical machine current (feed line, phase u) ⊙ | -143.06 | A |
| ☐ Electrical machine current (feed line, phase v) ⊙ | 148.94 | A |
| ☐ Electrical machine motor speed ⊙ | 5008 | r/min |
| ☐ High voltage system current through electrical ⊙ | -70 | A |
| ☐ Temperature electrical machine ⊙ | 51.05 | °C |
| ☐ Electrical machine voltage after rectification ⊙ | 377.2 | V |

FIG. 10A

| ☐ Electrical machine actual torque ⊙ | -57.4 | Nm |
|---|---|---|
| ☐ Electrical machine current (feed line, phase w) ⊙ | -137.19 | A |
| ☐ Electrical machine current (feed line, phase u) ⊙ | 152.25 | A |
| ☐ Electrical machine current (feed line, phase v) ⊙ | -14.94 | A |
| ☐ Electrical machine motor speed ⊙ | 5025 | r/min |
| ☐ High voltage system current through electrical ⊙ | -70 | A |
| ☐ Temperature electrical machine ⊙ | 51.14 | °C |
| ☐ Electrical machine voltage after rectification ⊙ | 379.17 | V |

FIG. 10B

| | | |
|---|---|---|
| ☐ Electrical machine actual torque ⊙ | -57.4 | Nm |
| ☐ Electrical machine current (feed line, phase w) ⊙ | 80.5 | A |
| ☐ Electrical machine current (feed line, phase u) ⊙ | -160.06 | A |
| ☐ Electrical machine current (feed line, phase v) ⊙ | 80.12 | A |
| ☐ Electrical machine motor speed ⊙ | 5011 | r/min |
| ☐ High voltage system current through electrical ⊙ | -69.6 | A |
| ☐ Temperature electrical machine ⊙ | 51.22 | °C |
| ☐ Electrical machine voltage after rectification ⊙ | 380.17 | V |

FIG. 10C

| | | |
|---|---|---|
| ☐ Electrical machine actual torque ⊙ | -57.6 | Nm |
| ☐ Electrical machine current (feed line, phase w) ⊙ | 170.69 | A |
| ☐ Electrical machine current (feed line, phase u) ⊙ | -131.94 | A |
| ☐ Electrical machine current (feed line, phase v) ⊙ | -38.19 | A |
| ☐ Electrical machine motor speed ⊙ | 4969 | r/min |
| ☐ High voltage system current through electrical ⊙ | -69 | A |
| ☐ Temperature electrical machine ⊙ | 51.31 | °C |
| ☐ Electrical machine voltage after rectification ⊙ | 380.92 | V |

FIG. 10D

| ☐ Electrical machine actual torque ⊙ | -56.8 | Nm |
|---|---|---|
| ☐ Electrical machine current (feed line, phase w) ⊙ | -133.31 | A |
| ☐ Electrical machine current (feed line, phase u) ⊙ | -40.75 | A |
| ☐ Electrical machine current (feed line, phase v) ⊙ | 174.19 | A |
| ☐ Electrical machine motor speed ⊙ | 5121 | r/min |
| ☐ High voltage system current through electrical ⊙ | -69.6 | A |
| ☐ Temperature electrical machine ⊙ | 52.77 | °C |
| ☐ Electrical machine voltage after rectification ⊙ | 382.67 | V |

FIG. 10E

| ☐ Electrical machine actual torque ⊙ | -57 | Nm |
|---|---|---|
| ☐ Electrical machine current (feed line, phase w) ⊙ | 8.75 | A |
| ☐ Electrical machine current (feed line, phase u) ⊙ | 145.44 | A |
| ☐ Electrical machine current (feed line, phase v) ⊙ | -153.62 | A |
| ☐ Electrical machine motor speed ⊙ | 5062 | r/min |
| ☐ High voltage system current through electrical ⊙ | -69.4 | A |
| ☐ Temperature electrical machine ⊙ | 52.86 | °C |
| ☐ Electrical machine voltage after rectification ⊙ | 383.21 | V |

FIG. 10F

| ☐ Electrical machine actual torque ⊙ | -57.6 | Nm |
|---|---|---|
| ☐ Electrical machine current (feed line, phase w) ⊙ | -161.94 | A |
| ☐ Electrical machine current (feed line, phase u) ⊙ | 29.56 | A |
| ☐ Electrical machine current (feed line, phase v) ⊙ | 132 | A |
| ☐ Electrical machine motor speed ⊙ | 4937 | r/min |
| ☐ High voltage system current through electrical ⊙ | -68.8 | A |
| ☐ Temperature electrical machine ⊙ | 53.03 | °C |
| ☐ Electrical machine voltage after rectification ⊙ | 381.92 | V |

FIG. 10G

| ☐ Electrical machine actual torque ⊙ | -57.6 | Nm |
|---|---|---|
| ☐ Electrical machine current (feed line, phase w) ⊙ | -89.69 | A |
| ☐ Electrical machine current (feed line, phase u) ⊙ | 161.44 | A |
| ☐ Electrical machine current (feed line, phase v) ⊙ | -70.69 | A |
| ☐ Electrical machine motor speed ⊙ | 4890 | r/min |
| ☐ High voltage system current through electrical ⊙ | -69.2 | A |
| ☐ Temperature electrical machine ⊙ | 53.55 | °C |
| ☐ Electrical machine voltage after rectification ⊙ | 377.42 | V |

FIG. 10H

| | | |
|---|---|---|
| ☐ Electrical machine actual torque ⊙ | -57.6 | Nm |
| ☐ Electrical machine current (feed line, phase w) ⊙ | 90.69 | A |
| ☐ Electrical machine current (feed line, phase u) ⊙ | 80 | A |
| ☐ Electrical machine current (feed line, phase v) ⊙ | -169.12 | A |
| ☐ Electrical machine motor speed ⊙ | 4971 | r/min |
| ☐ High voltage system current through electrical ⊙ | -69.8 | A |
| ☐ Temperature electrical machine ⊙ | 53.8 | °C |
| ☐ Electrical machine voltage after rectification ⊙ | 378.2 | V |

FIG. 10I

| | | |
|---|---|---|
| ☐ Electrical machine actual torque ⊙ | -57.6 | Nm |
| ☐ Electrical machine current (feed line, phase w) ⊙ | 149.38 | A |
| ☐ Electrical machine current (feed line, phase u) ⊙ | -145.5 | A |
| ☐ Electrical machine current (feed line, phase v) ⊙ | -1.88 | A |
| ☐ Electrical machine motor speed ⊙ | 4987 | r/min |
| ☐ High voltage system current through electrical ⊙ | -70 | A |
| ☐ Temperature electrical machine ⊙ | 53.89 | °C |
| ☐ Electrical machine voltage after rectification ⊙ | 377.1 | V |

FIG. 10J

| | | |
|---|---|---|
| ☐ Electrical machine actual torque ⊚ | -57.6 | Nm |
| ☐ Electrical machine current (feed line, phase w) ⊚ | -174.06 | A |
| ☐ Electrical machine current (feed line, phase u) ⊚ | 111 | A |
| ☐ Electrical machine current (feed line, phase v) ⊚ | 63.12 | A |
| ☐ Electrical machine motor speed ⊚ | 4996 | r/min |
| ☐ High voltage system current through electrical ⊚ | -69.6 | A |
| ☐ Temperature electrical machine ⊚ | 54.06 | °C |
| ☐ Electrical machine voltage after rectification ⊚ | 378.51 | V |

FIG. 10K

| | | |
|---|---|---|
| ☐ Electrical machine actual torque ⊚ | -57.6 | Nm |
| ☐ Electrical machine current (feed line, phase w) ⊚ | 62.12 | A |
| ☐ Electrical machine current (feed line, phase u) ⊚ | -169.25 | A |
| ☐ Electrical machine current (feed line, phase v) ⊚ | 108.25 | A |
| ☐ Electrical machine motor speed ⊚ | 4954 | r/min |
| ☐ High voltage system current through electrical ⊚ | -69.6 | A |
| ☐ Temperature electrical machine ⊚ | 54.41 | °C |
| ☐ Electrical machine voltage after rectification ⊚ | 378.86 | V |

FIG. 10L

| | | |
|---|---|---|
| ☐ Electrical machine actual torque ⊽ | -9.2 | Nm |
| ☐ Electrical machine current (feed line, phase w) ⊽ | 113.06 | A |
| ☐ Electrical machine current (feed line, phase u) ⊽ | -147 | A |
| ☐ Electrical machine current (feed line, phase v) ⊽ | 34.5 | A |
| ☐ Electrical machine motor speed ⊽ | 5587 | r/min |
| ☐ High voltage system current through electrical ⊽ | -0.2 | A |
| ☐ Temperature electrical machine ⊽ | 55.27 | °C |
| ☐ Electrical machine voltage after rectification ⊽ | 377.32 | V |

FIG. 10M

| | | |
|---|---|---|
| ☐ Electrical machine actual torque ⊽ | -9.2 | Nm |
| ☐ Electrical machine current (feed line, phase w) ⊽ | 84.94 | A |
| ☐ Electrical machine current (feed line, phase u) ⊽ | -74.75 | A |
| ☐ Electrical machine current (feed line, phase v) ⊽ | -9.62 | A |
| ☐ Electrical machine motor speed ⊽ | 5600 | r/min |
| ☐ High voltage system current through electrical ⊽ | -28.4 | A |
| ☐ Temperature electrical machine ⊽ | 55.69 | °C |
| ☐ Electrical machine voltage after rectification ⊽ | 378.07 | V |

FIG. 10N

| | | |
|---|---|---|
| ☐ Electrical machine actual torque ⊙ | -56.6 | Nm |
| ☐ Electrical machine current (feed line, phase w) ⊙ | -74.19 | A |
| ☐ Electrical machine current (feed line, phase u) ⊙ | -88.31 | A |
| ☐ Electrical machine current (feed line, phase v) ⊙ | 163 | A |
| ☐ Electrical machine motor speed ⊙ | 5153 | r/min |
| ☐ High voltage system current through electrical ⊙ | -70.8 | A |
| ☐ Temperature electrical machine ⊙ | 56.5 | °C |
| ☐ Electrical machine voltage after rectification ⊙ | 376.88 | V |

FIG. 10O

| | | |
|---|---|---|
| ☐ Electrical machine actual torque ⊙ | -56.6 | Nm |
| ☐ Electrical machine current (feed line, phase w) ⊙ | 37.38 | A |
| ☐ Electrical machine current (feed line, phase u) ⊙ | -164.44 | A |
| ☐ Electrical machine current (feed line, phase v) ⊙ | 128.12 | A |
| ☐ Electrical machine motor speed ⊙ | 5137 | r/min |
| ☐ High voltage system current through electrical ⊙ | -70.8 | A |
| ☐ Temperature electrical machine ⊙ | 56.59 | °C |
| ☐ Electrical machine voltage after rectification ⊙ | 378.29 | V |

FIG. 10P

| | | Ultracapacitor Voltage (voltage generated) | Battery Field Voltage (voltage used) | |
|---|---|---|---|---|
| Start 0 | | 352.4 | 351.2 | |
| Mile 1 | | 345.3 | 346.0 | |
| Mile 2 | Front Side of T | 345.4 | 346.61 | |
| Mile 3 | | 345.4 | 347.96 | |
| Mile 4 | | 345.4 | 347.7 | |
| Mile 5 | | 345.4 | 347.0 | |
| Mile 6.3 | Gate | 345.5 | 348.54 | |
| Mile 6.6 | | 345.5 | 349.02 | -2 |
| Mile 8 | | | | |
| Finish | | | | |
| Finished Voltage Minus Starting Voltage | | | | |

(annotations at left: 43mph, 44mph)

FIG. 30

METHODS, SYSTEMS AND APPARATUS FOR POWERING A VEHICLE

CROSS REFERENCE TO RELATED APPLICATIONS

This application claims benefit of priority to U.S. Provisional Patent Application No. 63/164,474, filed Mar. 22, 2021. This application claims benefit of priority to U.S. Provisional Patent Application No. 63/140,805, filed Jan. 23, 2021. This application is a continuation-in-part of U.S. patent application Ser. No. 17/141,518, filed Jan. 5, 2021, which is a continuation-in-part of U.S. patent application Ser. No. 16/847,538, filed Apr. 13, 2020, which claims benefit of priority and is related to U.S. Provisional Patent Application No. 62/858,902, filed Jun. 7, 2019, U.S. Provisional Patent Application No. 62/883,523, filed Aug. 6, 2019, and U.S. Provisional Patent Application No. 62/967,406, filed Jan. 29, 2020. This application is also filed concurrently with a U.S. nonprovisional application entitled "HYPERCAPACITOR." The disclosure of each of the aforementioned applications is incorporated herein in its entirety for all purposes.

BACKGROUND

Field of the Disclosure

The present disclosure relates generally to providing energy for a vehicle powered, at least in part, by electricity, and more specifically, to generating and conveying or storing the electricity for consumption by electric motors to drive or power the vehicle or a portion thereof while the vehicle is mobile.

Description of the Related Art

Electric vehicles derive locomotion power from electricity often received from an energy storage device within the electric vehicle. The energy storage device could be a battery, a battery array, or an energy storage and/or containment device. Hybrid electric vehicles include regenerative charging that capture energy from vehicle braking and traditional motors to charge the energy storage device and provide electricity to the vehicle. Battery electric vehicles (BEVs) are often proposed to have an energy storage/containment device (for example, a battery or battery array or capacitor array) that is charged through some type of wired or wireless connection at one or more stationary locations, for example household or commercial supply sources. The wired charging connections require cables or other similar connectors physically connected to a stationary power supply. The wireless charging connections require antenna(s) or other similar structures wirelessly connected to a power supply that generates a wireless field via its own antenna(s). However, such wired and wireless stationary charging systems may be inconvenient or cumbersome and have other drawbacks, such as degradation during energy transference, inefficiencies or losses, requiring a specific location for charging, and so forth. As such, alternatives for stationary wired or wireless charging systems and methods that efficiently and safely transfer energy for charging electric vehicles are desirable.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

Existing energy storage devices, such as batteries and capacitors, can be useful for storing energy but may have many undesirable limitations. For example, batteries such as lithium ion batteries are resilient to self-discharge but often require long charge times (e.g., 12-14 hours). In contrast, capacitors, such as ultracapacitors and supercapacitors are capable of being charged quickly (i.e., faster than batteries) but may be much less resilient to self-discharge than batteries. For example, ultracapacitors/supercapacitors may lose as much as 10-20% of their charge per day due to self-discharge. Additionally, although ultracapacitors/supercapacitors may be capable of withstanding more charge-discharge cycles than batteries without losing operational functionality, ultracapacitors/supercapacitors may not be capable of storing as much energy per weight as batteries.

In addition, batteries, such as lithium ion batteries present many environmental problems. For example, mining and disposing of lithium are both environmentally destructive. Furthermore, lithium ion batteries are capable of catching fire and burning at high temperatures for long amounts of time, which is also environmentally destructive and hazardous to human health.

The present disclosure provides for a hypercapacitor energy storage system or hypercapacitor that can integrate or marry ultracapacitors/supercapacitors and storage devices (e.g., capacitors, batteries) in a single assembly (e.g., as a single integrated unit or package) to provide synergistic results, or results that are not achievable, or are substantially reduced, when provided or used separately. For example, the hypercapacitor can be charged much faster than a standalone battery, the hypercapacitor is capable of retaining energy for a long storage life without losing energy due to self-discharge, the hypercapacitor may be capable of storing much more energy per weight than standalone storage devices (e.g., batteries, standard capacitors), and the hypercapacitor can draw down voltage storage levels down to 0 volts without risking device performance failure such as is common for example with standard lithium ion batteries which cannot draw voltage below a low threshold capacity.

Thus, the hypercapacitor, described herein, provides for a superior energy storage device over standard energy storage devices in widespread use today. Furthermore, the hypercapacitor may replace standard energy storage devices in any device or system that uses them. For example, the hypercapacitor may replace standard energy storage devices and/or may be used in electric vehicles for transportation, electric vehicles or electric equipment for construction or farming, power tools, building energy/power systems, manufacturing energy/power systems, games, drones, robots, toys, computers, electronics and the like.

The present disclosure provides a system for providing power to a vehicle. The system may comprise: a driven mass configured to rotate in response to a kinetic energy of the vehicle, the driven mass coupled to a shaft such that rotation of the driven mass causes the shaft to rotate; a generator configured to generate an electrical output at a generator output terminal based on a mechanical input, the mechanical input mechanically coupled to the shaft such that rotation of the shaft causes the mechanical input to rotate; and a hypercapacitor. The hypercapacitor may comprise: at least one ultracapacitor electrically coupled to the generator output terminal via one or more inbound diodes, wherein the one or more inbound diodes are biased toward the at least one ultracapacitor. The at least one ultracapacitor may be configured to: receive, via the one or more inbound diodes, inbound energy from the generator; and store the inbound energy as a first energy in an electric field of the at least one ultracapacitor. The hypercapacitor may further comprise an energy retainer electrically coupled to the at least one ultracapacitor via one or more outbound diodes, wherein the one or more outbound diodes are biased toward the energy retainer and wherein the energy retainer may be configured to: receive, via the one or more outbound diodes, outbound energy from the at least one ultracapacitor in response to a voltage level of the energy retainer dropping below a threshold value; store said outbound energy as a second energy of the energy retainer; and convey the second energy to a traction motor of the vehicle.

In some embodiments, the hypercapacitor may be further configured to be electrically couplable to a utility grid via a standard 110 volt or 220 volt outlet, and the at least one ultracapacitor of the hypercapacitor may be further configured to: be electrically couplable to the standard 110 volt or 220 volt outlet of the utility grid; receive, via the one or more inbound diodes, inbound energy from the standard 110 volt or 220 volt outlet; and store the inbound energy as a first energy in an electric field of at least one ultracapacitor; and the energy retainer may be further configured to not receive outbound energy from the at least one ultracapacitor in response to a voltage level of the energy retainer reaching a high threshold voltage value.

In some embodiments, the at least one ultracapacitor may comprise multiple ultracapacitors.

In some embodiments, the energy retainer may comprise one or more batteries.

In some embodiments, the energy retainer may comprise one or more capacitors.

In some embodiments, the energy retainer may not comprise lithium ion batteries.

In some embodiments, the electrical coupling between the energy retainer and the at least one ultracapacitor may stabilize the voltage of the at least one ultracapacitor to prevent voltage loss of the first energy of the at least one ultracapacitor due to self-discharge.

In some embodiments, the energy retainer may be further configured to convey all of the second energy to the traction motor of the vehicle.

In some embodiments, the vehicle may comprise a commercial vehicle.

In some embodiments, the vehicle may comprise farm or construction equipment.

The present disclosure provides a system for providing power to a vehicle. The system may comprise: a driven mass configured to rotate in response to a kinetic energy of the vehicle, the driven mass coupled to a shaft such that rotation of the driven mass causes the shaft to rotate; a generator configured to generate an electrical output at a generator output terminal based on a mechanical input, the mechanical input mechanically coupled to the shaft such that rotation of the shaft causes the mechanical input to rotate; and a hypercapacitor. The hypercapacitor may comprise: at least one ultracapacitor electrically coupled to the generator output terminal, wherein the at least one ultracapacitor may be configured to: receive inbound energy from the generator; and store the inbound energy as a first energy in an electric field of the at least one ultracapacitor. The hypercapacitor may further comprise an energy retainer electrically coupled to the at least one ultracapacitor wherein the energy retainer and the at least one ultracapacitor may comprise a single integrated unit and wherein the energy retainer may be configured to: receive outbound energy from the at least one ultracapacitor to stabilize the voltage of the at least one ultracapacitor to prevent voltage loss of the first energy of the at least one ultracapacitor due to self-discharge; store said outbound energy as a second energy of the energy retainer; and convey the second energy to a traction motor of the vehicle.

In some embodiments, the hypercapacitor may be further configured to: be electrically couplable to a utility grid via a standard 110 volt or 220 volt outlet, and receive, at the at least one ultracapacitor, inbound energy from the standard 110 volt or 220 volt outlet; and store the inbound energy as a first energy in an electric field of the at least one ultracapacitor; and wherein the energy retainer may be further configured to: receive outbound energy from the at least one ultracapacitor in response to a voltage level of the energy retainer dropping below a low threshold value; and not receive outbound energy from the at least one ultracapacitor in response to a voltage level of the energy retainer reaching a high threshold voltage value.

In some embodiments, the at least one ultracapacitor may be further configured to increase the first energy by 400 volts in less than 15 minutes. In some embodiments, the at least one ultracapacitor may be further configured to increase the first energy by 400 volts in approximately 4 to 8 minutes.

In some embodiments, the at least one ultracapacitor may comprise multiple ultracapacitors and wherein the energy retainer comprises one or more capacitors.

In some embodiments, the energy retainer may be further configured to convey all of the second energy to the traction motor of the vehicle.

The present disclosure provides a system for providing power to a vehicle. The system may comprise: a driven mass configured to rotate in response to a kinetic energy of the vehicle, the driven mass coupled to a shaft such that rotation of the driven mass causes the shaft to rotate; a generator configured to generate an electrical output at a generator output terminal based on a mechanical input, the mechanical input mechanically coupled to the shaft such that rotation of the shaft causes the mechanical input to rotate; and a hypercapacitor. The hypercapacitor may comprise: an ultracapacitor module electrically coupled to the generator output terminal and wherein the ultracapacitor module may comprise a first plurality of ultracapacitors and a second plurality of ultracapacitors, and wherein the ultracapacitor module may be configured to: receive, at the first or second plurality of ultracapacitors, inbound energy from the energy source, and store, at the first or second plurality of ultracapacitors, the inbound energy as a first energy as an electric field of the ultracapacitor module. The hypercapacitor may further comprise an energy retainer electrically coupled to the ultracapacitor module and wherein the energy retainer may be configured to: receive outbound energy conveyed from the first or second plurality of ultracapacitors in response to a voltage level of the energy retainer dropping below a low threshold value; store said outbound energy as a second energy of the energy retainer; and convey the second energy to a traction motor of the vehicle.

In some embodiments, the first plurality of ultracapacitors may receive the inbound energy while the second plurality of ultracapacitors may convey the first energy to the energy retainer or wherein the second plurality of ultracapacitors may receive the inbound energy while the first plurality of ultracapacitors may convey the first energy to the energy retainer.

In some embodiments, the first plurality of ultracapacitors may alternate between receiving the inbound energy and conveying the first energy to the energy retainer, and wherein the second plurality of ultracapacitors may alternate between receiving the inbound energy and conveying the first energy to the energy retainer.

In some embodiments, the first and second plurality of ultracapacitors may alternate between receiving the inbound energy and conveying the first energy to the energy retainer based, at least in part, on a charge and/or voltage of the first and/or second plurality of ultracapacitors reaching a low threshold.

In some embodiments, the energy retainer may comprise one or more batteries or capacitors.

BRIEF DESCRIPTION OF THE DRAWINGS

FIGS. 8A and 8B provide additional views of the alternate fifth wheel system of FIG. 7.

FIGS. 10A-10P are screenshots of an interface that presents various variables that are monitored during operation of the EV with an example embodiment of the OBCS described herein.

FIG. 30 illustrates a chart of example data relating to voltage generation and usage of the OBCS and hypercapacitor operating in a BEV while travelling a distance.

Figure 1:
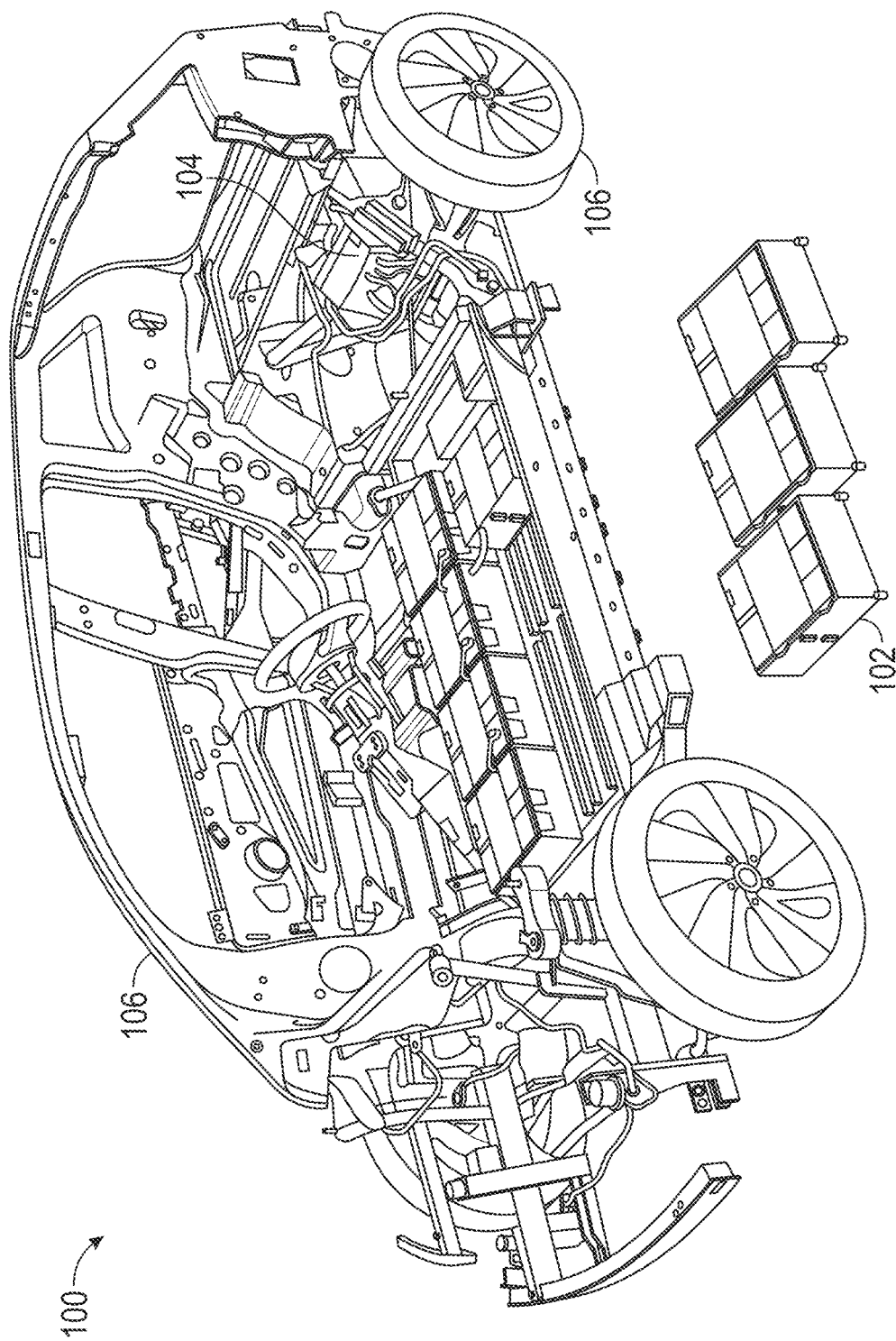
FIG. 1 is a diagram of an exemplary battery electric vehicle (BEV).

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for providing a thorough understanding of the exemplary embodiments. In some instances, some devices are shown in block diagram form.

An electric vehicle (EV) is used herein to describe a vehicle that includes, as at least part of its locomotion capabilities, electrical energy derived from energy sources (e.g., one or more energy generation devices and energy storage devices, for example rechargeable electrochemical cells, capacitors, ultra-capacitors, other types of batteries, and other energy storage devices). In some embodiments, capacitor (or ultra-capacitor modules) may be ideal replacements for the battery 102 where long term storage for energy generated by the generators 302a and 302b is not needed but an ability to quickly store and discharge large amounts of energy is desired. As non-limiting examples, some EVs may be hybrid electric vehicles (HEVs) that include, besides electric motors, one or more batteries, and a traditional combustion engine for direct locomotion or to charge the vehicle's battery. Other EVs, for example battery electric vehicles (BEVs), may draw all locomotion capability from electrical energy stored in a battery. An EV is not limited to an automobile and may include motorcycles, carts, scooters, buses, and the like. Additionally, EVs are not limited to any particular energy source (e.g., energy storage source or generation source) or to when the electricity is received from the energy source (for example, when the EV is at rest or in motion).

Current EVs, whether HEVs or BEVs, may be charged using stationary charging stations. Such stationary charging stations may be installed at home or in public locations, such as public parking lots, along roadways, and so forth. These stationary charging stations may use cables that couple to the EVs to convey charging energy between the EVs and the stationary charging stations and/or use wireless transfer technologies to wirelessly convey charging energy between the EVs and the stationary charging stations. The "stationary" aspect of charging stations may refer to the static nature of the charging stations themselves. For example, such stationary charging stations themselves are generally permanently (or semi-permanently) installed in fixed locations because of needed power feeds required to provide electricity to the charging stations (for example, a connection to a home panel for the home installation) and, therefore, require energy from a power grid, thereby increasing burdens on the power grid. In some embodiments, the EVs themselves receive a charge from the stationary charging stations while the EVs are stationary (for example, parked in a parking spot) or in motion (for example, driving over or in proximity of one or more wireless charging components of the stationary charging stations while the EVs are in motion).

In some embodiments, an EV owner may utilize a generator to charge the EV. For example, the generator is a mobile generator that the EV owner is able to transport to various locations in order to charge the EV. In some embodiments, such mobile generators provide a charge to the EV when the EV does not have sufficient energy to drive to a stationary charging station or to provide any charge at a location where a stationary charging station is not available. Additionally, or alternatively, the mobile generator may provide charging to the EV while the EV is in motion. However, such mobile generators often utilize gasoline or other fuels to generate electricity from a chemical and/or mechanical reaction. Therefore, use of the mobile generators may involve transporting the fuel for the generator and/or waiting for a charge provided by the mobile generators and generation of harmful byproducts that must be exhausted from the vehicle. Additionally, the mobile generators are generally unable to provide a charge at a rate greater than charge used to drive the EV. For example, the mobile generator is only able to provide hourly charging rates at the equivalent of providing electricity to allow the EV to travel between 4 miles and 25 miles while the moving EV will generally consume more electricity than this in an hour of travel. Such charging rates would be insufficient to maintain motion of the EV during use. Alternatively, or additionally, the EV owner may use a portable battery charger or other portable energy storage device that is able to transfer energy to the EV when the EV is unable to drive to a stationary charging station. Such use of portable battery chargers may involve similar constraints as the mobile generators, such as charge transfer times, and so forth. The user may also use regenerative braking or regenerative driving (for example, generating electricity while the vehicle is in motion and not necessarily braking) to charge or power the EV. For example, a regenerative driving system may generate electricity based on movement of one or more vehicle components that is moving or driven while the EV is moving.

Accordingly, the disclosure described in more detail herein provides an on-board charging system (OBCS) that charges the energy storage device (for example, the battery, the battery array, the energy containment device, or similar) or provides electricity directly to motors of the EV while the EV is in motion (or generally traveling) at a charging rate sufficient to enable significant, continued use of the EV while the EV is charging. Some embodiments incorporate a battery charger or other generator that is capable of providing charge to the energy storage device of the EV or the motors of the EV at a rate greater than that which the EV is able to discharge the energy storage device. The OBCS may be mobile in the sense that is moves with the EV while being fixedly attached to the EV. Alternatively, or additionally, the OBCS may be removable from the EV and portable to other EVs, and so forth. In some embodiments, the OBCS provides stable and consistent power on demand for the EV, thereby extending a travel range of the EV. The EV (for example, via a controller and/or communications with the OBCS) may request the OBCS to charge the EV by providing the electrical energy needed at any given moment. This may be, and in fact is intended to be, a cyclical process as the EV drains its energy storage device and requests additional charge from the OBCS. Alternatively, the EV may communicate with the OBCS to provide electrical energy directly to the motors of the EV, bypassing the energy storage device of the EV. The OBCS may reduce reliance of charging of EVs using grid charging and may significantly reduce the mining of fossil fuels and resulting carbon emissions.

Further details regarding the OBCS and its integration with the EV are provided below with reference to FIGS. 1-14C and corresponding description.

FIG. 1 is a diagram of an exemplary battery electric vehicle (BEV) 100, in accordance with an exemplary embodiment. The BEV 100 includes, among other components shown, a battery 102, at least one electric motor 104, a plurality of wheels 106, and a frame or body 108. The battery 102 may include a plurality of individual battery units or modules and may store energy used to drive the at least one electric motor 104. In some embodiments, the individual battery units may be coupled in series to provide a greater voltage for the battery 102 than an individual battery unit. In some embodiments, the battery 102 includes any other charge or energy storage or containment device. In some embodiments, the battery 102 is coupled to a controller (not shown, for example the EV controller) configured to monitor a charge state or a charge value of the battery 102. The controller may provide controls for how the battery 102 is charged or discharged and may provide various signals, interlocks, and so forth with respect to the battery 102. For example, the controller may limit charging of the battery 102 in certain weather conditions, vehicle conditions or states, or based on one or more interlocks (such as when a charging port door is left open, and so forth).

In some embodiments, each of the battery units (and the battery 102 as a whole) may exist in one of a plurality of charge states, including a fully charged state, a fully discharged state, a charging state, a sufficient charge state, a discharging state, and a charge desired state, among others. The controller, based on its monitoring of the charge states of the individual battery units and the battery 102 and/or a voltage of the battery 102, may allow the battery 102 to provide power to a load, for example the motor 104, request charging of the battery 102, or prevent one or more of charging and/or discharging of the battery 102 based on the charge states. Thus, if the battery 102 is discharged below a threshold charge value (for example, if the battery 102 is in the charge desired state), then the controller may prevent further discharge of the battery 102 and/or request that the battery 102 be charged. Alternatively, or additionally, if the battery 102 is receiving charge from a charger and the charge value of the battery 102 exceeds a threshold full charge value (for example, if the battery 102 is in the fully charged state), then the controller may prevent further charging of the battery 102.

The battery 102 provides electrical energy to the at least one motor 104. The at least one motor 104 converts the electrical energy to mechanical energy to rotate one or more of the plurality of wheels 106, thus causing the BEV 100 to move. In some embodiments, the at least one motor 104 is coupled to two or more of the plurality of wheels 106. In some embodiments, the at least one motor 104 includes two motors 104 that each power a single wheel 106 of the plurality of wheels 106. In some embodiments, the controller monitors the state of the at least one motor 104, for example whether the at least one motor 104 is driving at least one of the plurality of wheels 106 to cause the BEV 100 to move based on energy from the battery 102, and so forth. In some embodiments, the controller may monitor a direction in which the at least one wheel 106 is rotating.

The BEV 100 may be configured to use the wheel(s) 106, the motor(s) 104, and the battery 102 to charge the battery 102 using regenerative braking from a generative braking system (not shown). Regenerative braking enables the BEV 100 to capture energy from the rotation of the wheel(s) 106 for storage in the battery 102 when the BEV 100 is coasting (for example, moving with using energy from the battery 102 to power the motor(s) 104 to drive the wheel(s) 106) and/or braking. Regenerative braking effectively charges the BEV 100 based on kinetic energy of the BEV 100. Effectively, the motor(s) 104 convert the kinetic energy from the moving BEV 100 to electrical energy for storage in the battery 102, causing the BEV 100 to slow. In some embodiments, the controller may be used to control operation of the motor(s) 104 efficiently and effectively to enable regenerative braking when the motor(s) 104 is not being used to drive the wheel(s). For example, the controller may determine that the motor 104 is not being used to drive the corresponding wheel 106 and may switch the motor 104 into a regenerative braking mode or state to capture charge from the movement of the BEV 100. In some embodiments, if the controller determines that at least one wheel 106 is rotating at a speed faster than a speed at which it is being driving (for example, when the BEV is going down a steep hill), then the controller controls the motor 104 to perform regenerative braking or otherwise regenerate charge from the movement of the BEV. In some embodiments, the controller generates one or more alerts for display to a driver or operator of the BEV 100 or communicated to an internal or external system (for example, about charging needs, battery levels, regenerative braking, and so forth).

Though not explicitly shown in FIG. 1, the BEV 100 may include a charging port that allows the battery 102 to be connected to a power source for charging. Often, the charging port allows connection of a plug external to the BEV 100 that is then connected to an external power source, such as a wall charger, and so forth. In some embodiments, internal wiring couples the charging port to the battery 102 to allow for charging. Alternatively, or additionally, the BEV 100 includes a wireless power antenna configured to receive and/or transmit power wirelessly. As such, internal wiring couples the wireless power antenna to the battery 102 to allow for charging. In some embodiments, the internal wiring may couple either the charging port and/or the wireless power antenna directly to the motor 104. The controller may detect when the battery 102 is receiving a charge via the charging port and/or the wireless power antenna.

Figure 2:
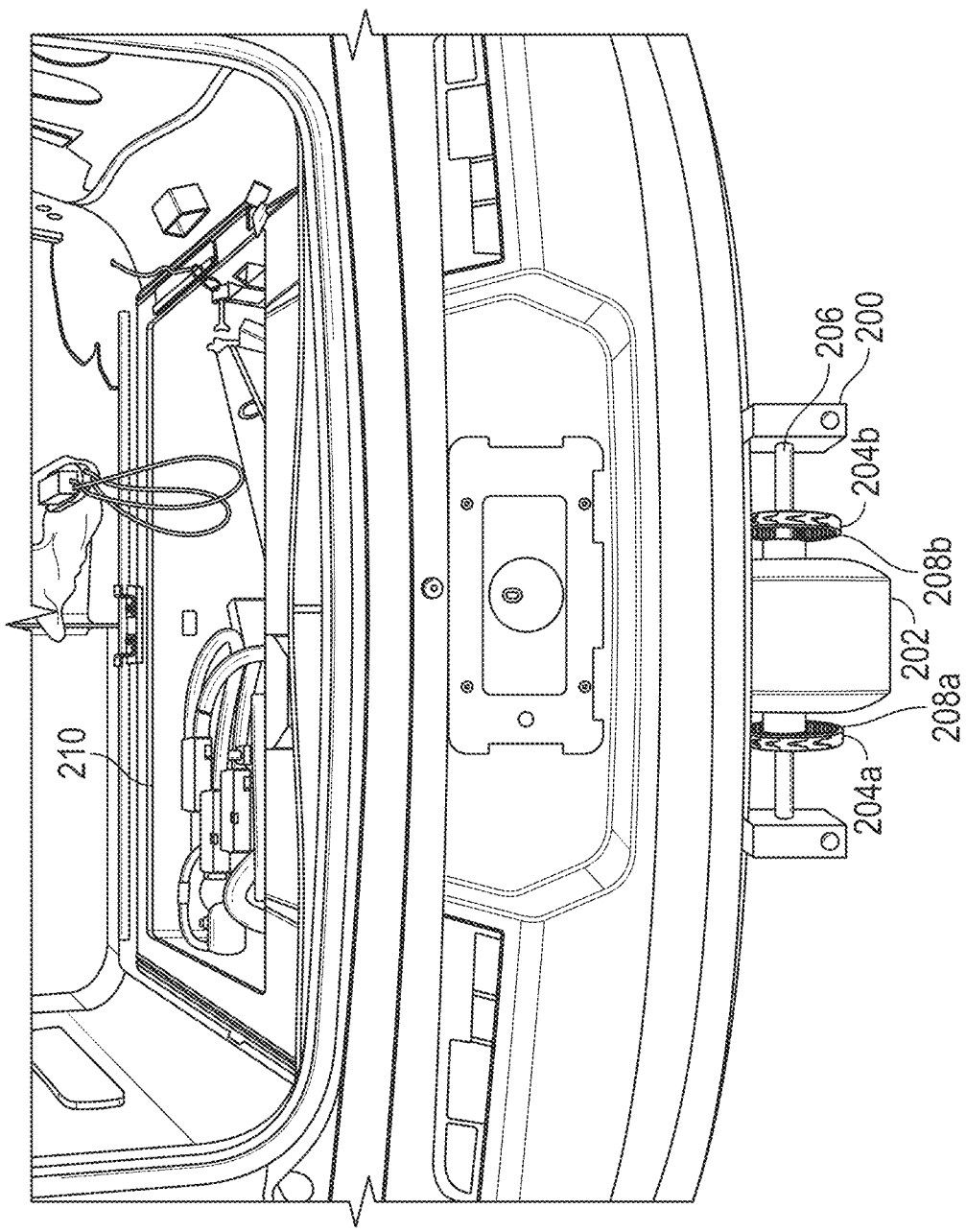
FIG. 2 is a diagram of an exemplary "fifth" wheel configured to drive or power an on-board charging system (OBCS) capable of charging an energy storage device of the BEV of FIG. 1.

FIG. 2 is a diagram of an exemplary "fifth" wheel 202 configured to drive or power an on-board charging system (OBCS) 210 capable of charging the battery 102 of the BEV 100 of FIG. 1, in accordance with an exemplary embodiment. The fifth wheel 202 as shown is in an extended state such that the fifth wheel 202 is in contact with the ground or road surface and, thus, rotates while the BEV 100 is in motion. The controller may extend or retract the fifth wheel 202 such that the fifth wheel 202 is not always in contact with the ground or road surface. In some embodiments, the fifth wheel 202 is replaced with or integrated as a small motor or geared component driven by a drive shaft, motor 104, wheel 106, or other driven component of the BEV 100. In some embodiments, the small motor or geared component may include a small fixed gear electric motor that rotates the shaft at a desirable rotations per minute (RPM). For discussion herein, the fifth wheel 202 will be described as being driven when in contact with the ground, though any other means of being driven (for example, the small motor or geared component driven by a drive shaft) is envisioned. As such, the fifth wheel 202, whether in contact with the ground or integrated with another drive component within the BEV 100, rotates in response to the BEV 100 being driven to move or otherwise moving. In some embodiments, although the fifth wheel 202 is in contact with the ground, the fifth wheel 202 may not carry a significant portion of weight of the BEV 100. As such, in some embodiments, a minimal or small amount of drag will be created or caused by the fifth wheel 202. The controller may be configured to control the amount of drag that the fifth wheel 202 creates (for example, how much pressure the fifth wheel 202 exerts downward on the road surface).

The fifth wheel 202 is coupled to a drive shaft (herein referred to as the "shaft") 206. As the fifth wheel 202 rotates, the shaft 206 also rotates at a same, similar, or corresponding rate as the fifth wheel 202. In some embodiments, the fifth wheel 202 and the shaft 206 may be coupled such that the shaft 206 rotates at a greater or reduced rate as compared to the fifth wheel 202. In some embodiments, the shaft 206 is coupled to a support structure 200. The support structure 200 may be attached to the frame or body 108 of the BEV 100 and allow for the fifth wheel 202 to be extended or retracted as needed while supported by the BEV 100. Two sprockets or gears 208a and 208b are disposed on the shaft 206 such that when the shaft 206 rotates, the sprockets 208a and 208b also rotate. In some embodiments, the sprockets 208a and 208b and the shaft 206 may be coupled such that the sprockets 208a and 208b rotate at a greater or reduced rate as compared to the shaft 206.

The sprockets 208a and 208b engage with a chain, belt, gearing, pulley, or similar device 204a and 204b, respectively. The chains 204a and 204b cause one or more devices (not shown in this figure) coupled via the chains 204a and 204b to rotate at a rate that corresponds to the rate of rotation of the sprockets 208a and 208b. In some embodiments, the one or more devices coupled to the sprockets 208a and 208b via the chains, gearing, pulley, or similar device 204a and 204b are components of or otherwise coupled to the OBCS 210. For example, the devices to which the sprockets 208a and 208b are coupled via the chains (and so forth) 204a and 204b provide power (for example, by way of kinetic energy) to the OBCS 210 to enable the OBCS 210 to charge the BEV 100 while the BEV 100 is in motion. Thus, in some embodiments, the devices to which the sprockets 208a and 208b are coupled via the chains 204a and 204b may include generators, alternators, or similar mechanical to electrical energy conversion devices, as described in further detail below. In some embodiments, the small motor described above may act as a fail over motor to drive the shaft driving the generators 302a and 302b should one of the chains 204a and 204b fail.

In some embodiments, the OBCS 210 includes any existing, off the shelf BEV charger or a custom developed BEV charger, such as a level 1 electric vehicle charger, a level 2 electric vehicle charger, a level 3 electric vehicle charger, and so forth. The OBCS 210 may couple to the charging port of the BEV 100, thereby allowing the OBCS 210 to charge the battery 102 of the BEV 100. Alternatively, the OBCS 210 may provide charge wirelessly to the wireless power antenna of the BEV 100. In some embodiments, the OBCS 210 may be used in conjunction with power received via the charging port when the OBCS 210 provides power via the wireless power antenna or in conjunction with power received via the wireless power antenna when the OBCS 210 provides power via the charging port. Thus, charging by an external system (for example, stationary charging systems) may occur in conjunction with charging by the OBCS 210.

The level one charger generates a charge for the battery 102 of the BEV 100 based on a 120-volt (V) alternating current (AC) connection, which is generally referred to as a standard household wall outlet. Charge times with the level 1 charger are generally longer than those for other chargers. Generally, the level one charger may charge the battery 102 of the BEV 100 at a rate of 4-8 miles per hour (MPH) of charging. The level 2 charger generates the charge for the battery 102 of the BEV 100 based on a 240 VAC connection. Charge times with the level 2 charger are generally much quicker than those with the level one charger but slower than the level 3 charger. The level 2 charger may generally charge the battery 102 of the BEV 100 at a rate of 15-30 miles per hour of charging. The level 3 charger generates the charge for the battery 102 of the BEV 100 based on a 480 V direct current (DC) connection. Charge times with the level 3 charger are generally much quicker than those with the level 2 charger. The level 3 charger may generally charge the battery 102 of the BEV 100 at a rate of 45+ miles per half-hour of charging. Higher level chargers may provide greater levels of energy to the BEV 100 to allow the battery 102 to be charged at faster rates than even the level 3 charger.

In some embodiments, the BEV 100 includes multiple fifth wheels 202, sprockets 208, and/or chains 204 coupling the sprockets 208 to one or more devices. The one or more fifth wheels 202 and the corresponding one or more sprockets 208 may rotate with one or more corresponding shafts 206. In some embodiments, each fifth wheel 202 is mounted via its respective shaft 206 to its own support structure 200. In some embodiments, each fifth wheel 202, when additional fifth wheels 202 exist, is coupled to its own energy conversion device(s) through one or more sprockets 208 and chains 204 that rotate with the corresponding shaft 206 of the additional fifth wheels 202. By including additional fifth wheels 202, more mechanical energy may be converted to electrical energy for supply by the OBCS 210 as compared to with a single fifth wheel 202.

Figure 3:
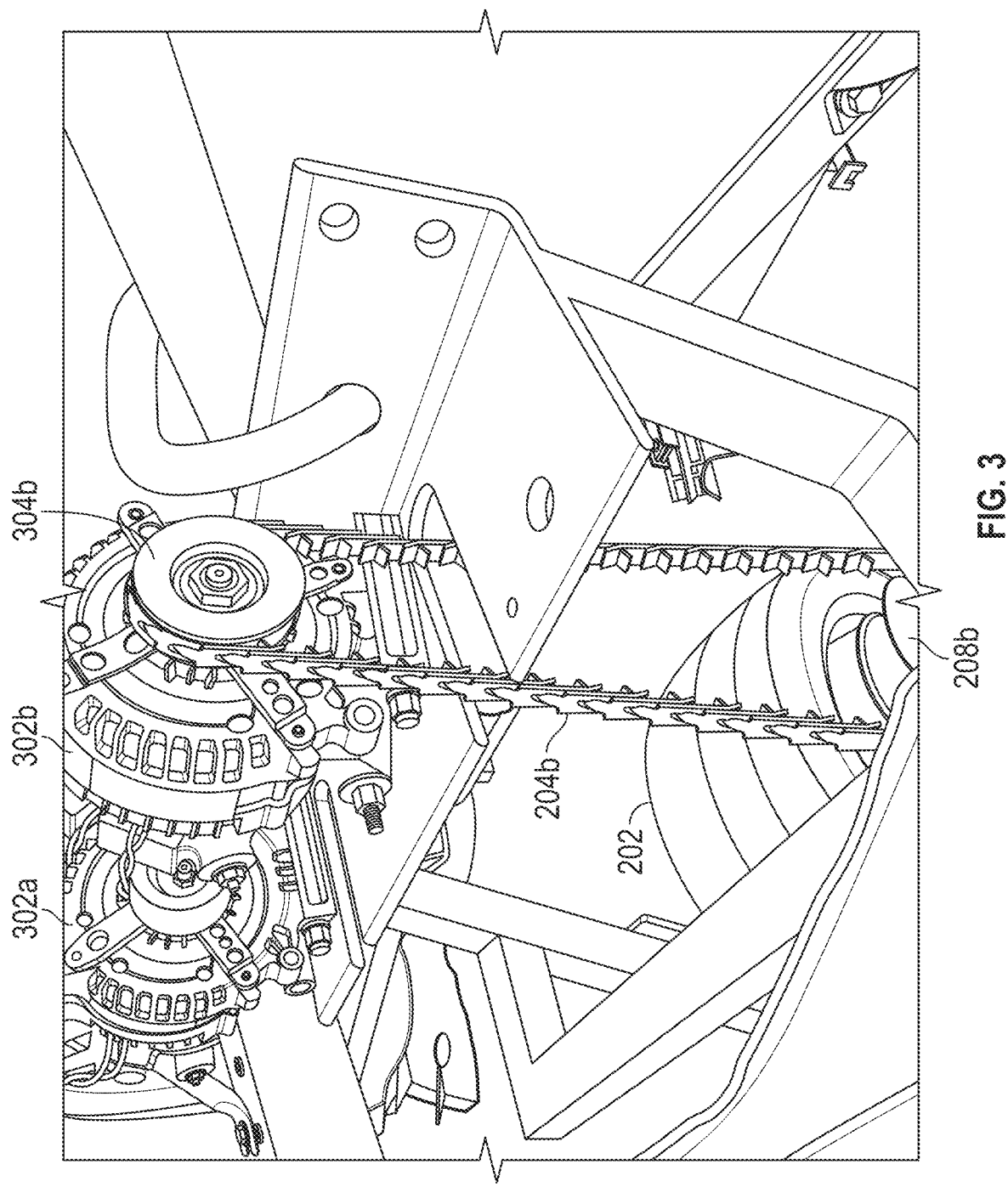
FIG. 3 is a diagram of the fifth wheel of FIG. 2 mechanically coupled to two generators that convert a mechanical rotation of the fifth wheel into electrical energy outputs.

FIG. 3 is a diagram of the fifth wheel 202 of FIG. 2 mechanically coupled to two generators 302a and 302b that convert mechanical rotation of the fifth wheel 202 into electrical energy outputs, in accordance with an exemplary embodiment. In some embodiments, the generators 302a and 302b may be replaced with alternators or similar electricity generating devices. Each of the generators 302a and 302b has a rotor coupled to a drive pulley 304a and 304b, respectively. The drive pulley 304 of each generator 302 may rotate, causing the corresponding rotor to rotate and causing the generators 302 to generate an electrical energy output via a cable (not shown in this figure). The drive pulleys 304a and 304b are coupled to the fifth wheel 202 via one of the sprockets 208a and 208b and one of the chains 204a and 204b, respectively. The cable may supply any generated electrical energy output to the OBCS 210 as an input energy to the OBCS 210. In some embodiments, the two generators 302a and 302b may be replaced by any number of generators 302, from a single generator to many generators. In some embodiments, the generators 302 may generate AC electricity or DC electricity, depending on the application. When the generators 302 generate AC power, an AC-to-DC converter may be used to condition and convert the generated electricity for storage. When the generators 302 generate DC power, an DC-to-DC converter may be used to condition the generated electricity for storage.

As described above, the fifth wheel 202 is designed to rotate when the BEV 100 is in motion and the fifth wheel 202 is extended and/or otherwise in contact with the ground or road surface (or otherwise being driven while the BEV is in motion). When the fifth wheel 202 rotates, that rotation causes the shaft 206 to rotate, causing the sprockets 208a and 208b to also rotate. Accordingly, the chains 204a and 204b coupled to the sprockets 208a and 208b move or rotate around the sprockets 208a and 208b, respectively. The movement of the chains 204a and 204b while the BEV 100 is in motion and the fifth wheel 202 is in contact with the ground causes the pulleys 304a and 304b of the rotors of the generators 302a and 302b, respectively, to rotate. As described above, the rotation of the pulleys 304 of the generators 302 causes the rotors of the generators 302 to rotate to cause the generators 302 to generate the electrical energy output via the cable, where the electrical energy output corresponds to the mechanical rotation of the pulleys 304. Thus, rotation of the fifth wheel 202 causes the generators 302a and 302b to generate electrical energy outputs. In some embodiments, the generators 302a and 302b (in combination and/or individually) may generate electrical energy outputs at greater than 400 VAC (for example in a range between 120 VAC and 480 VAC) delivering up to or more than 120 kW of power to the OBCS 210. In some embodiments, the power output of the generators 302a and 302b, in combination and/or individually, may range between 1.2 kilowatts (kW) and 120 kW, for example 1.2 kW, 3.3 kW, 6.6 kW, 22 kW, 26 kW, 62.5 kW, and 120 kW, and so forth. In some embodiments, the generators 302a and 302b provide up to or more than 150 kW of power. The power provided by the generators may be adjusted by adjusting the particular generators used or by otherwise limiting an amount of power being delivered from the OBCS 210 to the battery 102 (or similar charge storage devices), as needed.

In some embodiments, the fifth wheel 202 may be designed to be smaller in diameter than the wheels 106 of the BEV 100. By making the fifth wheel 202 smaller in diameter than the wheels 106 of the BEV 100, the fifth wheel 202 may rotate more revolutions per distance traveled than the wheels 106. Accordingly, the fifth wheel 202 rotates at a faster RPM than the wheels 106. The shaft 206, coupled to the fifth wheel 202, has a smaller diameter than the fifth wheel 202. The sprockets 208a and 208b coupled to the shaft 206 have a larger diameter than the shaft 206 but a smaller diameter than the fifth wheel 202. In some embodiments, the diameters of the various components (for example, the fifth wheel 202, the shaft 206 and/or the sprockets 208a and 208) may be varied to further increase the rate of rotation (or rotational speed) of the corresponding components. In some embodiments, the diameter of the fifth wheel 202 may be reduced further as compared to the wheels 106. In some embodiments, gearing between the fifth wheel 202 and the shaft 206 and/or between the shaft 206 and the sprockets 208a and 208b may further increase the difference in the rotational rates or speeds of the various components as compared to the wheel 106.

As shown in FIG. 3, the pulleys 304 (and the rotors) of the generators 302 have a smaller diameter than the sprockets 208. Accordingly, the pulleys 304 may rotate at a faster or greater RPM than the sprockets 208 and the fifth wheel 202. Accordingly, the rotors of the generators 302 coupled to the pulleys 304 may rotate at a faster RPM (as compared to the fifth wheel 202) and generate electrical energy that is output to the OBCS 210 via the cable described above. In some embodiments, adjusting the diameters of the various components described herein to cause the pulleys 304a and 304b to rotate at different RPMs and can cause the generators 302a and 302b to generate different amounts of power for transmission to the OBCS 210 (for example, faster rotation may result in more power generated by the generators 302a and 302b than slower rotation). By varying the sizing of the various components, the rotors of the generators 302a and 302b may rotate at greater or smaller rotation rates. The greater the rotational rate, the more power that is generated by the generators 302a and 302b. Thus, to maximize power generation by the generators 302a and 302b, the various components (for example, the fifth wheel 202, the shaft 206, the sprockets 208, the pulleys 304, and so forth), may be sized to maximize the rotation rate of and power generated by the generators 302.

In some embodiments, the wheels 106 of the BEV 100 may be between 15" and 22" in diameter, inclusive. Specifically, the wheels 106 of the BEV 100 may be 15", 16", 17", 18", 19", 20", 21", or 22" in diameter. The corresponding fifth wheel 202 may be between 7" and 13", inclusive. Specifically, the fifth wheel 202 may be 7", 8", 9", 10", 11", 12", or 13" in diameter. In some embodiments, the fifth wheel 202 has a diameter selected such that the ratio of the diameter of the wheel 106 to the diameter of the fifth wheel 202 meets a certain threshold value (for example, 1.5:1, 1.6:1, 1.7:1, 1.8:1, 1.9:1, 2:1, 3:1, 15:1 and so forth). This means that the fifth wheel 202 may rotate at a speed such that a ratio of the rotation speed of the fifth wheel 202 to the rotation speed of the wheel 106 is the same as the ratio between the diameter of the fifth wheel 202 to the diameter of the wheel 106.

In some embodiments, the sprockets 208a and 208b may have a diameter that is approximately half the diameter of the fifth wheel 202. For example, a ratio of the diameter of the fifth wheel 202 to the sprockets 208a and 208b may be approximately 2:1 such that the sprockets 208a and 208b rotate at approximately twice the rotational speed or RPMs as the fifth wheel 202. More specifically, the diameter of the sprockets 208a and 208b may be between 3" and 5", where the diameter is one of 3", 4", and 5". Similarly, the sprockets 208a and 208b may have a larger diameter than the pulleys 304a and 304b; for example, the pulleys 304a and 304b may have diameters of less than 5" (more specifically, one or more of 1", 2", 3", 4", and 5", inclusive). The resulting rotation of the pulleys 304a and 304b occurs at sufficiently high, sustained speeds or RPMs that the corresponding generators 302a and 302b generate electrical power at levels sufficient to energy the OBCS 210 to charge the battery 102 of the BEV 100 while the BEV 100 is in motion.

As the rotors for the generators 302a and 302b rotate, they induce a magnetic field within windings in stator coils of the generators 302a and 302b. The magnetic field generated within the coils may be controlled (for example, increased or decreased) by changing a number of coils in each of the generators 302a and 302b, thus changing the sizing of the generators 302a and 302b. The energy generated by the generators 302a and 302 may be varied (for example, increased or decreased) by introducing and/or changing a number of capacitors or other components utilized in conjunction with the generators 302a and 302b (for example, within the generators 302a and 302b or in series downstream of the generators 302a and 302b), and/or by using a permanent magnet coil in the generators 302. The magnetic field generated within the coils may be directly related to the energy (for example, a current) generated by the generators 302a and 302b. In some embodiments, the magnetic field is related to the torque on the generator such that as the torque on the generator increases, the magnetic field rises. As such, to reduce wear and tear on components in the BEV 100 and to optimize voltage generation, the magnetic field is managed as described herein. In some embodiments, when the fifth wheel 202 comprises the small motor as described above, the small motor is an AC or DC motor and acts as a fail over device that is coupled directly to the rotors of the generators 302 such that the small motor is able to drive the generator should the pulley 204, the fifth wheel 202, or other device coupling the fifth wheel 202 to the generators 302 fail.

Figure 4:
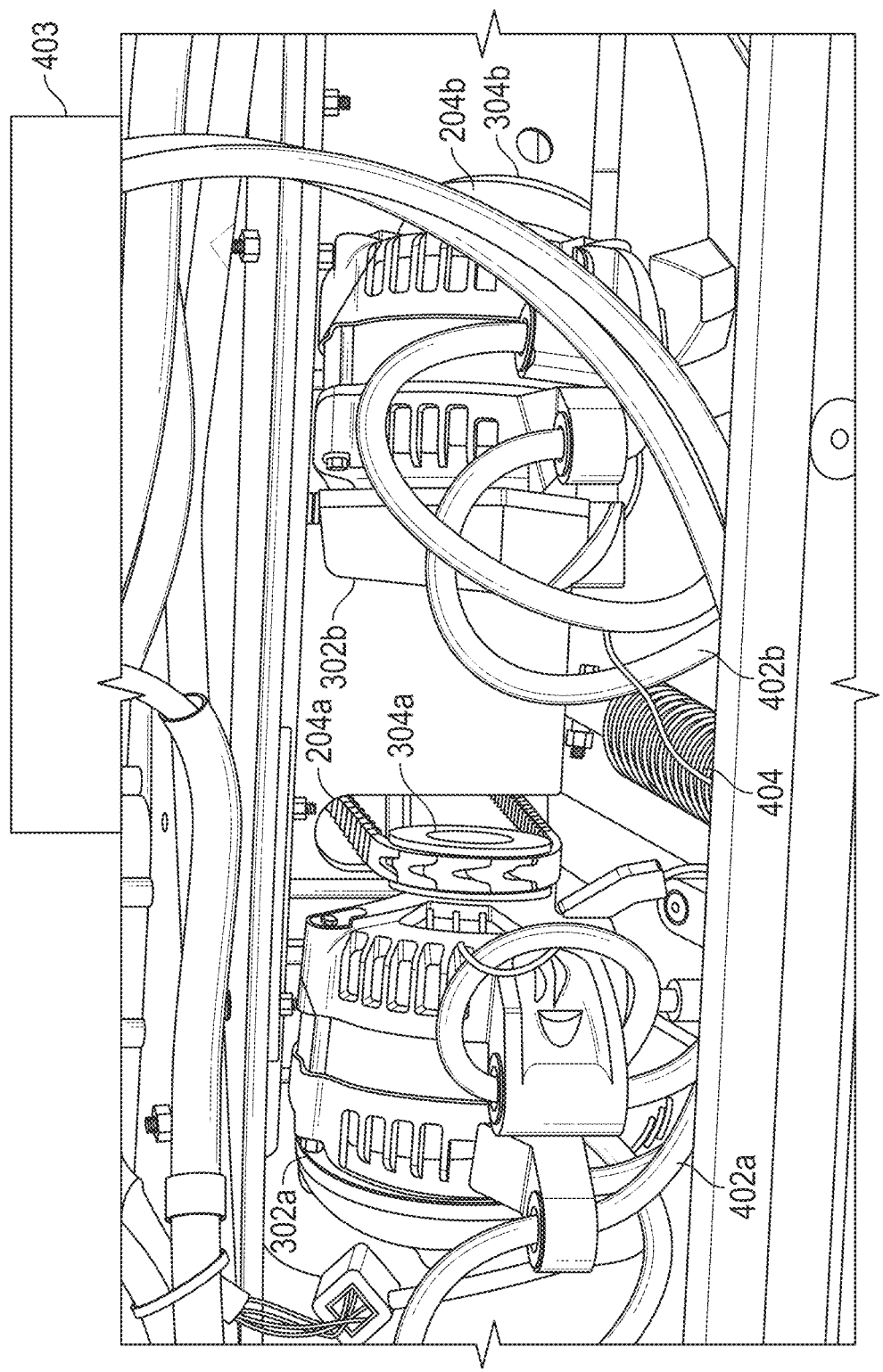
FIG. 4 is an alternate view of the two generators of FIG. 3 and cabling that couples the generators to a mobile battery charger coupled to a charging port for the BEV.

FIG. 4 is an alternate view of the two generators 302a and 302b of FIG. 3 and cabling 402a and 402b that couples the generators 302a and 302b to a battery charger 403 coupled to a charging port for the BEV 100, in accordance with an exemplary embodiment. The generators 302a and 302b are shown with cables 402a and 402b, respectively, that couple the generators 302a and 302b to the charger 403 (e.g., the battery and/or capacitor charger). The OBCS 210 may include the charger 403 described herein. The charger 403 may comprise one or more other components or circuits used to rectify or otherwise condition the electricity generated by the generators 302a and 302b. For example, the one or more other components or circuits may comprise one or more of a matching circuit, an inverter circuit, a conditioning circuit, a rectifying circuit, a conversion circuit, and so forth. The matching circuit may match conditions of a load to the source (for example, impedance matching, and so forth). The conversion circuit may comprise a circuit that converts an alternating current (AC) signal to a direct current (DC) signal, a DC/DC conversion circuit, a DC/AC conversion circuit and so forth. The conditioning circuit may condition a signal input into the conditioning circuit, and the rectifying circuit may rectify signals. In some embodiments, the support structure 200 may be mounted to the BEV 100 with a shock system or springs 404 to assist with reducing impacts of the road, etc., on the BEV 100 and/or the OBCS 210.

In some embodiments, a rate of rotation of seven hundred (700) revolutions or rotations per minute (RPM) for the fifth wheel 202 identifies a lowest threshold RPM of the fifth wheel 202 at which the generators 302a and 302b will provide sufficient electrical power to charge the battery 102 of the BEV 100 via the OBCS 210. In some embodiments, the fifth wheel 202 may rotate at 3,600 or 10,000 RPM or the generators 302a and 302b (and/or the generator unit 710 described below) may rotate at 3,600 or 10,000 RPM. Furthermore, at or above 700 RPMs for the fifth wheel 202, the fifth wheel 202 (and/or any coupled flywheel) may be capable of maintaining its rate of rotation (for example, the 700 RPMs) even if the fifth wheel 202 it not kept in contact with the ground or road surface while the BEV 100 is moving. For example, the fifth wheel 202 may have a driven mass (referenced herein as "mass") of between 15 and 75 kilograms (for example, one of 15, 20, 25, 30, 35, 40, 45, 50, 55, 60, 65, 70, and 75 kilograms and so forth, or any value therebetween) and the mass may enable the fifth wheel 202 to continue to rotate when not driven by the contact with the ground due to inertia of the fifth wheel 202. For example, once the fifth wheel 202 reaches at least 700 RPMs, the fifth wheel 202 may be retracted from contact with the ground or road surface and continue to rotate at at least 700 RPMs based on the inertia of the fifth wheel 202 (and/or any coupled flywheel), enabling the generators 302a and 302b to continue generating power to charge the battery 102 of the BEV 100 when the fifth wheel 202 is retracted. Furthermore, at fifth wheel 202 RPMs greater than or equal to 700 RPMs, the corresponding diameters of the components between the fifth wheel 202 and the generators 302a and 302b (for example, the sprockets 208a and 208b, the pulleys 304a and 304b, and so forth) cause the generators 302a and 302b to generate sufficient power (for example, between 1.2 kW and 120 kW or more) to charge the battery 102 of the BEV 100 using the charger 403 at a rate that is greater than a discharge rate of the battery 102 driving the motor 104 and wheels 106 of the BEV 100 to keep the BEV 100 in motion. Thus, at fifth wheel 202 speeds of at least 700 RPM, the generators 302a and 302b generate sufficient electrical energy to replenish the battery 102 as the motors 104 and the wheels 106 move the BEV 100 and drain battery 102. Thus, the fifth wheel 202 may be used to regenerate the battery 102 while the BEV 100 is in motion, therefore extending a range of the BEV 100. In some embodiments, the OBCS 210 enables the harvesting of mechanical energy from the movement of the BEV 100 before the such energy is lost to heat or friction, and so forth. Thus, the OBCS 210, as described herein, may convert kinetic energy that may otherwise be lost to electrical energy for consumption by the BEV 100. In some embodiments, the generators 302a and/or 302b may each generate a voltage of up to 580 VAC when driven by the fifth wheel 202, for example at the rotational speed of between about 700 and 10,000 RPM.

In some embodiments, the fifth wheel 202 or other small motor may be coupled to a flywheel (not shown in this figure) that is configured to generate the inertia used to store kinetic energy of the BEV 100. In some embodiments, the flywheel may be selectively coupled to the fifth wheel 202 or other small motor to allow the flywheel to be selectively engaged with the fifth wheel 202, for example when the BEV 100 is slowing down, when the BEV 100 is accelerating, and so forth. Additionally, the flywheel may be coupled to the fifth wheel 202 via a clutch or similar coupling to allow the flywheel to be driven by the fifth wheel 202 or small motor but not allow the flywheel to drive the fifth wheel 202 or small motor. When the flywheel is included, the flywheel may have a mass of between 15 and 75 kilograms (for example, one of 15, 20, 25, 30, 35, 40, 45, 50, 55, 60, 65, 70, and 75 kilograms and so forth, or any value therebetween).

In some embodiments, the one or more other components or circuits (e.g., the capacitors, matching, filtering, rectifying, and so forth, circuits) clean, convert, and/or condition the electricity provided by the generators 302a and 302b before the electricity reaches the charger 403 and/or motor 104. For example, cleaning and/or conditioning the electricity may comprise filtering the electricity or matching of values between a load and a source. Converting the electricity may comprise converting an AC signal to a DC signal, or vice versa (for example, converting an AC signal generated by the generators 302a and 302b to a DC signal for storage in the battery 102 or similar energy storage device). Cleaning, converting, and/or conditioning the electricity provided to the charger 403 may help maintain operation of the charger 403 and reduce fluctuations in the quality of electricity consumed by the charger 403 to charge the battery 102 (or other charge storage device) or drive the motors 104 or the motors 104 to drive the BEV 100. In some embodiments, the charger 403 may be selectively coupled directly to the motor 104 instead of having to feed electricity through the battery 102 to then feed the motor 104. Cleaning the energy provided to the charger 403 or the motor 104 may also reduce risk of damage to the charger 403 and/or the motor 104 that may be caused by the electricity from the generators 302a and 302b. In some embodiments, one or more of the circuits described above may reduce and/or control variance in the electricity generated by the generators 302a and 302b. Similarly, changes in the generators 302a and 302b (for example, inclusion of different circuits in the generators 302a and 302b themselves) may cause the generators 302a and 302b to reduce and/or control variance of the magnetic fields generated in and the electricity generated by the generators 302a and 302b. In some embodiments, the charger 403 may be synchronized with the generators 302a and 302b (or other similar generator units).

In some embodiments, the extending and retracting of the fifth wheel 202 may occur based on communications with the controller that monitors the state of charge of the battery 102 and/or demand from the motor 104. For example, when the controller determines that the battery 102 requires a charge or the motor demands electricity (for example, the BEV 100 is accelerating), the controller issues a signal to a fifth wheel 202 control system that causes the fifth wheel 202 to be extended to be in contact with the ground or road surface while the BEV 100 is in motion. Once the fifth wheel 202 reaches an RPM of at least 700 RPM, the rate of rotation (for example, the RPMs) of the fifth wheel 202 may be controlled and/or monitored such that the battery 102 is charged such that the charge of the battery 102 is maintained or increased or such that the motor 104 is provided with sufficient energy to drive the BEV 100. For example, if the controller determines that the battery 102 needs to be charged while the BEV 100 is in motion, the controller may issue the signal to charge the battery 102 to the fifth wheel 202 system. This signal may cause the fifth wheel 202 system to extend the fifth wheel 202 to contact the ground or road surface. When the fifth wheel 202 reaches 700 RPM while the BEV 100 is moving, the generators 302a and 302b generate sufficient electrical energy to charge the battery 102 at a rate greater than it is being discharged by the motor 104 to move the BEV 100 or to feed the motor 104 at a level sufficient to fully drive the BEV 100. As the controller monitors the charge of the battery 102 or the demand from the motor 104, when the charge level or the charge state of the battery 102 or the motor demand 104 reaches a second threshold, the controller may issue a second signal to stop charging the battery 102 or stop feeding the motor 104. This second signal may cause the fifth wheel 202 to be retracted or otherwise disconnect the feed of electricity from the battery 102 or the motor 104.

In some embodiments, retracting the fifth wheel 202 occurs in a controlled matter. In some embodiments, the fifth wheel 202 continues to rotate when it is initially retracted and no longer in contact with the ground or road surface. As such, the generators 302a and 302b coupled to the fifth wheel 202 continue to generate electrical energy while the fifth wheel 202 continues to rotate based on its inertia. The controller may issue the second signal before the battery 102 is fully charged so as to not waste any energy generated by the generators 302a and 302b. In some embodiments, energy generated by the generators 302a and 302b may be offloaded from the BEV 100, for example to a land-based grid or energy storage device (for example, a home battery, and so forth).

In some embodiments, the controlled deceleration of the rotation of the fifth wheel 202 when the fifth wheel 202 is retracted occurs due to a brake or similar component that causes the fifth wheel 202 to stop rotating in a controlled manner. In some embodiments, the brake may include a physical brake or other slowing techniques. In some embodiments, the braking of the fifth wheel 202 is regenerative to provide energy to the battery 102 or the motor 104 while the fifth wheel 202 is braking.

In some embodiments, as described above, the fifth wheel 202 extends in response to the first signal from the controller requesting that the battery 102 of the BEV 100 be charged. As noted above, the fifth wheel 202 may have a mass that allows the fifth wheel 202 to continue to rotate under inertia, etc., when the fifth wheel 202 is retracted and no longer in contact with the ground or road surface while the BEV is in motion. In some embodiments, the fifth wheel 202 is coupled to the flywheel or similar component that spins under the inertia, etc., after the fifth wheel 202 is retracted from the ground or road surface. Based on the inertia of the fifth wheel 202 or the flywheel or similar component, mechanical energy may be generated from the movement of the BEV 100 and stored for conversion to electricity (for example, by the generators 302a and 302b, etc.).

Once the fifth wheel 202 is extended to contact the ground or road surface, the fifth wheel 202 begins rotating when the BEV 101 is moving. Due to the smaller size of the fifth wheel 202, as described above, the fifth wheel 202 rotates with more RPMs than the wheels 106 of the BEV 100. While the fifth wheel 202 rotates, the sprockets 208a and 208b described above also rotate, causing the generators 302a and 302b to generate electrical energy. The continued reduction in diameters of components between the wheels 106 and the pulleys 304 of the generators 302 ensures that the generators 302 rotate at a sufficiently fast rate (RPMs) that they generate power to supply to the OBCS 210, as described herein. The electrical energy is fed to the OBCS 210, which charges the BEV 100 via the charging port of the BEV 100, or directly to the motor 104. The fifth wheel 202 is retracted in response to the second signal from the controller, and may or may not continue to rotate and generate electricity under its inertia.

As described above, due to the mass and other properties of the fifth wheel 202 or the flywheel or similar components, the fifth wheel 202 or the fly wheel or similar components may continue to rotate or otherwise maintain some mechanical energy though the fifth wheel 202 is no longer in contact with the ground or road surface while the BEV 100 is moving. In some embodiments, the fifth wheel 202, once it reaches the 700 RPMs described above, is able to maintain its rotation even though the fifth wheel 202 is no longer being "driven" by the ground or road surface when the BEV 100 is moving. As such, the generators 302a and 302b are able to continue to generate electrical energy for charging the battery 102 or feeding the motor 104 of the BEV 100 via the OBCS 210. In some embodiments, the fifth wheel 202 or the flywheel or similar components may continue to generate mechanical energy that is converted to electrical energy by the generators 302a and 302b until the fifth wheel 202 or flywheel or similar components are stopped using the brake or similar components, as described above, or until the fifth wheel 202 or flywheel or similar components stop rotating due to friction. In some embodiments, the fifth wheel 202 or flywheel may be replaced with a geared motor or similar component that is smaller in diameter than the wheels 106.

In some embodiments, the OBCS 210 includes a second controller that communicates with the controller of the BEV 100. In some embodiments, the second controller is configured to monitor and/or control one or more of the fifth wheel 202, the generators 302a and 302b, and/or the OBCS 210 to control generating a charge for the battery 102 or the motor 104. In some embodiments, the second controller may be configured to engage the brake or otherwise control the fifth wheel 202 to slow the fifth wheel 202 in a controlled manner, for example based on whether or not the OBCS 210 can accept electricity from the generators 302a and 302b. In some embodiments, the second controller may prevent the battery 102 from being overcharged by the OBCS 210. In some embodiments, the OBCS 210 may include controls, etc., to prevent overcharging of the battery 102. In some embodiments, the second controller may be configured to disengage a safety or control that would prevent the BEV 100 from charging while moving or to control whether and when the OBCS 210 provides electricity directly to the motor 104 as opposed to the battery 102.

In some embodiments, the OBCS 210 includes a circuit breaker, fused connection, contactor, or similar electrically or mechanically switchable circuit element or component (not shown) designed to protect downstream components from the electrical output, for example, an excess current signal. In some embodiments, the circuit breaker is installed in series between the generators 302a and 302b and the charger 403 or in series between the charger 403 and the BEV charging port. In some embodiments, the circuit breaker is controlled by one or more of the controller of the BEV or the second controller of the OBCS 210 and disconnects downstream components from any upstream components. For example, if the battery 102 reaches a full state while being charged by the OBCS 210 or the motor 104 stops requesting energy, the BEV controller may send a signal to the circuit breaker to open the circuit/path between so that the battery 102 and/or the motor 104 is no longer receiving electricity from the OBCS 210. In some embodiments, the circuit breaker receives the "open" command or signal from the second controller of the OBCS 210, which receives a signal that the battery 102 is in the fully charged state or the motor 104 no longer demands energy from the BEV controller. In some embodiments, the similar "stop charging" command may be provided to the OBCS 210 (from one or both of the BEV controller and the second controller of the OBCS 210) and the OBCS 210 may stop providing a charge to the BEV based on receipt of such a command.

In some embodiments, the battery 102 may have an input path by which the battery 102 is charged and an output path by which the battery 102 is discharged. In some embodiments, the input path may be similar (for example, in routing) to the output path. In some embodiments, the input and output paths may be different (for example, in routing). In some embodiments, the input path includes a single input node by which a charge is received to charge the battery 102. For example, the single input node is coupled to the charging port of the BEV 100 and/or the regenerative braking system described above. In some embodiments, the input path includes a plurality of input nodes individually coupled to different charge sources. For example, a first input node is coupled to the charging port of the BEV 100 while a second input node is coupled to the regenerative braking port. As other charge sources are introduced, for example a capacitor array, another battery, a range extending generator, or another charge storage device, as described in further detail below, additional input nodes may be added to the battery 102 or the other charge sources may be coupled to the single input node along with the charging port and the regenerative braking system. Similarly, the output path may include a single output node or a plurality of output nodes by which the battery 102 are discharged to one or more loads, such as the electric motors 104 that move the BEV 100, an DC/AC converter, or the other battery, capacitor, or charge storage device.

Figure 5:
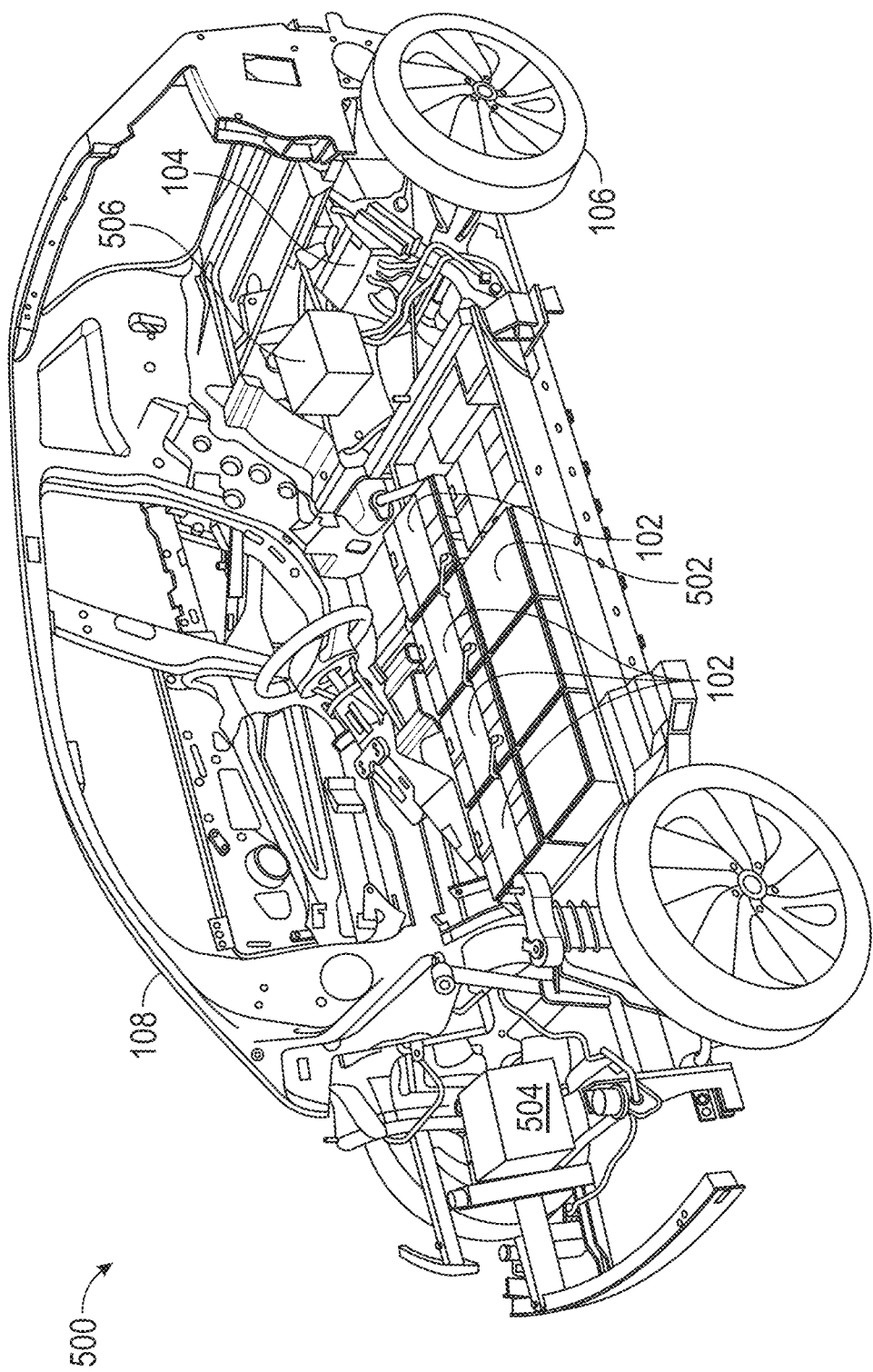
FIG. 5 is a diagram of the exemplary BEV of FIG. 1 incorporating one or more capacitor modules as a supplemental and/or intermediate energy storage device.

FIG. 5 is a diagram of the exemplary BEV 500 of FIG. 1 incorporating one or more capacitor modules 502 as a supplemental and/or intermediate energy storage device. In some embodiments, the capacitor modules 502 are disposed alongside the battery 102. The capacitor modules 502 and the battery 102 are electrically coupled to at least one deep cycle battery 504. The capacitor modules 502 and the deep cycle battery 504 may be coupled to a DC-to-DC converter 506 that the battery 102 provides energy to the capacitor modules 502 and/or to the deep cycle battery 504 and vice versa.

The battery 102 (for example, battery energy storage devices) as described herein generally store energy electrochemically. As such, a chemical reaction causes the release of energy (for example, electricity) that can be utilized in an electric circuit (for example, any of the circuits or motors described herein). In some embodiments, the battery 102 that is predominantly used in BEVs 500 is a lithium ion battery. Lithium ion batteries use lithium ion chemical reactions to discharge and charge the batteries. Due to the corresponding chemical processes associated with the charging and discharging, the charging and discharging of the battery 102 may be relatively time consuming. Additionally, the charging and discharging of the battery 102 may degrade the chemical components (for example, the lithium) within the battery 102. However, the battery 102 is capable of storing large amounts of energy and, thus, have high energy densities.

An alternative energy storage device is the capacitor (for example, supercapacitor and/or ultracapacitor) module 502 or energy storage device. The capacitor module 502 may store energy electrostatically instead of chemically. The capacitor module 502 may be charged and/or discharged more quickly than the battery 102. The capacitor module 502 may be smaller in size than the corresponding battery 102 and, thus, may have a higher power density as compared to the corresponding battery 102. However, while the capacitor module 502 may be charged and/or discharged more quickly than the corresponding battery 102, the capacitor module 102 may have a lower energy density as compared to the battery 102. As such, for the capacitor module 502 to have a corresponding energy density as compared to the corresponding battery 102, the capacitor module 502 will have to be physically much larger than the corresponding battery 102.

In some embodiments, the capacitor modules 502 may be used in combination with the battery 102. For example, as shown in FIG. 5, the BEV 500 may include one or more the capacitor modules 502 installed alongside the battery 102. In some embodiments, the BEV 500 includes a plurality of capacitor modules 502. In some embodiments, one or more batteries 102 are replaced with one or more capacitor modules 502. As shown, the capacitor modules 502 may be connected in series or in parallel with the battery 102, dependent on the use case. For example, the capacitor modules 502 may be connected in series or parallel with the battery 102 when supplementing the voltage in the battery 102 or when charging the battery 102 and/or the capacitor modules 502. Therefore, the battery 102 and the capacitor modules 502 may provide voltage support to each other. As such, the capacitor modules 502 may provide supplemental energy when the battery 102 are discharged or be used in place of the battery 102 altogether.

In some embodiments, the capacitor modules 502 provide a burst of energy on demand to the battery 102 or to the motor 104. For example, the capacitor modules 502 are coupled to the vehicle (or another) controller that monitors a charge level of the battery 102 and/or an energy demand of the motors 104. The controller may control coupling of the capacitor modules 502 to the battery 102 to charge the battery 102 with the burst of energy from the capacitor modules 502 when the charge level of the battery 102 falls below a threshold value or may couple the capacitor modules 502 to the battery 102 to supplement an output energy of the battery 102.

The deep cycle battery 504 may be disposed at any location in the BEV 500 such that the deep cycle battery 504 is electrically coupled to the capacitor modules 502, the battery 102, and the generators 302a and 302b. The deep cycle battery 504 (or the battery 102 or the capacitor module 502) may provide a sink or destination for excess energy generated by the generator 302a and 302b. For example, when the generators 302a and/or 302b generate energy and the capacitor modules 502 and the battery 102 are fully charged and/or otherwise unable to accept additional charge, the excess energy generated by the generators 302 and/or 302b may be stored in the deep cycle battery 504. This excess energy may then be fed back into the generators 302a and 302b or back into the battery 102 and/or the capacitor modules 502. In some embodiments, when excess energy overflows to the deep cycle battery 504, the deep cycle battery 504 provides backup power to the BEV 500 and/or provide power to any components of the BEV 500, for example providing starting assistance if needed. As such, the deep cycle battery 504 may be coupled to the battery 102 and the capacitor modules 502 in a reconfigurable manner such that the deep cycle battery 504 may be used for storage of the overflow energy but also be connected to provide power to the battery 102 and/or the capacitor modules 502. In some embodiments, the deep cycle battery 504 provides load balancing to the battery 102 and/or the capacitor modules 502. In some embodiments, the capacitor modules 502 and/or the deep cycle battery 504 feeds power back to the generators 302a and 302b and/or directly into one of the battery 102 and/or the capacitor modules 502. In some embodiments, the deep cycle battery 504 couples directly to a load of the BEV 500. Thus, in some embodiments, one or more components of the BEV 500 (for example, one or more motors 104, the drivetrain, auxiliary systems, heat, ventilation, and air conditioning (HVAC) systems, and so forth) receives power from one or more of the battery 102, the capacitor modules 502, and the deep cycle battery 504. In some embodiments, when the generators 302a and/or 302b generate energy and the battery 102 is fully charged and/or otherwise unable to accept additional charge and the motors 104 do not need any energy, the energy generated by the generators 302a and 302b may be excess energy. This excess energy may be stored in the capacitor module 502. This excess energy may then be fed back into the generators 302a and 302b or back into the battery 102 and/or the motor 104. In some embodiments, when excess energy overflows to the capacitor module 502, the capacitor module 502 provides backup power to the BEV 500 and/or provides power to any components of the BEV 500, for example providing starting assistance if needed.

The DC-to-DC converter 506 may provide energy conversion between the generators 302 and one or more of the capacitor modules 502 and the deep cycle battery 504. In some embodiments, the DC-to-DC converter 506 is integrated with the OBCS 210. For example, the DC-to-DC converter 506 is a component of the OBCS 210 that provides voltage conversion to charge the battery 102 and also charge the capacitor modules 502 and/or the deep cycle battery 504. In some embodiments, the deep cycle battery 504 and the capacitor modules 502 are not coupled to the OBCS 210 and instead receive their energy directly from the generators 302, for example via the DC-to-DC converter 506. In some embodiments, the DC-to-DC converter 506 may comprise one or more components in the charger 403.

As shown in FIG. 5, the various components of the BEV 500 are integrated such that power generated by the fifth wheel 202 or a similar energy generation, regeneration, or recovery system (for example, regenerative braking, solar panels, and so forth) is stored in any of the battery 102, the capacitor modules 502, and the deep cycle battery 504. In some embodiments, the deep cycle battery 504 and/or the capacitor modules 502 provide load balancing for the battery 102, and vice versa. As such, the deep cycle battery 504 and/or the capacitor modules 502 may be coupled (in a switchable manner) to both the output of the generators 302 (via the DC-to-DC converter 506 and/or the OBCS 210) and also the input of the generators 302. Alternatively, the deep cycle battery 504 and/or the capacitor module 502 couples (in a switchable manner) to both the output of the battery 102 and also the input of the battery 102. In some embodiments, the outputs of the deep cycle battery 504 and the capacitor modules 502 couple with the generators 302a and 302b to ensure that the battery 102 is charged with a sufficient voltage level.

Figure 17A:
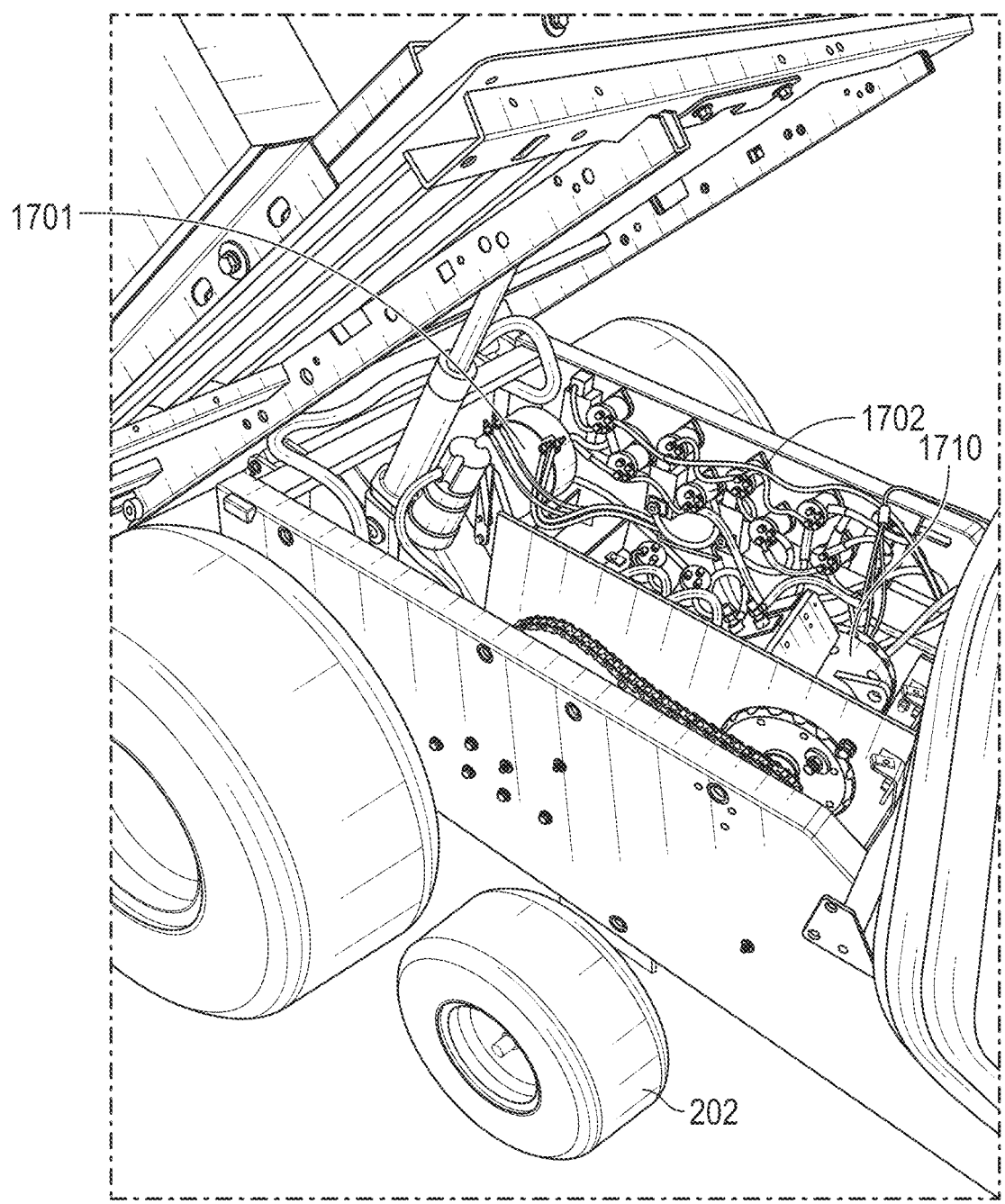
FIGS. 17A and 17B illustrate an example of an electric vehicle including an energy storage system that includes an ultracapacitor storage bank.
Figure 17B:
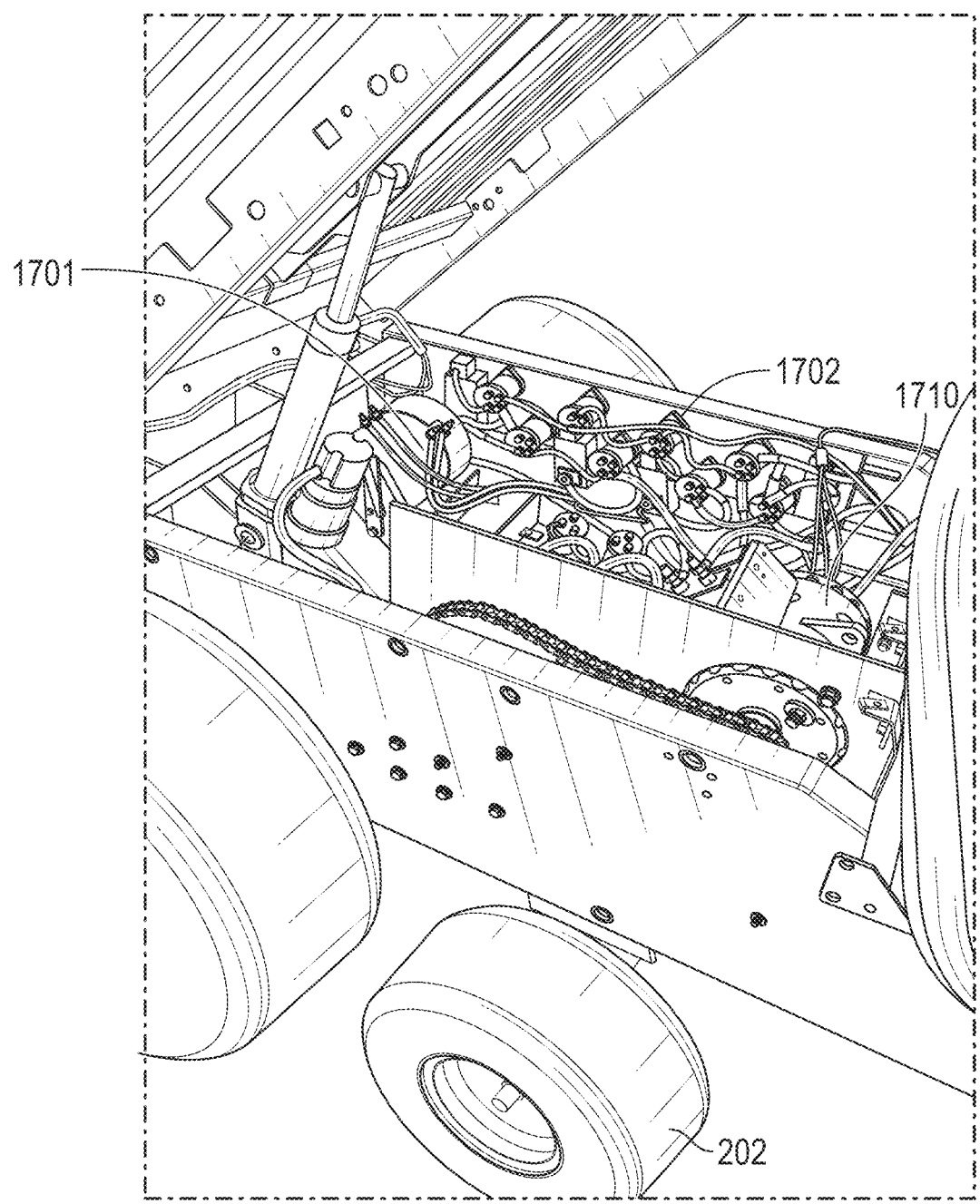

FIGS. 17A-17B illustrate an example embodiment of an energy storage system of an electric vehicle. The energy storage system may be incorporated into, or implemented by, the chargers and/or other energy storage systems described herein. The energy storage system may comprise an ultracapacitor storage bank 1702 and, optionally, a battery storage device. The ultracapacitor storage bank 1702 may comprise a plurality of ultracapacitors, or supercapacitors, such as the capacitor modules 502 described elsewhere herein. Ultracapacitors and supercapacitors may be used interchangeably herein and may include a high-capacity capacitor as would be understood by one of ordinary skill in the art. The ultracapacitors may be arranged as one or more arrays or groups of ultracapacitors or capacitor modules that are electrically coupled to each other and operate collectively or that are not electrically coupled to each other and operate independently. The arrays or groups may be arranged on the same electrical substrate or circuit boards or on different electrical substrates or circuit boards. The ultracapacitors (independently or as an integrated system) may be operatively connected (e.g., electrically coupled) to components of the energy storage system or energy or power generation devices (e.g., a generator 1701 (which may incorporate structural and functional features of the generators described herein, such as generators 302), a motor 1710 (which may incorporate structural and functional features of the motors described herein, such as motor 104). In accordance with several embodiments, the energy storage system may advantageously not comprise lithium ion batteries.

The ultracapacitor storage bank 1702 may be electrically coupled to one or more generators (e.g., generator 1701 illustrated in FIG. 17A). Energy generated at the generator 1801, for example by rotation of the fifth wheel 202 as described elsewhere in conjunction with fifth wheel systems herein, may be provided to the ultracapacitor storage bank 1702. For example, the fifth wheel 202 may generate energy to charge one or more ultracapacitors of the ultracapacitor storage bank 1802 (e.g., as the fifth wheel 202 rotates at over 5000 RPM even at relatively low speeds). Energy provided to the ultracapacitor storage bank 1702 may charge each of the one or more ultracapacitors of the ultracapacitor storage bank 1702. The one or more ultracapacitors may be charged simultaneously or sequentially. The ultracapacitors may be charged in an order that is determined based in part on their existing charge level. For example, an ultracapacitor that has the lowest charge level may be charged first and then proceed to the ultracapacitor with the next lowest charge level, and so on. Each ultracapacitor may be fully charged or charged to a certain threshold charge level before proceeding on to the next ultracapacitor.

The ultracapacitor storage bank 1702 may provide energy to a battery and/or the motor 1710 of the electric vehicle. The plurality of ultracapacitors may be in direct electrical connection with the motor 1710 of the vehicle. In some embodiments, the battery (e.g., battery 102 as described herein) provides energy to the motor 1710 of the vehicle only upon starting the vehicle. The plurality of ultracapacitors may provide energy to the motor 1710 simultaneously or singly (e.g., independently). For example, one ultracapacitor may provide energy to the motor 1710 while one or more other ultracapacitors are not providing energy to the motor 1710. The ultracapacitor storage bank 1702 may include electrical circuit switches that toggle on and off electrical coupling of the respective ultracapacitors between an active energy delivery state and a charging or energy storage state. In some embodiments, the switches are automatically controlled based on charge levels. In some embodiments, the switches are controlled via the selectors 1802 described below in connection with FIG. 18.

Figure 18:
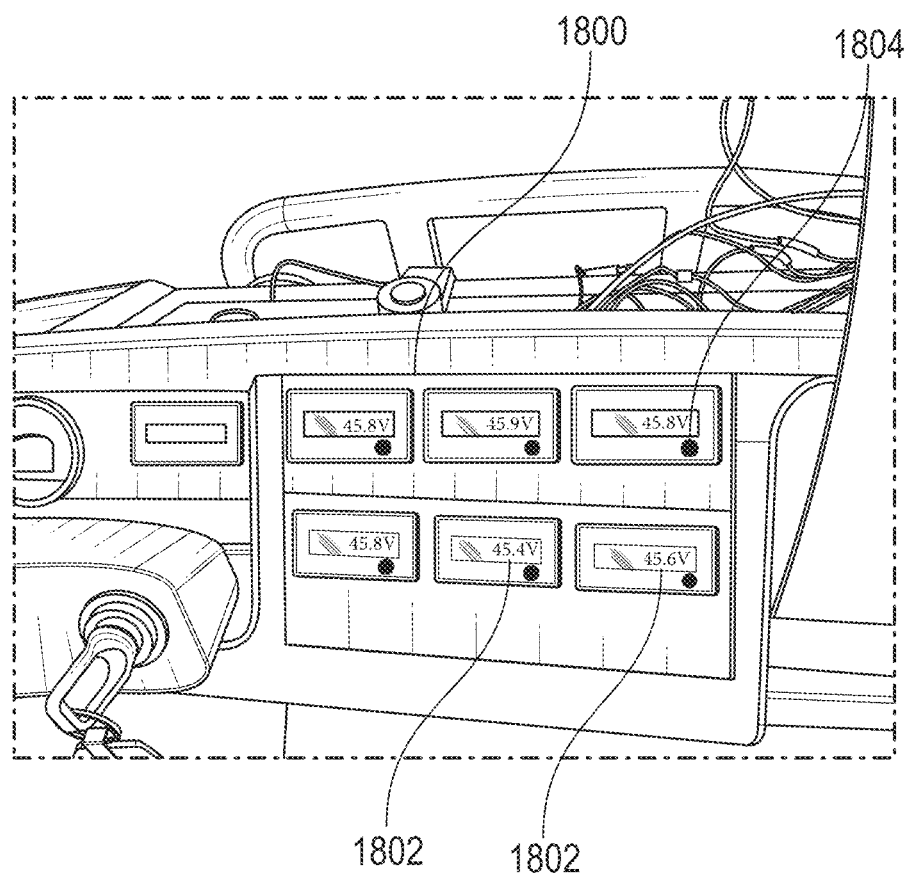
FIG. 18 illustrates an example of a dashboard configured for use in conjunction with the energy storage system of FIGS. 17A and 17B.

FIG. 18 illustrates an example dashboard 1800 that may be used in conjunction with the ultracapacitor storage bank 1702. The dashboard 1800 may include one or more displays 1802. The dashboard 1800 may be in electrical connection with the ultracapacitor storage bank 1702, for example the dashboard 1800 may be electrically connected to each of the ultracapacitors.

The dashboard 1800 may monitor a charge level of each of the one or more ultracapacitors of the ultracapacitor storage bank 1702. The dashboard 1800 may display a charge level of each of the one or more ultracapacitors of the ultracapacitor storage bank 1702 on respective displays 1802. In some embodiments, each display 1802 of the dashboard 1800 displays the charge level of a unique ultracapacitor of the ultracapacitor storage bank 1702. In some embodiments, the display 1800 alternatively or additionally displays an overall charge level of the ultracapacitor storage bank 1702.

The dashboard 1800 may include one or more selectors 1804 which may be configured for operation by a user. Each selector 1804 may be associated with a unique ultracapacitor of the ultracapacitor storage bank 1702. Selection of a selector 1804 may cause the ultracapacitor with which it is associated to provide energy to the battery (e.g., battery 102) and/or motor (e.g., motor 1710 or motor 104) of the vehicle. In some embodiments, an ultracapacitor will not provide energy to the battery and/or motor of the vehicle unless its associated selector 1804 has been selected. For example, a user may visualize the charge level (e.g., voltage level) of each ultracapacitor of the ultracapacitor storage bank 1702 via the displays 1802 of the dashboard 1800. The displays may also indicate a total capacity level in addition to a current charge level (e.g., voltage level). The user may then select, via the selectors 1804, which ultracapacitor is to provide energy to the battery and/or motor of the vehicle. The selectors 1804 may be any device suitable for user interaction such as a capacitive touchscreen, an electrical touchscreen, an electromechanical button, a switch, and/or the like. The selectors 1804 may alternatively or additionally comprise visible indicators (e.g., LED indicators) indicative of whether a particular ultracapacitor is in an active configuration (in which energy is being provided by the ultracapacitor to the vehicle) or a charging or storage configuration in which energy is not being provided by the ultracapacitor to the vehicle).

In some embodiments, the dashboard 1800 may be configured to select which ultracapacitor is to provide energy to the battery and/or motor of the vehicle. This selection may be automatic instead of manually actuated by a user activating selectors 1804 and may be based, at least in part, on the relative charge levels of each of each of the ultracapacitors. For example, the dashboard 1800 may automatically select the ultracapacitor with the highest charge level to provide energy to the battery and/or motor of the vehicle. The active ultracapacitor providing the energy may be automatically switched over time as the charge level of the ultracapacitors is drained. The other ultracapacitors may be charged while the active ultracapacitor is being drained.

Figure 19:
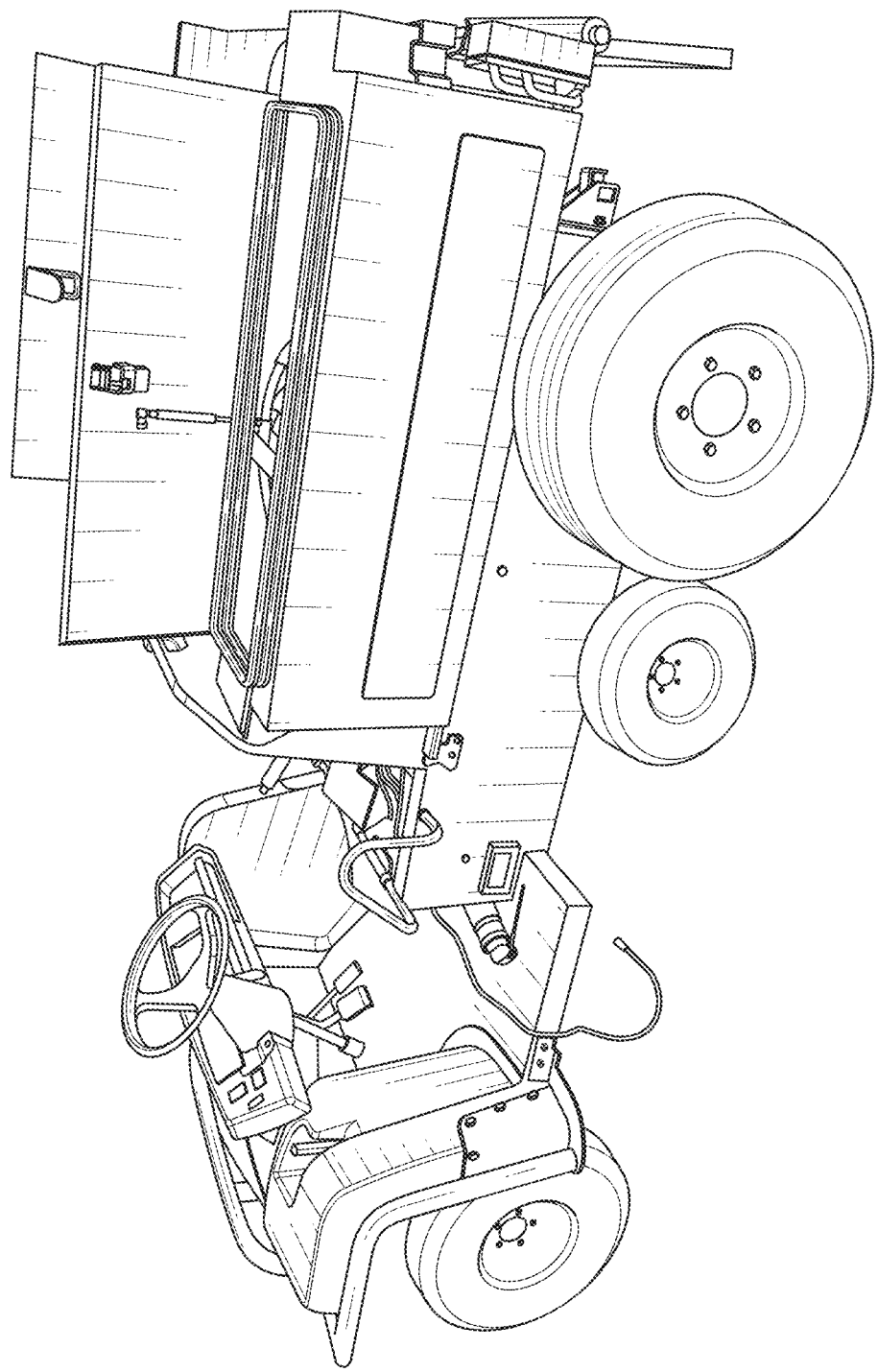
FIG. 19 illustrates an example of a piece of farm equipment that may implement the energy storage system and dashboard of FIGS. 17A, 17B, and 18.

FIG. 19 illustrates an example vehicle in which the example energy storage system described in connection with FIGS. 17A, 17B and 18 may be implemented. For example, the energy storage system may be implemented in a piece of farm equipment such as a tractor, utility vehicle, or hauler. The energy storage system may be implemented in any type of electric vehicle (such as any of the vehicles or transportation equipment described herein, including but not limited to, commercial trucks for hauling goods, semi-trucks, tractor trailers, aircraft, watercraft, passenger vehicles, automobiles, trains, trams, trolleys, buses, golf carts, electric bicycles, electric scooters, electric motorcycles, etc.) and FIG. 19 is not meant to be limiting.

Figure 20A:
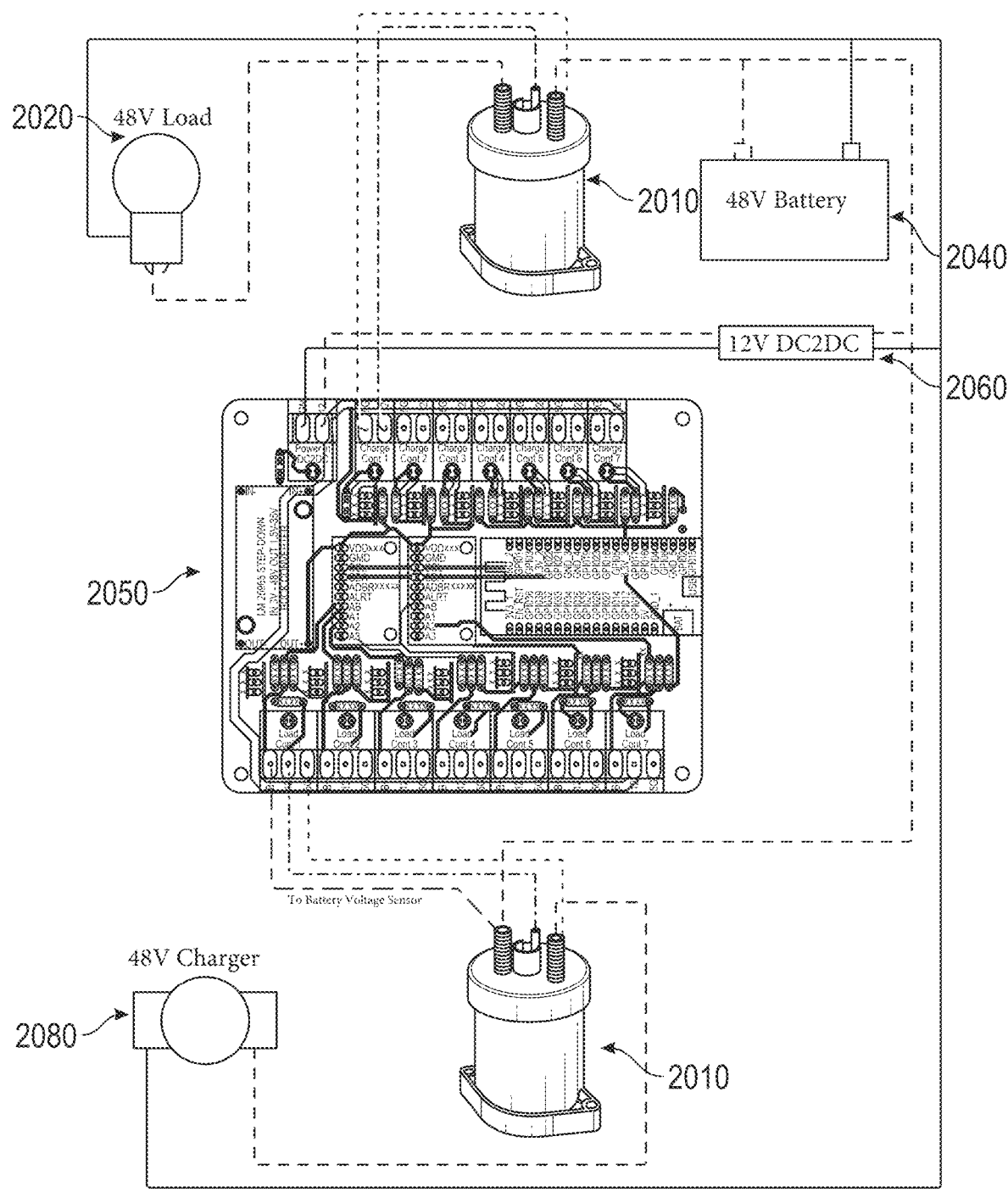
FIGS. 20A-20B illustrate an example circuit diagram for controlling energy flow between a charger, one or more ultracapacitors, a battery and a load.

FIG. 20A illustrates a schematic circuit diagram of an example embodiment of an OBCS 210 and energy storage system of an electric vehicle. The OBCS 210 and energy storage system shown in FIG. 20A may be incorporated into, or implemented by, the other OBCS and/or other energy storage system embodiments described herein. The OBCS 210 and energy storage system may comprise one or more ultracapacitors 2010, a load 2020, a battery storage device 2040, a DC-to-DC converter 2060, a circuit board 2050, a charger 2080 and a battery voltage sensor.

The one or more ultracapacitors 2010 may comprise ultracapacitors and/or supercapacitors such as the capacitor modules 502 described elsewhere herein. The one or more ultracapacitors 2010 may be electrically coupled to the circuit board 2050 and the charger 2080. The charger 2080 may provide energy to the one or more ultracapacitors 2010. Energy provided to the one or more ultracapacitors 2010 from the charger 2080 may charge the one or more ultracapacitors 2010.

The load 2020 may be electrically coupled to the one or more ultracapacitors 2010 and to the battery 2040. The load 2020 may comprise a motor of an electric vehicle. The one or more ultracapacitors 2010 and/or the battery 2040 may provide energy to the load 2020.

The battery 2040 may be electrically coupled to the charger 2080. The charger 2080 may provide energy to the battery 2040. Energy provided to the battery 2040 from the charger 2080 may charge the battery 2040. The battery 2040 may be electrically coupled to the one or more ultracapacitors 2010. The battery 2040 may provide energy to the one or more ultracapacitors 2010 to charge the one or more ultracapacitors 2010. The one or more ultracapacitors 2010 may provide energy to the battery 2040 to charge the battery 2040.

The DC-to-DC converter 2060 may be electrically coupled to the circuit board 2050 and to the battery 2040. The DC-to-DC converter 2060 may provide energy conversion between the circuit board 2050 and the battery 2040.

The example OBCS 210 and energy storage system shown in FIG. 20A may further comprise a battery voltage sensor. The battery voltage sensor may be electrically coupled to the one or more ultracapacitors 2010 and/or the battery 2040. The battery voltage sensor may sense the voltage level of the battery 2040 and/or the one or more ultracapacitors 2010. In some embodiments, the circuit board 2050 may comprise the battery voltage sensor.

Figure 20B:
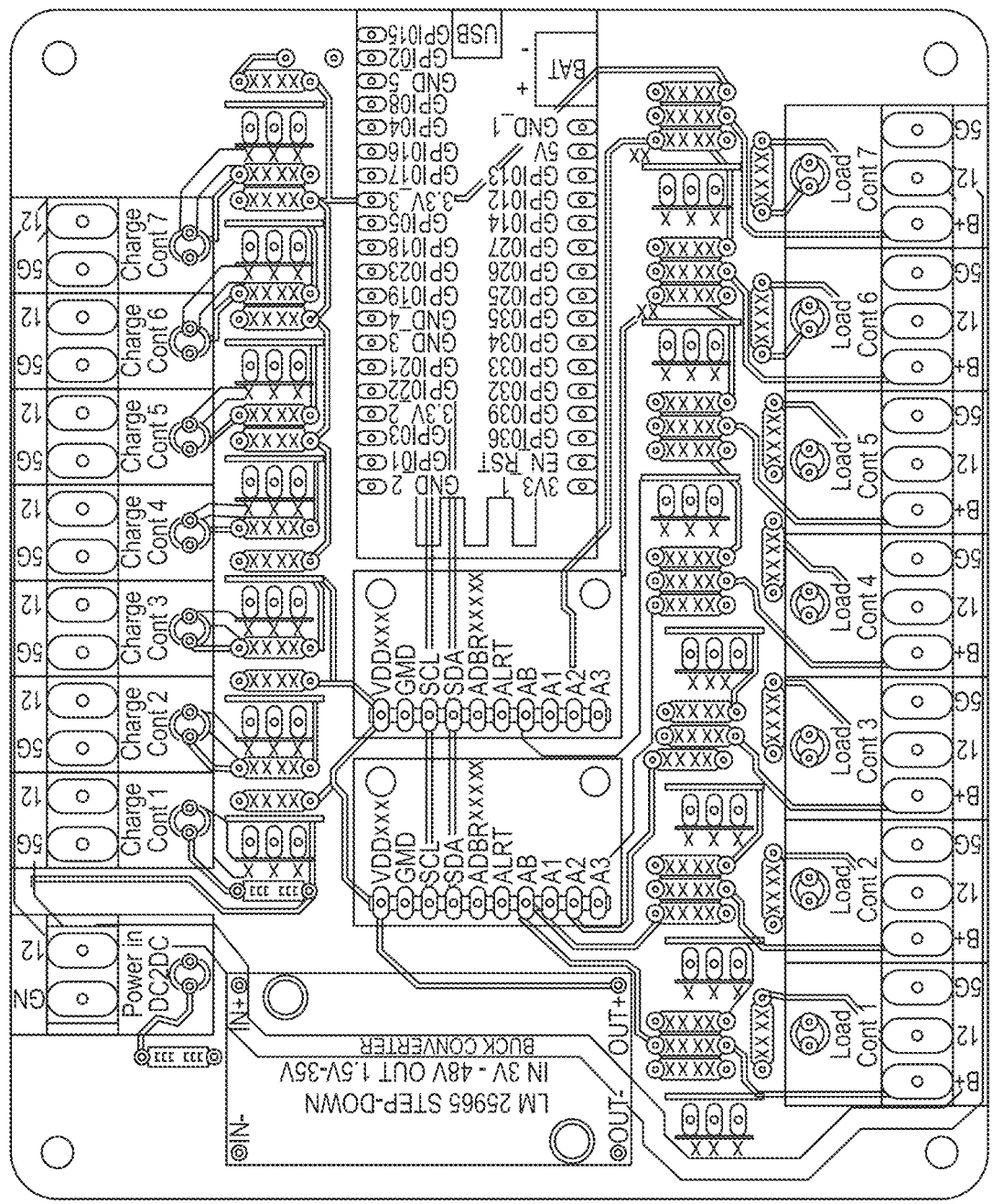

FIG. 20B illustrates an example embodiment of the circuit board 2050 described with reference to FIG. 20A. The circuit board 2050 may comprise a printed circuit board. The circuit board 2050 may control operations of the OBCS 210 and energy storage system shown in FIG. 20A as described herein.

Figure 21:
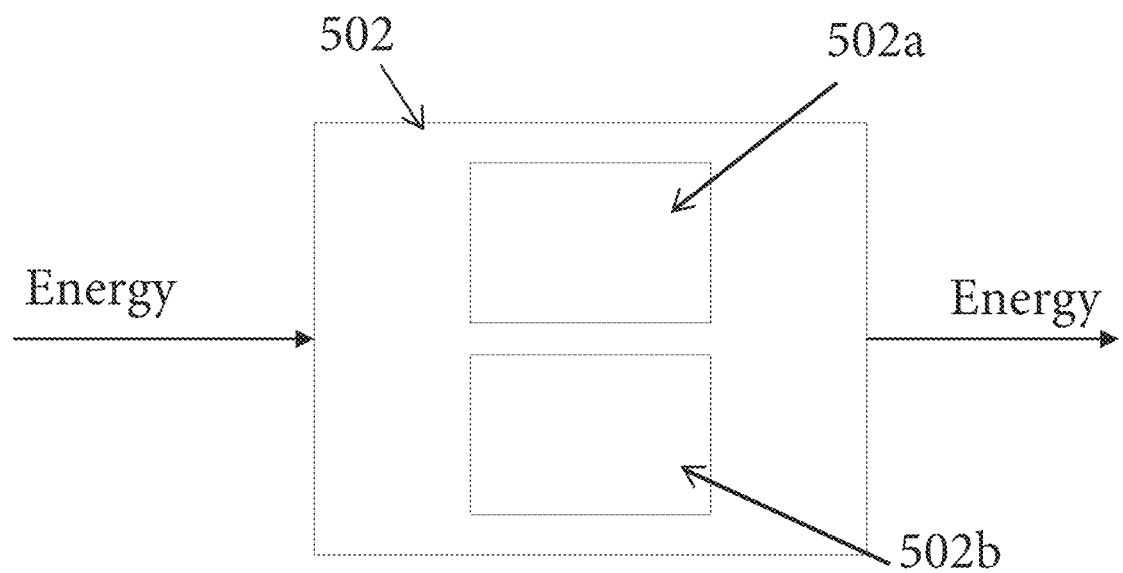
FIG. 21 illustrates an example embodiment of a capacitor module that can be used to store energy of a BEV.

FIG. 21 illustrates an example embodiment of capacitor module 502 which may incorporate structural and functional features of other capacitor embodiments described herein. The capacitor module 502 may be configured to receive energy, such as from a generator of the charging system as described herein. The capacitor module 502 may be configured to convey energy such as to a battery 102 and/or to a motor 104 of the vehicle as described herein.

As show in FIG. 21, capacitor module 502 may comprise a first plurality of capacitors 502a and a second plurality of capacitors 502b. Each of the first and second plurality of capacitors, 502a, 502b may comprise one or more capacitors, such as ultracapacitors and/or supercapacitors, such as described herein.

In some embodiments, the first and second plurality of capacitors 502a,b may each be capable of receiving energy, for example from a generator of the charging system as described herein, and as a result may increase in charge. The first and second plurality of capacitors 502a,b may each be capable of conveying energy, for example, to a battery to charge the battery and/or to a motor of the vehicle. In some embodiments, the first plurality of capacitors 502a may not receive energy at the same time as conveying energy. In some embodiments, the second plurality of capacitors 502b may not receive energy at the same time as conveying energy. In some embodiments, the first plurality of capacitors 502a may alternate between receiving energy and conveying energy. In some embodiments, the second plurality of capacitors 502b may alternate between receiving energy and conveying energy. In some embodiments, the first plurality of capacitors 502a may receive energy, while the second plurality of capacitors 502b conveys energy and the second plurality of capacitors 502b may receive energy, while the first plurality of capacitors 502a conveys energy. In some embodiments, the first and second plurality of capacitors 502a,b may alternate between receiving and conveying energy based, at least in part, on a charge and/or voltage level of the first and/or second plurality of capacitors 502a,b reaching a low threshold.

Figure 6:
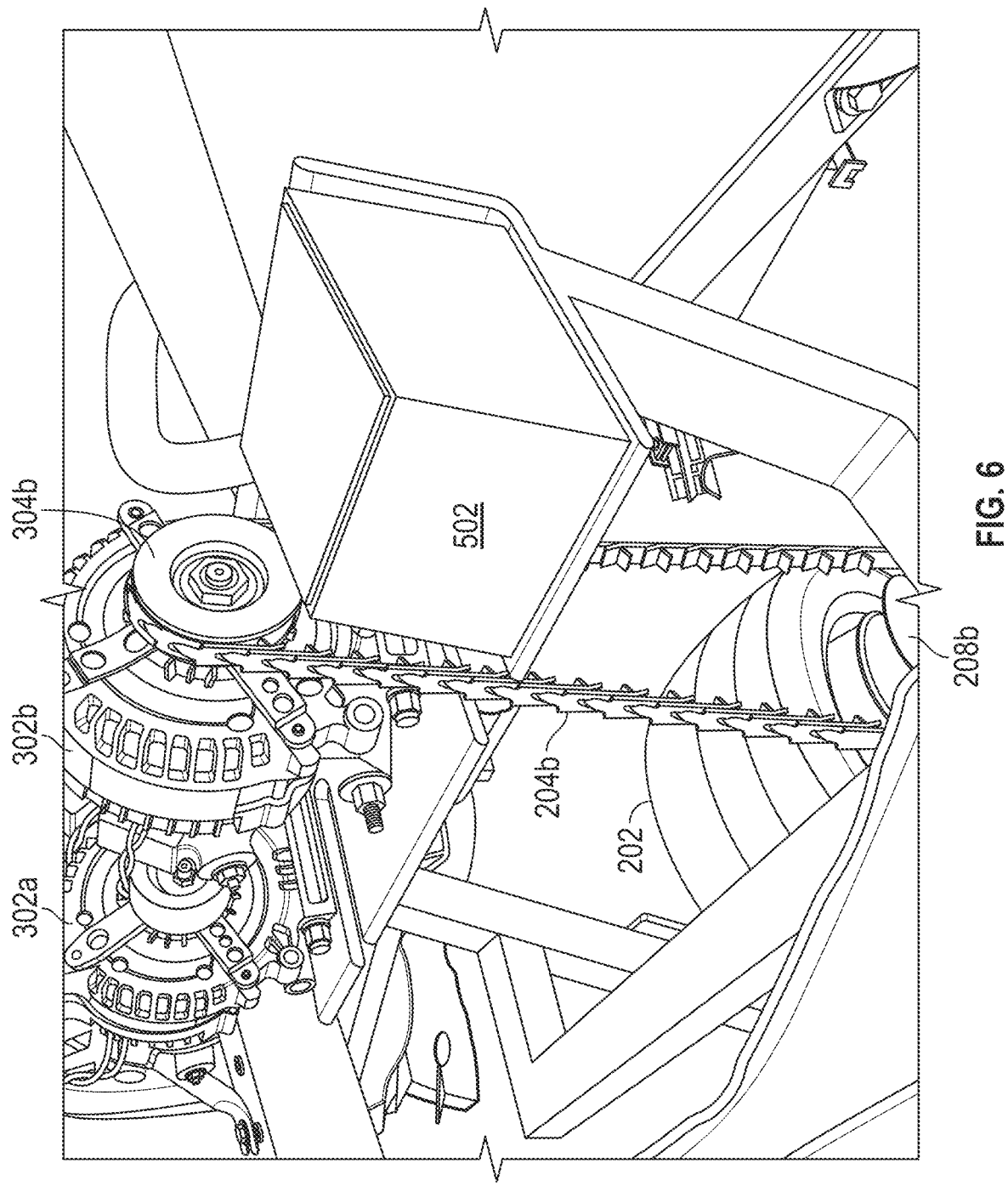
FIG. 6 is a diagram of the coupling of the fifth wheel and the two generators of FIG. 3 with the addition of a capacitor module into the charging system of the BEV.

FIG. 6 is a diagram of the coupling of the fifth wheel 202 and the two generators 302a and 302b of FIG. 3 with the addition of a capacitor module 502 into the charging system of the BEV 100/500. As shown, one or more of the capacitor modules 502 described above may be located and/or positioned as shown in FIG. 6. As described herein, the capacitor module 502 may be used to store energy for delivery to the battery 102 or the motor 104.

Figure 7:
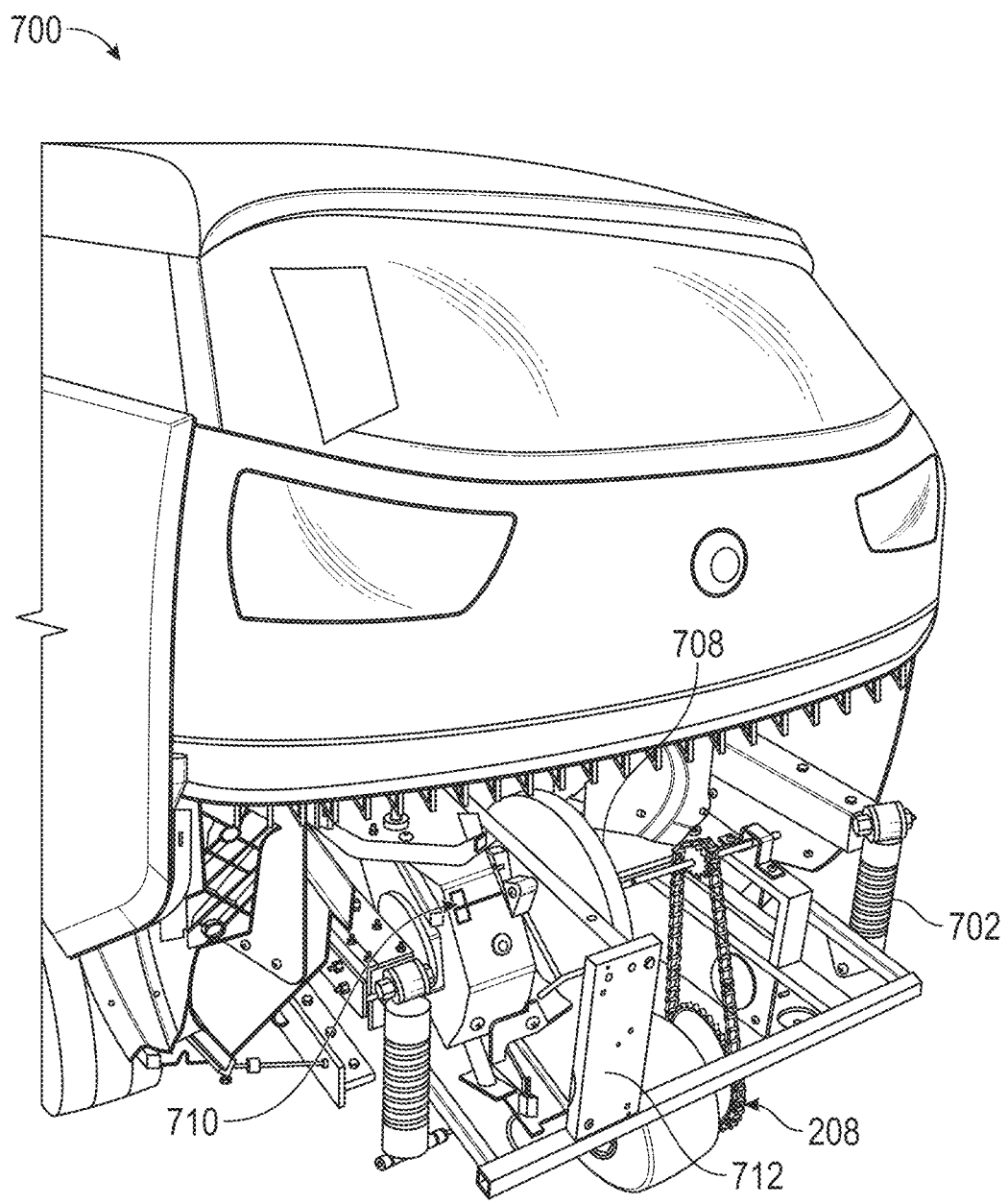
FIG. 7 is an alternate fifth wheel system illustrating the fifth wheel of FIG. 2 mechanically coupled to a generation unit that converts a mechanical rotation of the fifth wheel into an electrical energy output.

FIG. 7 is an alternate fifth wheel system 700 illustrating the fifth wheel of FIG. 2 mechanically coupled to a generation unit 710 that converts a mechanical rotation of the fifth wheel into an electrical energy output to the BEV 100, for example the battery 102 or the capacitor module 502. In some embodiments, the OBCS 210 described herein comprises the generation unit 710 (for example, instead of or in addition to the generators 302a and 302b described above). The generation unit 710 and the generators 302a and 302b may be used interchangeably herein. In some embodiments, the generation unit 710 may be directly coupled to the battery 102, the capacitor module 502, and/or the motor 104. The system 700 includes the fifth wheel 202 as supported by the support structure 200 as shown in FIG. 2. In some embodiments, the support structure 200 includes an independent suspension system 702 that enables the fifth wheel 202 and the corresponding components coupled to the fifth wheel 202 to move vertically and/or horizontally relative to the ground or the road surface or the BEV 100 to react or respond to variations in the road or road surface. The independent suspension 702 may operate independently of the suspension of the BEV 100, thus allowing the fifth wheel 202 and corresponding components to move differently from the BEV 100, allowing the fifth wheel system 700 to "float freely" relative to the BEV 100. The independent suspension 702 may help protect the components coupled to the fifth wheel 202 (for example, the components shown in FIG. 7) by reducing the effects of the variations in the road or road surface to the components. In some embodiments, the independent suspension 702 includes one or more shocks, struts, linkages, springs, shock absorbers, or similar components that help enable, compensate for, and/or reduce the vertical and/or horizontal movement of the fifth wheel 202 and coupled components. In some embodiments, the independent suspension 702 also includes various components that improve stability of the components of the OBCS 210 described herein. For example, the independent suspension 702 may include a stabilization bracket 712 disposed between a flywheel 708 and a generation unit 710, described in more detail below. The stabilization bracket 712 disposed between the flywheel 708 and the generation unit 710 may provide stabilizing supports between two components that move or have moving parts. The generation unit 710 may include the generator 302 described above or an alternator or any corresponding component(s) that generate electricity from mechanical energy. The generation unit 710 may harvest the mechanical/kinetic energy from the movement of the BEV 100 (or from the inertia caused by the movement of the BEV 100) prior to a build-up of friction or heat or other conditions that may otherwise cause energy to be lost by the BEV 100 (for example, to the heat or other conditions), thereby saving and storing energy that would otherwise be lost or wasted.

The alternate system 700 further may include the fifth wheel 202 configured to rotate or spin on the shaft 206. As described above, the rotation of the fifth wheel 202 causes the shaft 206 to rotate and further causes the sprocket 208 and chain 204 to rotate. The chain 204 is coupled to a second shaft 704, for example via a second pulley or sprocket 709 rotated by the chain 204. In some embodiments, the shaft 206 is coupled to the second shaft 704 via another means, for example a direct coupling, a geared coupling, and so forth. In some embodiments, the sprockets 208 and 709 (or similar components) and so forth may be sized to allow for balancing of rotational speeds between the various components. For example, the sprockets 208 on the shaft 206 and corresponding sprockets or gearing on the second shaft 704 are sized to balance rotations between the fifth wheel 202 and the generation unit 710. In some embodiments, the sizing for the sprockets 208 and 709 (and similar components) is selected to control the electricity generated by the generation unit 710.

In some embodiments, the second shaft 704 includes a one-way bearing 706 (shown in FIG. 8A) or similar component that allows a first portion of the second shaft 704 to rotate at least partially independently of a second portion of the second shaft 704. The first portion of the second shaft 704 may be mechanically coupled to the shaft 206 (for example, via the chain 204, the sprocket 709, and the sprocket 208 or another mechanical coupling means). The second portion of the second shaft 704 may be mechanically coupled to the flywheel 708 or other mass and further coupled to the generation unit 710. The flywheel 708, as described above, may be configured to store kinetic energy generated by the rotation of the fifth wheel 202 and the second shaft 704. The generation unit 710 may convert the mechanical kinetic energy of the flywheel 708 into electrical energy for storage in the battery 102, capacitor module 502, or other energy storage device or conveyance to the motor 104 of FIG. 1.

The one-way bearing 706 may enable the first portion of the second shaft 704 to cause the second portion rotate while preventing the second portion from causing the first portion to rotate. Thus, the fifth wheel 202 may cause the flywheel 708 to rotate but the rotation of the flywheel 708 may have no impact on the rotation or movement of the fifth wheel 202, the shaft 206, and the sprocket 208, and the chain 204. Furthermore, due to the one-way bearing 706, the flywheel 708 continues to rotate even if the fifth-wheel 202 slows or stops rotating. In some embodiments, the flywheel 708 includes a mass of approximately 25 kilograms (kg). This mass may vary based on the specifics of the BEV 100 and the generation unit 710. For example, the flywheel 708 can have a mass of as little as 15 kg or as much as 75 kg, as described above. The mass of the flywheel 708 may allow the inertia of the rotating flywheel 708 to continue rotating when the fifth-wheel 202 slows or stops. The inertia may cause the flywheel 708 to rotate with sufficient speed and/or duration to cause the generation unit 710 to generate more than an unsubstantially amount of electrical energy. For example, the flywheel 708 mass of approximately 25 kg allows the flywheel 708 to continue rotating for a number of minutes after the fifth wheel 202 stops rotating. For example, if the fifth wheel 202 slows to a stop from a speed of rotating at approximately 60 miles per hour (mph) in thirty seconds, the inertia of the flywheel 708 may allow the flywheel 708 to continue to rotate for an additional five to ten minutes (for example, enabling the flywheel 708 to slow to a stop from the speed of 60 mph in the five or ten minutes). Thus, the inertia of the rotating flywheel 708 may enable the generation unit 710 to continue to generate electrical energy at a greater rate for a longer period of time than if the generation unit 710 is directly coupled to the fifth wheel 202. In some embodiments, the mass of the flywheel 708 may be selected based on a desired time for the flywheel 708 to continue to rotate after the fifth wheel 202 stops rotating. For example, if the flywheel 708 is to continue rotating for thirty minutes after the fifth wheel 202 stops rotating, then the flywheel 708 may be given a mass of 50 kg. In some embodiments, the one-way bearing 706, the second shaft 704, and the flywheel 708 are designed and assembled such that friction and/or other resistance to the rotation of these components is minimized or reduced to enable a maximum amount of kinetic energy from the rotation of the fifth wheel 202 to be converted into electrical energy by the generation unit 710.

Thus, the use of the one-way bearing 706 may enable the generation unit 710 to continue to generate electricity for the battery 102, the capacitor module 502, and/or the motor 104 when the BEV 100 slows or comes to a physical stop (for example, when the BEV slows its momentum or stops moving). The one-way bearing 706 may include a first side that rotates or spins independently of a second side. The first and second sides may be coaxial. The flywheel 708 may be connected on the first side of the one-way bearing 706 and the first portion of the second shaft 704 may be connected on the second side of the one-way bearing 706. Thus, the generation unit 710 may continue to generate electrical energy at a high rate even as the BEV 100 slows or is stopped. In some embodiments, the second shaft 704 includes multiple one-way bearings 706 that allow the second shaft 704 to support multiple flywheels 708 that can independently drive one or more generation units 710, thereby allowing the inertia of the flywheels 708 to generate larger amounts of electrical energy (not shown these figures).

In some embodiments, instead of or in addition to the second shaft 704 including the first portion and the second portion, the one-way bearing 706 couples directly to the flywheel 708 which is coupled directly to the generation unit 710. Thus, the second shaft 704 may include a single portion where the one-way bearing 706 allows the directly coupled flywheel 708 to continue rotating even when the fifth wheel 202 slows or is not rotating. As the flywheel 708 is directly coupled to the generation unit 710, the generation unit 710 is also able to continue generating the electrical energy based on the rotation of the flywheel 708 when the fifth wheel 202 slows or stops rotating. Further details of how the flywheel 708 and the generation unit 710 are coupled are provided below.

The generation unit 710 may be electrically coupled to a capacitor (for example, one of the capacitor modules 502), the battery 102, the motor 104, and/or a cut-off switch. The cut-off switch may disconnect the output of the generation unit 710 from the capacitor, the battery 102, and/or the motor 104 such that electrical energy generated by the generation unit 710 may be transferred to the battery 102, the capacitor module 502, or to the motors 104 as needed. In some embodiments, the cut-off switch can be controlled by an operator or the controller of the BEV 100 or the second controller of the OBCS 210. For example, the controller of the BEV 100 or the OBCS 210 may receive, identify, and/or determine an interrupt signal to initiate the dump. In response to the interrupt signal, the controller may disconnect the output of the generation unit 710 from the battery 102, the capacitor module 502, and/or the motor 104. Disconnecting the output of the generation unit 710 from the capacitor, the battery 102, and/or the motor 104 may ensure that any residual electrical energy in one or more components of the OBCS 210 (for example, the generation unit 710) is transferred or "dumped" to the battery 102 and/or the capacitor module 502 and therefore control a supply of back-up high voltage. In some embodiments, during the dump, the output of the generation unit 710 may be connected to a dump load or similar destination when disconnected from the capacitor module 502, the battery 102, and/or the motor 104 to prevent damage to any coupled electrical components. In some embodiments, the dump load may comprise a back-up battery, capacitor, or similar energy storage device. In some embodiments, the voltage dump may occur for a period of time and/or at periodic intervals defined by one or more of a time for example since a previous dump, a distance traveled by the vehicle for example since the previous dump, a speed of the vehicle for example since the previous dump, and a power generated and/or output by the generation unit 710, for example since the previous dump. After the dump is complete (for example, the period of time expires), then the controller may disconnect the dump load from the generation unit output (for example, at a generation unit terminal) and reconnect the battery 102, the capacitor module 502, and the motor 104.

In some embodiments, the voltage dump may comprise opening a contactor that is positioned downstream of the generation unit 710 or the generators 302. Opening the contactor may disconnect the generation unit 710 or the generators 302 from the downstream components (for example, the load components for the generation unit 710 or the generators 302). In some embodiments, the controls for initiating and/or deactivating the dump are conveniently located for the vehicle operator to access or coupled to the controller for the BEV 100.

In some embodiments, the generation unit 710 outputs the generated electrical energy in pulses or with a constant signal. For example, the operator or the controller of the BEV 100 or the second controller of the OBCS 210. In some embodiments, the generation unit 710 is switchable between outputting the electrical energy in pulses or in the constant signal. The operator may control whether the output is pulsed or constant or the OBCS 210 may automatically control whether the output is pulsed or constant without operator intervention based on current demands of the BEV 100 and so forth. In some embodiments, when the output is pulsed, the operator and/or the OBCS 210 can control aspects of the pulsed signal, including a frequency of the pulse, an amplitude of the pulse, a duration of each pulse, and so forth. Similarly, when the output is constant, the operator and/or the OBCS 210 may control aspects of the constant signal, including a duration of the signal and an amplitude of the signal.

In some embodiments, the operator of the BEV 100 can control the height of the fifth wheel 202. For example, the operator determines when to lower the fifth wheel 202 so that it is in contact with the road or a road surface, thereby causing the fifth wheel 202 to rotate. The operator may have controls for whether the fifth wheel 202 is in a raised position, where it is not in contact with the road, or in a lowered position, where it is in contact with the road. Additionally, or alternatively, the operator may have options to control specifics of the raised or lowered position, for example how low to position the fifth wheel 202. Such controls may allow the operator to control the amount of force that the fifth wheel 202 provides on the road or road surface, which may impact the electrical energy generated by the OBCS 210. For example, when the fifth wheel 202 is pressing down on the road surface with a large amount of force, then this force may create more resistance against the fifth wheel 202 rotating when the BEV 100 is moving, thereby reducing the electrical energy generated by the OBCS 210. On the other hand, when the force on the fifth wheel 202 is small amount of force, then the fifth wheel 202 may lose contact with the road or road surface depending on variations in the road surface, thereby also reducing the electrical energy generated by the OBCS 210. Thus, the controls may provide the operator with the ability to tailor the downward force exerted by the fifth wheel 202 on the road based on road conditions and based on the need for power. In some embodiments, the OBCS 210 may automatically control the force of the fifth wheel 202 on the road to maximize electrical energy generation based on monitoring of the road surface and electrical energy being generated.

Additionally, the operator of the BEV 100 may choose to extend the fifth wheel 202 so that it contacts the road or retract the fifth wheel 202 so that it does not contact the road based on draft or drag conditions. For example, if the drag increases or is expected to increase based on various conditions, the operator may choose to retract the fifth wheel 202 or keep the fifth wheel 202 retracted. If the drag decreases or is expected to decrease based on conditions, then the operator may choose to extend the fifth wheel 202 or keep it extended. In some embodiments, the OBCS 210 may automatically extend and/or retract the fifth wheel 202 based on drag or potential drag conditions without the operator's involvement.

Figure 8B:
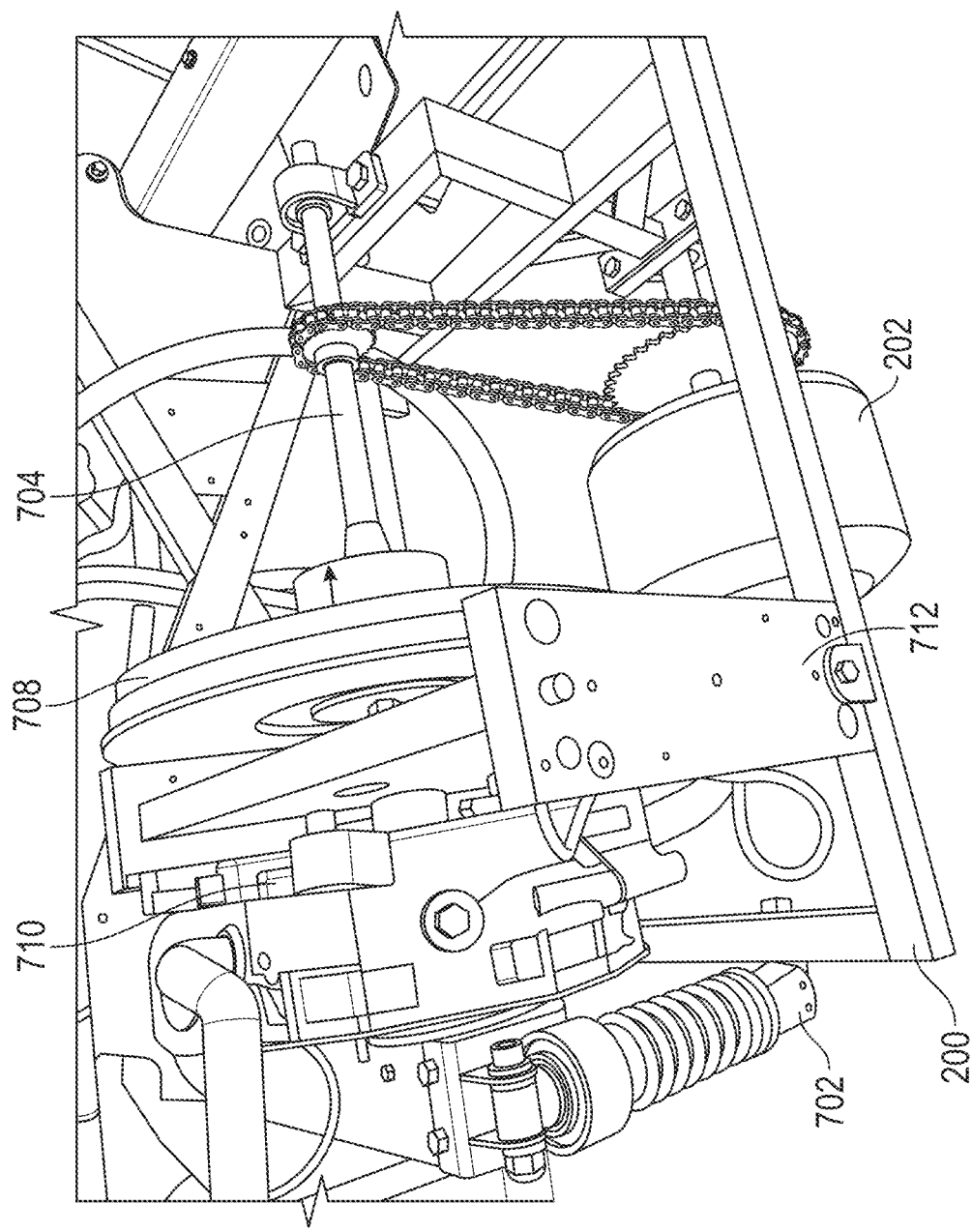

FIGS. 8A and 8B provide additional views of the alternate fifth wheel system 700 of FIG. 7. The additional views show details regarding the stabilization bracket 712 disposed between the flywheel 708 and the generation unit 710. In some embodiments, the stabilization bracket 712 bolts to the support structure 200 described herein. As the support structure 200 includes the independent suspension 702, the stabilization bracket 712 may be protected from sudden movements of the fifth wheel 202. The stabilization bracket 712 may provide support for one or both of the flywheel 708 and the generation unit 710. For example, a drive shaft or similar component may pass from the flywheel 708 to the generation unit 710 through the stabilization bracket 712. For example, the generation unit 710 includes an axle or input shaft that, when rotated, causes the generation unit 710 to generate an electrical energy output relative to the rotation of the input shaft. The input shaft of the generation unit 710 may pass into and through the stabilization bracket, as shown in further detail with respect to FIG. 9. The flywheel 708 may be directly disposed on the input shaft of the generation unit 710 or may otherwise couple to the input shaft of the generation unit 710 such that rotation of the flywheel 708 causes the input shaft to rotate. Due to the one-way bearing 706, the flywheel 708 continues to rotate even if the fifth-wheel 202 slows or stops rotating.

For example, a weight of the flywheel 708 may produce a downward force on the second shaft 704 and the one-way bearing 706. The stabilization bracket 712 may provide dual purposes of relieving some of the force on the one-way bearing 706 and the second shaft 704, thereby extending the operating lives of one or both of the one-way bearing 706 and the second shaft 704 as well as reducing vibrations, etc., of the generation unit 710, the flywheel 708, the one-way bearing 706, and the second shaft 704. The stabilization bracket 712 may keep these components from shaking during rotation, thereby providing improve stability of the support structure 200 as a whole. In some embodiments, the stabilization bracket 712 includes a hole through which the input shaft of the generation unit 710 passes. The hole may include a bearing or similar component that supports the input shaft passing through the hole while also reducing or minimizing drag or friction on the input shaft.

Figure 9:
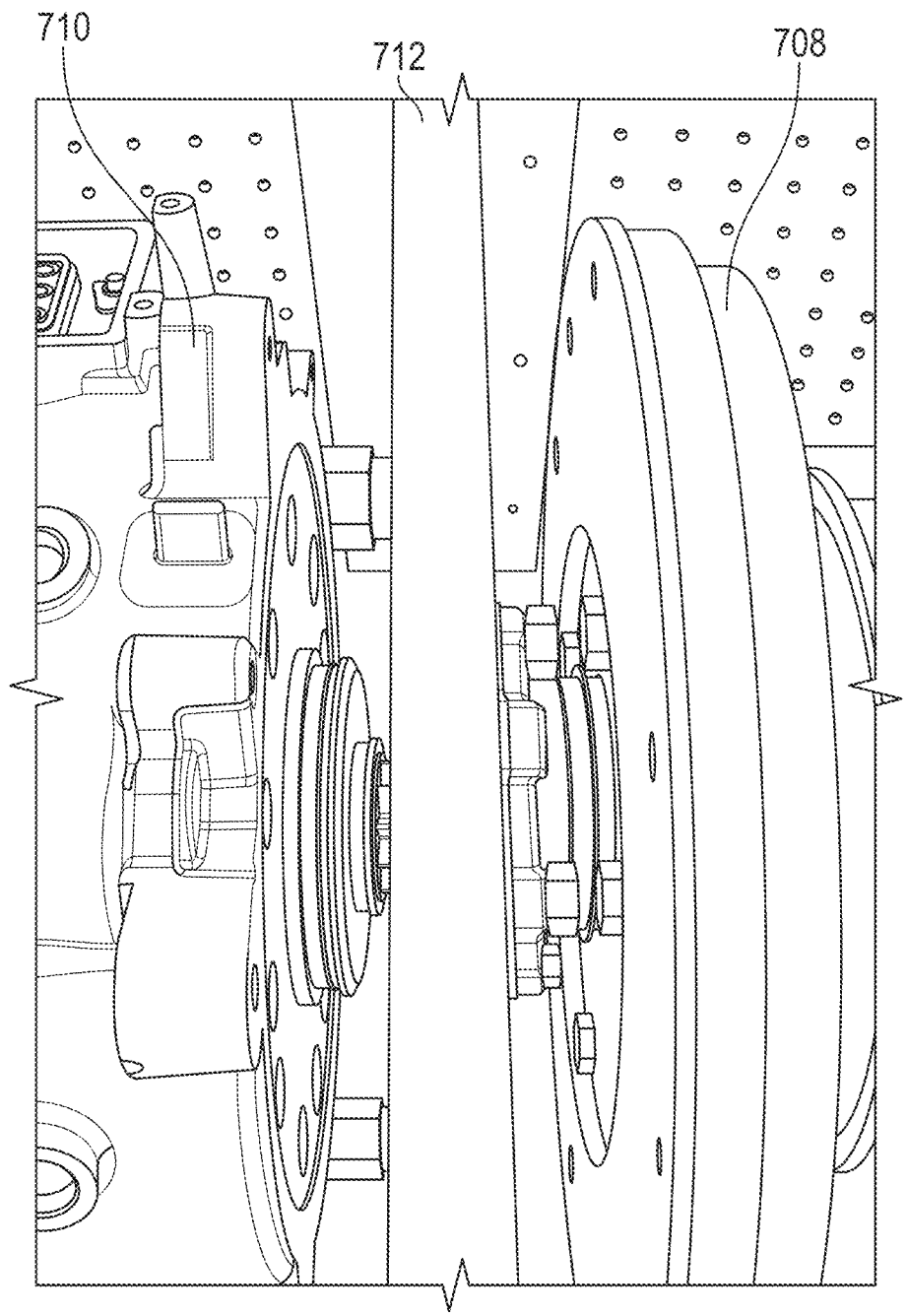
FIG. 9 illustrates a close-up view of the stabilization bracket between the generation unit and the flywheel of FIG. 7.

In some embodiments, as shown in FIG. 9, which provides a close-up view of the stabilization bracket 712 between the generation unit 710 and the flywheel 708, the generation unit 712 may be bolted to the stabilization bracket 712.

FIGS. 10A-10P are screenshots of an interface that presents various data points that are monitored during operation of the EV with an example embodiment of the generators 302, the generation unit 710, and/or the OBCS 210 described herein. Each of the screenshots of FIGS. 10A-10P include a torque field 1005 indicating a torque value generated by the fifth wheel or similar drive component (e.g., the small motor) for the OBCS 210, measured in Newton-meters (Nm). Each of the screenshots of FIGS. 10A-10P also include three phase currents for the three-phase AC power generated by the generators 302 or the generation unit 710. For example, a first phase current field 1010 indicates a current value of a first phase of the three-phase AC power generated by the generators 302 or generation unit 710 (and fed to the battery 102, capacitor module 502, or motor 104 via the charger 403 or similar filtering, conversion, and conditioning circuits). A second phase current 1015 field indicates a current value of a second phase of the three-phase AC power generated by the generators 302 or generation unit 710. A third phase current field 1020 indicates a current value of a third phase of the three-phase AC power generated by the generators 302 or generation unit 710. Each current value of the first phase current field 1010, the second phase current field 1015, and the third phase current field 1020 is measured in amps (A).

Each of the screenshots of FIGS. 10A-10P also include a speed field 1025 that indicates a rotational speed value of the rotor of the motor (or generator 302 or generation unit 710) of the OBCS 210, measured in rotations per minute (RPM).

Each of the screenshots of FIGS. 10A-10P also include a current field 1030 that indicates a current value of a current being generated by the OBCS 210 while the motor of the OBCS 210 is rotating, the current measured in amps (A). Each of the screenshots of FIGS. 10A-10P also include a temperature field 1035 that indicates a temperature of the OBCS 210, in Celsius (C). Each of the screenshots of FIGS. 10A-10P also include a voltage field 1040 that indicates a voltage value for a voltage generated by the OBCS 210 after passing through rectification, conversion, conditioning, and so forth, measured in direct current volts (V DC). In some embodiments, the voltage field indicates voltage measure of the battery 102 or other power store that feeds the motor 104 to drive the BEV 100.

The screenshots of FIGS. 10A-10P described in further detail below depict electrical generation conditions of the BEV 100 while the BEV 100 is traveling. For example, for the screenshots of FIGS. 10A-10P, the BEV 100 is traveling (a) at a speed of between 48 MPH and 53 MPH along a substantially flat road surface for a majority of distance traveled and (b) up an incline for approximately 13 miles. The screenshots 10A-10P show how the phase currents (1010-1020) for the AC signal generated by the motor vary at different times but sum to substantially zero at any given moment of time (for example, indicating that the motor is feeding a balanced load). The motor speed 1025 shown in the screenshots may be indicative of the current 1030 except when the voltage dump is being completed.

FIG. 10A shows a screenshot 1001a for when the fifth wheel 202 is in contact with the road and providing a torque value in 1005a of approximately −57.4 Nm (the negative value representing a torque opposing the direction of the motion of the EV). The screenshot also shows that the first phase current value in 1010a is −5.31 A, the second phase current value in 1015a is −143.06 A, and the third phase current value in 1020a is 148.94 A. The speed value in 1025a of the generator or motor of the OBCS 210 is 5008 RPM and the OBCS 210 is generating the current value in 1030a of 70 A at the temperature value in 1035a of 51.05 C. The voltage value in 1040a generated by the OBCS 210 at the speed of 5008 RPM is 377.2 V.

The screenshot 1001a may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70 A of current used to maintain the voltage of the EV's battery 102 and/or capacitor module 502 at or around the voltage 1040a of 377.2 V. The 70 A current 1030a is provided to the motor 104, the battery module 102, and/or the capacitor module 502 to maintain the voltage at approximately 377.2 V.

FIG. 10B shows a screenshot 1001b for when the fifth wheel 202 is in contact with the road and providing a torque value in 1005b of approximately −57.4 Nm (the negative value representing a torque opposing the direction of the motion of the EV). The screenshot also shows that the first phase current value in 1010b is −137.19 A, the second phase current value in 1015b is 152.25 A, and the third phase current value in 1020b is −14.94 A. The speed value in 1025b of the generator or motor of the OBCS 210 is 5025 RPM and the OBCS 210 is generating the current value in 1030b of −70 A at the temperature value in 1035b of 51.14 C. The voltage value in 1040b generated by the OBCS 210 at the speed of 5025 RPM is 379.17 V.

The screenshot 1001b may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70 A of current used to maintain the voltage of the EV's battery 102 and/or capacitor module 502 at or around the voltage 1040b of 379.17 V. The 70 A current 1030b is provided to the motor 104, the battery module 102, and/or the capacitor module 502 to maintain the voltage at approximately 379.17 V.

FIG. 10C shows a screenshot 1001c for when the fifth wheel 202 is in contact with the road and providing a torque value in 1005c of approximately −57.4 Nm (the negative value representing a torque opposing the direction of the motion of the EV). The screenshot also shows that the first phase current value in 1010b is 80.5 A, the second phase current value in 1015c is −160.06 A, and the third phase current value in 1020c is 80.12 A. The speed value in 1025c of the generator or motor of the OBCS 210 is 5011 RPM and the OBCS 210 is generating the current value in 1030c of −69.6 A at the temperature 1035c of 51.22 C. The voltage value in 1040c generated by the OBCS 210 at the speed of 5011 RPM is 380.17 V.

The screenshot 1001c may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040c of 380.17 V. The 69.6 A current 1030c is provided to the motor 104, the battery module 102, and/or the capacitor module 502 to maintain the voltage at approximately 380.17 V.

FIG. 10D shows a screenshot 1001d for when the fifth wheel 202 is in contact with the road and providing a torque value in 1005d of approximately −57.6 Nm (the negative value representing a torque opposing the direction of the motion of the EV). The screenshot also shows that the first phase current value in 1010d is 170.69 A, the second phase current value in 1015d is −131.94 A, and the third phase current value in 1020d is −38.19 A. The speed value in 1025d of the generator or motor of the OBCS 210 is 4969 RPM and the OBCS 210 is generating the current value in 1030d of −69 A at the temperature value in 1035d of 51.31 C. The voltage value in 1040d generated by the OBCS 210 at the speed of 4969 RPM is 380.92 V.

The screenshot 1001d may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69 A of current used to maintain the voltage of the EV's battery 102 and/or capacitor module 502 at or around the voltage 1040d of 380.92 V. The 69 A current 1030*d* is provided to the motor 104, the battery module 102, and/or the capacitor module 502 to maintain the voltage at approximately 380.92 V.

FIG. 10E shows a screenshot 1001*e* for when the fifth wheel 202 is in contact with the road and providing a torque value in 1005*e* of approximately −56.8 Nm (the negative value representing a torque opposing the direction of the motion of the EV). The screenshot also shows that the first phase current value in 1010*e* is −133.31 A, the second phase current value in 1015*e* is −40.75 A, and the third phase current value in 1020*e* is 174.19 A. The speed value in 1025*e* of the generator or motor of the OBCS 210 is 5121 RPM and the OBCS 210 is generating the current value in 1030*e* of −69.6 A at the temperature value in 1035*e* of 52.77 C. The voltage value in 1040*e* generated by the OBCS 210 at the speed of 4969 RPM is 382.67 V.

The screenshot 1001*e* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040*e* of 382.67 V. The 69.6 A current 1030*e* is provided to the motor 104, the battery module 102, and/or the capacitor module 502 to maintain the voltage at approximately 382.67 V.

FIG. 10F shows a screenshot 1001*f* for when the fifth wheel 202 is in contact with the road and providing a torque value in 1005*f* of approximately −57 Nm (the negative value representing a torque opposing the direction of the motion of the EV). The screenshot also shows that the first phase current value in 1010*f* is 8.75 A, the second phase current value in 1015*f* is 145.44 A, and the third phase current value in 1020*f* is −153.62 A. The speed value in 1025*f* of the generator or motor of the OBCS 210 is 5062 RPM and the OBCS 210 is generating the current value in 1030*f* of −69.4 A at the temperature value in 1035*f* of 52.86 C. The voltage value in 1040*f* generated by the OBCS 210 at the speed of 5062 RPM is 383.21 V.

The screenshot 1001*f* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.4 A of current used to maintain the voltage of the EV's battery 102 and/or capacitor module 502 at or around the voltage 1040*f* of 383.21 V. The 69.4 A current 1030*f* is provided to the motor 104, the battery module 102, and/or the capacitor module 502 to maintain the voltage at approximately 383.21 V.

FIG. 10G shows a screenshot 1001*g* for when the fifth wheel 202 is in contact with the road and providing a torque value in 1005*g* of approximately −57.6 Nm (the negative value representing a torque opposing the direction of the motion of the EV). The screenshot also shows that the first phase current value in 1010*g* is −161.94 A, the second phase current value in 1015*g* is 29.56 A, and the third phase current value in 1020*g* is 132 A. The speed value in 1025*g* of the generator or motor of the OBCS 210 is 4937 RPM and the OBCS 210 is generating the current value in 1030*g* of −68.8 A at the temperature value in 1035*g* of 53.03 C. The voltage value in 1040*g* generated by the OBCS 210 at the speed of 4937 RPM is 381.92 V.

The screenshot 1001*g* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 68.8 A of current used to maintain the voltage of the EV's battery 102 and/or capacitor module 502 at or around the voltage 1040*g* of 381.92 V. The 68.8 A current 1030*g* is provided to the motor 104, the battery module 102, and/or the capacitor module 502 to maintain the voltage at approximately 681.91 V.

FIG. 10H shows a screenshot 1001*h* for when the fifth wheel 202 is in contact with the road and providing a torque value in 1005*h* of approximately −57.6 Nm (the negative value representing a torque opposing the direction of the motion of the EV). The screenshot also shows that the first phase current value in 1010*h* is −89.69 A, the second phase current value in 1015*h* is 161.44 A, and the third phase current value in 1020*h* is −70.69 A. The speed value in 1025*h* of the generator or motor of the OBCS 210 is 4890 RPM and the OBCS 210 is generating the current value in 1030*h* of −69.2 A at the temperature value in 1035*h* of 53.55 C. The voltage value in 1040*h* generated by the OBCS 210 at the speed of 4890 RPM is 377.42 V.

The screenshot 1001*h* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.2 A of current used to maintain the voltage of the EV's battery 102 and/or capacitor module 502 at or around the voltage 1040*h* of 377.42 V. The 69.2 A current 1030*h* is provided to the motor 104, the battery module 102, and/or the capacitor module 502 to maintain the voltage at approximately 377.42 V.

FIG. 10I shows a screenshot 1001*i* for when the fifth wheel 202 is in contact with the road and providing a torque value in 1005*i* of approximately −57.6 Nm (the negative value representing a torque opposing the direction of the motion of the EV). The screenshot also shows that the first phase current value in 1010*i* is 90.69 A, the second phase current value in 1015*i* is 80 A, and the third phase current value in 1020*i* is −169.12 A. The speed 1025*i* of the generator or motor of the OBCS 210 is 4971 RPM and the OBCS 210 is generating the current value in 1030*i* of −69.8 A at the temperature value in 1035*i* of 53.8 C. The voltage value in 1040*i* generated by the OBCS 210 at the speed of 4971 RPM is 378.2 V.

The screenshot 1001*i* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.8 A of current used to maintain the voltage of the EV's battery 102 and/or capacitor module 502 at or around the voltage 1040*b* of 378.2 V. The 69.8 A current 1030*i* is provided to the motor 104, the battery module 102, and/or the capacitor module 502 to maintain the voltage at approximately 378.2 V.

FIG. 10J shows a screenshot 1001*j* for when the fifth wheel 202 is in contact with the road and providing a torque value in 1005*j* of approximately −57.6 Nm (the negative value representing a torque opposing the direction of the motion of the EV). The screenshot also shows that the first phase current value in 1010*j* is 149.38 A, the second phase current value in 1015*j* is −145.5 A, and the third phase current value in 1020*j* is −1.88 A. The speed value in 1025*j* of the generator or motor of the OBCS 210 is 4987 RPM and the OBCS 210 is generating the current value in 1030*h* of −70 A at the temperature value in 1035*j* of 53.89 C. The voltage value in 1040*j* generated by the OBCS 210 at the speed of 4987 RPM is 377.1 V.

The screenshot 1001*j* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70 A of current used to maintain the voltage of the EV's battery 102 and/or capacitor module 502 at or around the voltage 1040*b* of 377.1 V. The 70 A current 1030*i* is provided to the motor 104, the battery module 102, and/or the capacitor module 502 to maintain the voltage at approximately 377.1 V.

FIG. 10K shows a screenshot 1001*k* for when the fifth wheel 202 is in contact with the road and providing a torque value in 1005*k* of approximately −567.6 Nm (the negative value representing a torque opposing the direction of the motion of the EV). The screenshot also shows that the first phase current value in 1010*k* is −174.06 A, the second phase current value in 1015*k* is 111 A, and the third phase current value in 1020*k* is 63.12 A. The speed value in 1025*k* of the generator or motor of the OBCS 210 is 4996 RPM and the OBCS 210 is generating the current value in 1030*k* of −69.6 A at the temperature value in 1035*k* of 54.06 C. The voltage value in 1040*k* generated by the OBCS 210 at the speed of 4996 RPM is 378.51 V.

The screenshot 1001*k* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040*b* of 378.51 V. The 69.6 A current 1030*k* is provided to the motor 104, the battery module 102, and/or the capacitor module 502 to maintain the voltage at approximately 378.51 V.

FIG. 10L shows a screenshot 1001*l* for when the fifth wheel 202 is in contact with the road and providing a torque value in 1005*l* of approximately −57.6 Nm (the negative value representing a torque opposing the direction of the motion of the EV). The screenshot also shows that the first phase current value in 1010*l* is 62.12 A, the second phase current value in 1015*l* is −169.25 A, and the third phase current value in 1020*l* is 108.25 A. The speed value in 1025*l* of the generator or motor of the OBCS 210 is 4954 RPM and the OBCS 210 is generating the current value in 1030*l* of −69.6 A at the temperature value in 1035*l* of 54.41 C. The voltage value in 1040*l* generated by the OBCS 210 at the speed of 4954 RPM is 378.86 V.

The screenshot 1001*l* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040*b* of 378.86 V. The 69.6 A current 1030*l* is provided to the motor 104, the battery module 102, and/or the capacitor module 502 to maintain the voltage at approximately 378.86 V.

FIG. 10M shows a screenshot 1001*m* for when the fifth wheel 202 is in contact with the road and providing a torque value in 1005*m* of approximately −9.2 Nm (the negative value representing a torque opposing the direction of the motion of the EV). The screenshot also shows that the first phase current value in 1010*m* is 113.06 A, the second phase current value in 1015*m* is −147 A, and the third phase current value in 1020*m* is 34.5 A. The speed value in 1025*m* of the generator or motor of the OBCS 210 is 5587 RPM and the OBCS 210 is generating the current value in 1030*m* of −0.2 A at the temperature value in 1035*m* of 55.27 C. The voltage value in 1040*m* generated by the OBCS 210 at the speed of 5587 RPM is 377.32 V.

The screenshot 1001*m* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 0.2 A of current used to maintain the voltage of the EV's battery 102 and/or capacitor module 502 at or around the voltage 1040*m* of 377.32 V. The 0.2 A current 1030*m* is provided to the motor 104, the battery module 102, and/or the capacitor module 502 to maintain the voltage at approximately 377.32 V.

FIG. 10N shows a screenshot 1001*n* for when the fifth wheel 202 is in contact with the road and providing a torque value in 1005*n* of approximately −9.2 Nm (the negative value representing a torque opposing the direction of the motion of the EV). The screenshot also shows that the first phase current value in 1010*n* is 84.94 A, the second phase current value in 1015*n* is −74.75 A, and the third phase current value in 1020*n* is −9.62 A. The speed value in 1025*n* of the generator or motor of the OBCS 210 is 5600 RPM and the OBCS 210 is generating the current value in 1030*n* of −28.4 A at the temperature value in 1035*n* of 55.69 C. The voltage value in 1040*n* generated by the OBCS 210 at the speed of 5600 RPM is 378.07 V.

The screenshot 1001*n* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 28.4 A of current used to maintain the voltage of the EV's battery 102 and/or capacitor module 502 at or around the voltage 1040n of 378.07 V. The 28.4 A current 1030n is provided to the motor 104, the battery module 102, and/or the capacitor module 502 to maintain the voltage at approximately 378.07 V.

FIG. 10O shows a screenshot 1001o for when the fifth wheel 202 is in contact with the road and providing a torque value in 1005o of approximately −56.6 Nm (the negative value representing a torque opposing the direction of the motion of the EV). The screenshot also shows that the first phase current value in 1010o is −74.19 A, the second phase current value in 1015o is −88.31 A, and the third phase current value in 1020o is 163 A. The speed value in 1025o of the generator or motor of the OBCS 210 is 5153 RPM and the OBCS 210 is generating the current value in 1030o of −70.8 A at the temperature value in 1035o of 56.5 C. The voltage value in 1040o generated by the OBCS 210 at the speed of 5153 RPM is 376.88 V.

The screenshot 1001o may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70.8 A of current used to maintain the voltage of the EV's battery 102 and/or capacitor module 502 at or around the voltage 1040o of 376.88 V. The 70.8 A current 1030o is provided to the motor 104, the battery module 102, and/or the capacitor module 502 to maintain the voltage at approximately 376.88 V.

FIG. 10P shows a screenshot 1001p for when the fifth wheel 202 is in contact with the road and providing a torque value in 1005p of approximately −56.6 Nm (the negative value representing a torque opposing the direction of the motion of the EV). The screenshot also shows that the first phase current value in 1010p is 37.38 A, the second phase current value in 1015p is −164.44 A, and the third phase current value in 1020o is 128.12 A. The speed value in 1025p of the generator or motor of the OBCS 210 is 5137 RPM and the OBCS 210 is generating the current value in 1030p of −70.8 A at the temperature value in 1035p of 56.59 C. The voltage value in 1040p generated by the OBCS 210 at the speed of 5137 RPM is 378.29 V.

The screenshot 1001p may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70.8 A of current used to maintain the voltage of the EV's battery 102 and/or capacitor module 502 at or around the voltage 1040b of 378.29 V. The 70.8 A current 1030p is provided to the motor 104, the battery module 102, and/or the capacitor module 502 to maintain the voltage at approximately 378.29 V.

In some embodiments, voltages flow between the generator, the battery 102, the capacitor module 502, and/or the motor 104. For example, the electricity generated by the generators 302a and 302b or the generation unit 710 may be output from the generator 302 or generation unit 710 and fed into components for converting conditioning, rectifying, matching, filtering, and/or otherwise modifying the generated electricity. Once the electricity is modified as described herein, the electricity may be conveyed to an energy storage device, such as the battery 102 and/or the capacitor module 502. The energy stored in the battery 102 or the capacitor module 502 may be used to feed one or more DC loads, for example low voltage DC loads, such as the 12V DC battery and internal features and components of the BEV 100. Alternatively, the energy stored in the battery 102 or the capacitor module 502 may be used to feed the motors 104 or other high voltage demand components. In some embodiments, the motors 104 may be AC or DC motors; when AC motors, the high voltage output from the battery 102 or the capacitor module 502 may be converted from DC to AC before feeding into the motors 104. When the motors 104 are DC motors, further conditioning may not be required before the voltage is fed to the motors 104. Alternatively, the high voltage output from the battery 102 and/or the capacitor module 502 may be used to feed into the generation unit 710 or generators 302 to jump start the generation unit 710 or generators 302 when they are being used to convert mechanical energy to electricity for storage or use in driving the motor 104. In some embodiments, when the battery 102 and the capacitor module 502 both exist in the BEV 100 as separate components, the battery 102 may feed energy to the capacitor module 502 and/or vice versa.

In some embodiments, the generators 302 and/or generation unit 710 described herein couple directly to one or more of the battery 102, the capacitor module 502, and the motor 104. Alternatively, or additionally, the generators 302 and/or generation unit are coupled to the charger 403, which is coupled to the battery 102, the capacitor module 502, and/or the motor 104. In some embodiments, when the generators 302 and/or generation unit 710 are not coupled to the charger 403, the generators 302 and/or generation unit 710 may instead be coupled to one or more circuits to rectify and/or otherwise match, convert, and/or condition the electricity generated by the generators 302 and/or generation unit before feeding the battery 102, the capacitor module 502, and/or the motor 104.

Figure 11A:
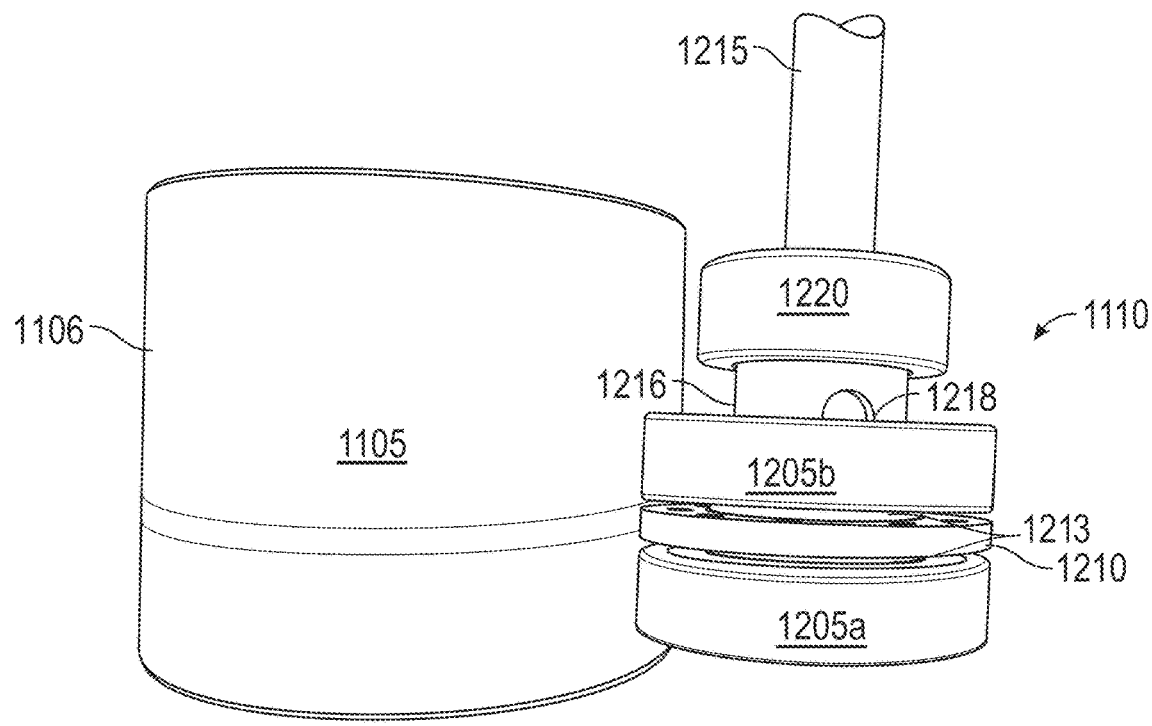
FIGS. 11A-11B depict different views of an example embodiment of components of a bearing support that supports a rotating element, the bearing support including a bearing enclosure and a bearing assembly.
Figure 11B:
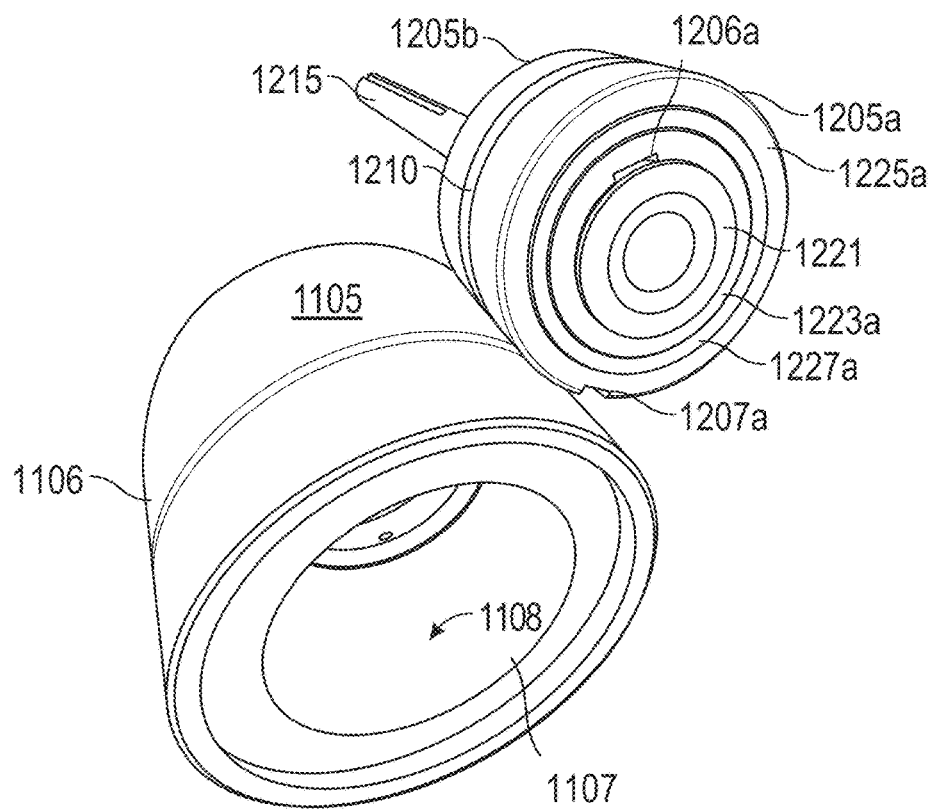

FIGS. 11A-11B depict different views of an example embodiment of components of a bearing support 1100. The bearing support 1100 can be configured to support, facilitate, or enable a rotating element, such as a rotating shaft. Further, and as will be described in more detail below, the bearing support 1100 can be advantageously configured to dissipate heat generated by rotation of the rotating element. Heat may be generated, for example, by friction between components as the rotating element rotates. If such generated heat is not sufficiently dissipated, the components may deteriorate or otherwise become damaged. For example, in some cases, if heat is not sufficiently dissipated, components may melt, degrading the function thereof.

In some embodiments, the bearing support 1100 may be used anywhere that any rotating element is physically supported or coupled to another component (e.g., another rotating or stationary component). For example, the bearing support 1100 can be used to support end, center, and/or other portions of the shaft 206 of FIG. 2 or the second shaft 704 of FIG. 7. The bearing support 1100 can support the portions of the shafts and other rotating components on the BEV 100 or the support structure 200 or couple the portions to other rotating or stationary components in the BEV 100 or the OBCS 210. In some embodiments, the one-way bearing 706 discussed above comprises the bearing support 1100. In some embodiments, the bearing support 1100 may provide support for rotating axles and components, reduction of diameters of rotating components, and so forth. The bearing support 1100 may be used in various contexts in any embodiment of the OBCS 201 described herein, with reference to FIGS. 2-9. In some embodiments, the bearing support 1100 may be used in various other applications, from automotive, industrial, consumer, appliance, and home use applications.

FIG. 11A is a top down view of the bearing support 1100, illustrated in a partially disassembled state. FIG. 11B is another perspective view of the bearing support in a partially disassembled state. In the illustrated embodiment, the bearing support 1100 comprises a bearing housing or enclosure 1105 and a bearing assembly 1110. While FIGS. 11A and 11B, illustrate the bearing support 1100 in a partially disassembled state, when assembled, at least a portion of the bearing assembly 1110 can be positioned within the bearing enclosure 1105.

As shown in FIG. 11A, the bearing assembly 1110 comprises a shaft 1215 and one or more bearings 1205 (e.g., first and second bearing 1205a, 1205b) configured to facilitate rotation of the shaft 1215. The one or more bearings 1205 can be mounted on the shaft 1215 as shown. The one or more bearings 1205 can comprise mechanical devices configured to enable rotational movement of the shaft 1215. The one or more bearings 1205 can comprise rotary bearings that convey or transfer one or more of axial and radial motions and forces between components or devices. In some embodiments, the one or more bearings 1205 may comprise one or more of a ring bearing, a rolling-element bearing, a jewel bearing, a fluid bearing, a magnetic bearing, and a flexure bearing, among other suitable bearing types.

As used herein, the one or more bearings 1205 may be enable rotational rotation. In some embodiments, additional bearings 1205 or only one of the bearings 1205a and 1205b may be used in any application. As best shown in FIG. 11B, the one or more bearings 1205 may comprise an inner ring 1223 and an outer ring 1225. The one or more bearings 1205 can also include one or more rolling elements (not visible) positioned between the inner ring 1223 and the outer ring 1225. The one or more rolling elements can facilitate rotation of the inner ring 1223 relative the outer ring 1225. The one or more rolling elements can be positioned within a cage 1227. The inner ring 1223 may be fitted on the shaft 1215. For example, the inner ring 1223 can have an inner diameter through which a shaft or other mechanical component passes (for example, the shaft 1215). The outer ring 1225 may have an outer diameter over which an enclosure or other mechanical component passes (for example, the bearing enclosure 1105). The rolling elements and the cage 1227 may be disposed between the inner ring and the outer ring (moving within one or raceways formed in the inner ring and/or the outer ring) to enable rotation movement of the inner ring relative to the outer ring, or vice versa. In some embodiments, different particularities for the bearing support 1100 may depend on the application in which the bearing support 1100 is used. The gaps between the bearing spacer 1110 and each of the bearings 1105a and 1105b is not clearly shown in the perspective view of FIG. 11B.

Often, as the shaft 1215 rotates, friction between the rolling elements and the inner and outer rings 1223, 1227 (or other components of the device) generates heat. As noted above, if such heat is not dissipated, it can cause damage to the components, which may reduce or destroy their ability to facilitate rotation of the shaft 1215. Accordingly, the bearing support 1100 can be configured to facilitate heat dissipation as will be described in more detail below.

As shown in FIGS. 11A and 11B, the bearing enclosure 1105 of the bearing support 1100 can comprise a housing or enclosure that is configured to receive at least a portion of the bearing assembly 1110. In the illustrated embodiment, the bearing enclosure 1105 comprises an exterior surface 1106 having a substantially cylindrical shape and an interior surface 1107 having a cylindrical shape. Other shapes of the exterior and interior surfaces 1106, 1007 are also possible. In some embodiments, the shape of the exterior surface 1106 of the bearing enclosure 1105 is dependent on an application and/or installation location of the bearing enclosure 1105. For example, the exterior surface 1106 of the bearing enclosure 1105 can be configured to facilitate connection of the bearing support 1100 to other components.

An interior portion 1108 of the bearing enclosure 1105 may be hollow and at least partially defined by the interior surface 1107. As noted above, in the illustrated embodiment, the interior surface 1107 comprises a cylindrical shape such that the hollow interior portion 1108 is substantially cylindrical. Such a shape can be configured to correspond with the generally circular or cylindrical shape of the one or more bearings 1205 of the bearing assembly 1105 such that the bearing assembly 1105 can be received within the interior portion 1108.

In some embodiments, the shape of the interior surface 1107 of the bearing enclosure 1105 is dependent on a shape of a bearing or similar device (for example, bearing 1205, described herein) that is inserted into the interior portion 1108 of the bearing enclosure 1105. The interior portion 1108 of the bearing enclosure 1105 may receive the bearing assembly 1110 such that the bearing assembly 1110 fits, at least in part, within the interior portion 1108 of the bearing enclosure 1105. For example, the bearing assembly 1110 may be inserted, at least in part, into the interior portion 1108 of the bearing enclosure 1105 in a horizontal direction (e.g., a direction parallel to an axis of the shaft 1215 or parallel to the axis of rotation of the bearings 1205), such that only a portion of the bearing assembly 1110 extends out of the bearing enclosure 1105. For example, the shaft 1215 can extend out from the bearing enclosure 1105. When the interior surface 1107 is cylindrical to accept the round or cylindrical bearing 1205 (for example, the pair of bearings 1205a and 1205b included in the bearing assembly 1110), the cylindrical interior portion 1108 may have a diameter substantially the same as (but slightly larger than) an outer diameter of the bearing 1205. Thus, the interior surface 1107 of the bearing enclosure 1105 is configured to hold the bearing 1205 or any bearing assembly 1110 pressed into the interior portion 108 in place using friction and compressive forces once the bearing 1205 or bearing assembly 1110 is pressed into the bearing enclosure 1105.

In the assembled state, the inner rings 1223 of the bearings 1205 can spin or rotate within the outer rings 1225 of the bearing 1205 while the outer rings 1225 remain stationary within the bearing enclosure 1105, such that the shaft 1215 that is coupled to the inner rings 1223 of the bearings 1205 can rotate or move relative to the bearing enclosure 1105. As noted previously, such rotation and movement can create heat within the bearings 1205, a build-up of which can cause the bearing 1205 to fail prematurely or otherwise damage one or more of the bearings 1205, the bearing enclosure 1105, and the shaft 1215 within the bearings 1205.

Accordingly, the bearing support 1100 can be configured to facilitate improved airflow within the bearing enclosure 1105 which may reduce the heat build-up within the bearing enclosure 1105 around the bearings 1205. Introducing ports or paths for airflow into the bearing enclosure 1105 can the improve airflow therethrough. For example, the bearing enclosure 1105 may include one or more slots, holes, perforations, or other openings that extend from the exterior surface 1106 to the interior surface 1107 through a side of the bearing enclosure 1105. The one or more slots, holes, perforations, or other openings allow air to better flow from outside the bearing enclosure 1105 to the interior portion 1108 of the bearing enclosure 1105.

Additionally, the interior surface 1107 may comprise one or more indentations, dimples, fingers, channels, or tabs (each hereinafter referred to as indentations) at a location to which the bearings 1205 are coupled. The one or more indentations may create individual points or portions at which the interior surface 1107 contacts the bearing 1205 such that the interior surface 1107 is not in contact with an entire exterior surface of the bearing 1205. The one or more indentations may allow air to flow around the bearings 1205 (for example, from a first side of the bearing 1205 to a second side of the bearing 1205) within the bearing enclosure 1105. Such air flow may further reduce heat build-up around the bearing 1205 when the bearing 1205 is enabling rotation or movement in the bearing enclosure 1105. In some embodiments, the one or more indentations may be of varying depths, shapes, lengths, and heights. For example, the one or more indentations in the interior surface 1107 of the bearing enclosure 1105 may have a depth in the thousandths of an inch (for example, approximately 0.001", 0.002", 0.003", 0.004", 0.005", 0.006", 0.007", 0.008", 0.009", 0.01", 0.02", 0.1" and so forth, or any value therebetween). In some embodiments, the one or more indentations may have any shape or height (for example, approximately 0.001", 0.002", 0.003", 0.004", 0.005", 0.006", 0.007", 0.008", 0.009", 0.01", 0.02", 0.1" and so forth, or any value therebetween). The one or more indentations may also have a width sufficient to ensure that air flows from the first side to the second side of the bearing 1205 (for example a width that is slightly larger than a width or thickness of the bearing 1205). In some embodiments, the width of the one or more indentations is slightly larger than the width of the bearing 1205. For example, the width of the one or more indentations may be long enough such that the indentation extends on either side of the bearing 1205 by a distance of one of approximately or at least 0.001", 0.002", 0.003", 0.004", 0.005", 0.006", 0.007", 0.008", 0.009", 0.01", 0.02", 0.1" and so forth, or any value therebetween. While described primarily as indentations, protrusions, which extend outwardly from the interior surface 1107 of the bearing enclosure 1105 may also be used. For example, the protrusions can extend to and contact the bearings 1205, while also allowing air to flow around the protrusions to facilitate cooling of the bearings 1205. In cases where protrusions are utilized, the protrusions may have a height equal to the various depths of the indentations described above.

The one or more indentations (or protrusions) may reduce an amount of surface contact between the bearing 1205 (for example, the outer ring 1225) and the interior surface 1107 of the bearing enclosure 1105. In order to prevent the bearing 1205 from moving laterally within the bearing enclosure 1105, a tab, wedge, key, or similar device (hereinafter referred to as tab) may be inserted into one of the one or more indentations or otherwise pressed against the bearing 1205 and the interior surface 1107 of the bearing enclosure 1105 to ensure that the bearing 1205 does not move laterally within the bearing enclosure 1105. Thus, the introduction of any of the indentations or holes described herein may improve air flow within the bearing enclosure 1105, reducing bearing failures and improving bearing functionality and life, without increasing risk of movement of the bearing 1205.

As shown in FIG. 11A, for example, the bearing assembly 1110 may comprise one or more bearings (e.g. the first and second bearings 1205a and 1205b) mounted on the shaft 1215 and, additionally, a bearing spacer 1210 and a clamp 1220. These components of the bearing assembly 1110 may be arranged such that the bearings 1205a and 1205b are separated from each other by the bearing spacer 1210. The arrangement of the bearing 1205a, the bearing spacer 1210, and the bearing 1205b may be positioned at an end of the shaft 1215 and the clamp 1220 may hold the arrangement on or at the end of the shaft 1215. In some embodiments, the bearing spacer 1210 is separated from each of the bearings 1205a and 1205b on one or more sides of the bearing spacer 1210 by a predetermined length gap. The predetermined length gap may be one of 1 millimeter (mm), 2 mm, 3 mm, 4 mm, 5 mm, 6, mm, 7 mm, 8 mm, 9 mm, or 10 mm in length, and so forth, or any value therebetween. In some embodiments, the predetermined length gap is determined during manufacturing of the bearing assembly 1110 and the bearing support 1100. In some embodiments, the predetermined length gap may be selected or determined based on one or more of an expected load on the bearing assembly (for example, the expected rotational speed, expected working temperatures, expected duration of use, and so forth). The gaps created by the bearing spacer 1210 may further facilitate cooling and heat dissipation be creating spaces for air to flow around the one or more bearings 1205.

The clamp 1220 may be separated from the arrangement of the bearing 1205a, the bearing spacer 1210, and the bearing 1205b or may be positioned flush with the arrangement (for example, flush with the bearing 1205b). The clamp 1220 may include a mechanical device (for example, a locking screw or similar component) to mechanically prevent the clamp 1220 from moving one or more of rotationally around the shaft 1215 or laterally along the shaft 1215. Thus, the clamp 1220 may prevent other components from moving along or around the shaft 1215 or limit movement of the other components along or around the shaft 1215. The clamp 1220 may have an outer diameter that is large enough to prevent the bearings 1205 and/or the bearing spacer 1210 from moving over the clamp 1220 but smaller than the diameter of the interior portion 1108 of the bearing enclosure 1105.

In some embodiments, the shaft 1215 comprises a plurality of sections, including an end section 1216 and a middle section 1217. The end section 1216 comprises the section of the shaft 1215 where the bearing assembly 1110 is installed and can include a larger diameter than middle section 1217, although this need not be the case in all embodiments. For example, the shaft 1215 can, in some embodiments, comprise a shape having a constant diameter along its length. As shown in FIG. 11A, the end section 1216 may comprise a keyway 1218 into which a key 1219 is seated to prevent rotation of the arrangement of the bearing 1205a, the bearing spacer 1210, and the bearing 1205b about the end section 1216. The keyway 1218 may be formed having one or more shapes, lengths, widths, and so forth. The keyway 1218 may provide a volume into which the key 1219 is inserted to prevent the rotation. In some embodiments, the key 1219 may be one of a sunk saddle, parallel sunk, gib-head, feather, and Woodruff type key. In general, the keyway 1218 and key 1219 are configured to couple the inner rings 1215 of the one or more bearings 1205 to the shaft 1215 such that the shaft 1215 and the inner rings 1223 of the one or more bearings 1205 rotate together. In the illustrated embodiment, the end section 1216 includes an end cap 1221 that prevents the bearings 1205a and 1205b and the spacer from sliding off the end section 1216 of the shaft 1215.

In the illustrated embodiment of FIG. 11B, bearing 1205a includes a keyway 1206a on the inner ring 1223 of the bearing 1205a and a keyway 1207a on the outer ring 1225 of the bearing 1205a. The keyway 1206a may be configured to prevent the inner ring 1223 of the bearing 1205a from spinning or rotating about the end section 1216 while the keyway 1207a may prevent the outer ring 1227 of the bearing 1205a from spinning or rotating inside the interior portion 1108 of the bearing enclosure 1105. Though not shown in FIG. 11B, the bearing 1205b may also include a keyway 1206b on an interior ring of the bearing 1205b and a keyway 1207b on an exterior ring of the bearing 1205b. The keyway 1206b may prevent the inner ring of the bearing 1205b from spinning or rotating about the end section 1216 while the keyway 1207b may prevent the outer ring of the bearing 1205b from spinning or rotating inside the interior portion 1108. Though not shown in FIG. 11B, the bearing spacer 1210 may include a keyway 1211 on an interior opening of the bearing spacer 1210 and a keyway 1214 on an outer circumference of the bearing spacer 1210. The keyway 1211 may prevent the bearing spacer 1210 from spinning or rotating about the end section 1216 while the keyway 1214 may prevent the bearing spacer 1210 from spinning or rotating inside the interior portion 1108.

The larger diameter of the end section 1216 may generally match the inner diameter of the bearings 1205a and 1205b and an inner diameter of the bearing spacer 1210, as described in further detail below. The inner diameter of the bearings 1205a and 1205b may be substantially the same as (but slightly larger than) the diameter of the end section 1216. Thus, the end section 1216 can be configured to hold the bearings 1205 or any bearing assembly 1110 pressed onto the end section 1216 in place using, for example, friction and compressive forces once the bearing 1205 or bearing assembly 1110 is pressed onto the end section 1216.

In some embodiments, a surface of the end section 1216 on which the bearings 1205 and the bearing assembly 1110 are attached (e.g., pressed or otherwise coupled) may comprise one or more indentations, dimples, fingers, channels, or tabs (each hereinafter referred to as indentations) at a location to which the bearing is pressed. The one or more indentations may create individual points or portions at which the surface of the end section 1216 contacts the bearings 1205 of the bearing assembly 1110 such that the end portion 1216 is not in contact with an entire interior surface of the bearings 1205. The one or more indentations may allow air to flow around the bearings 1205 (for example, from a first side of the bearing 1205 to a second side of the bearing 1205) when pressed onto the end section 1216 and into the bearing enclosure 1105. Such air flow may further reduce heat build-up around the bearings 1205 when the bearings 1205 are enabling rotation or movement in the bearing enclosure 1105. In some embodiments, the one or more indentations may be of varying depths, shapes, lengths, and heights. For example, the one or more indentations in the surface of the end section 1216 of the shaft 1215 may have a depth in the thousandths of an inch (for example, approximately 0.001", 0.002", 0.003", 0.004", 0.005", 0.006", 0.007", 0.008", 0.009", 0.01", 0.02", 0.1" and so forth, or any value therebetween). In some embodiments, the one or more indentations may have any shape or height (for example, approximately 0.001", 0.002", 0.003", 0.004", 0.005", 0.006", 0.007", 0.008", 0.009", 0.01", 0.02", 0.1" and so forth, or any value therebetween). The one or more indentations may also have a width sufficient to ensure that air flows from the first side to the second side of the bearing 1205 (for example a width that is slightly larger than a width or thickness of the bearing 1205). In some embodiments, the width of the one or more indentations is slightly larger than the width of the bearing 1205. For example, the width of the one or more indentations may be long enough such that the indentation extends on either side of the bearing 1205 by a distance of one of approximately or at least 0.001", 0.002", 0.003", 0.004", 0.005", 0.006", 0.007", 0.008", 0.009", 0.01", 0.02", 0.1" and so forth, or any value therebetween. While described primarily as indentations, protrusions, which extend outwardly from the surface of the end section 1216 on which the bearings 1205 and the bearing assembly 1110 are attached may also be used. In cases where protrusions are utilized, the protrusions may have a height equal to the various depths of the indentations described above.

The bearing spacer 1210 is described in further detail below with reference to FIG. 13.

Figure 12A:
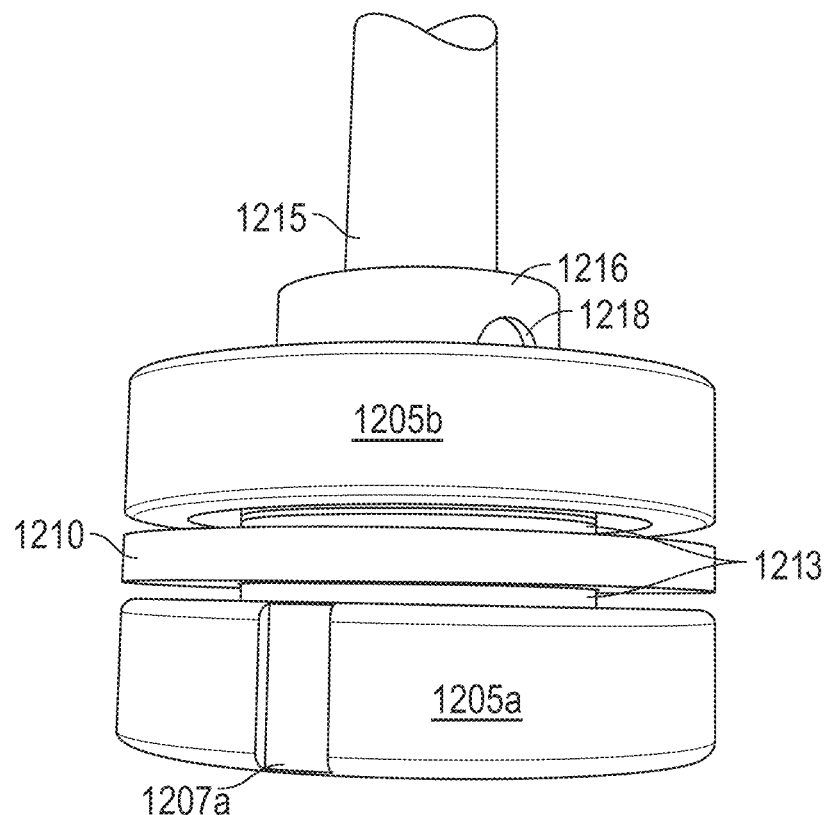
FIGS. 12A-12C depict different views of the bearing assembly of FIGS. 11A-11B, including a plurality of bearings, a bearing spacer, and a shaft.

FIG. 12A shows a top down view of the bearing assembly 1110. FIG. 12A shows the end section 1216 of the shaft 1215, some of the middle section 1217, a portion of the keyway 1218 in the end section 1216 that prevents rotation of the bearings 1205a and 1205b and the bearing spacer 1210 around the end section 1216. FIG. 12A also shows the gap between each of the bearings 1205a and 1205b and the bearing spacer 1210 on either side of the bearing spacer 1210. Additionally, the bearing 1205a also includes the keyway 1207a that is shown in FIG. 12A, while the keyway 1207b for the bearing 1205b is not shown and the keyway 1214 for the bearing spacer 1210 is not shown. Further details regarding the bearing spacer 1210 are provided below with reference to FIG. 13.

Figure 12B:
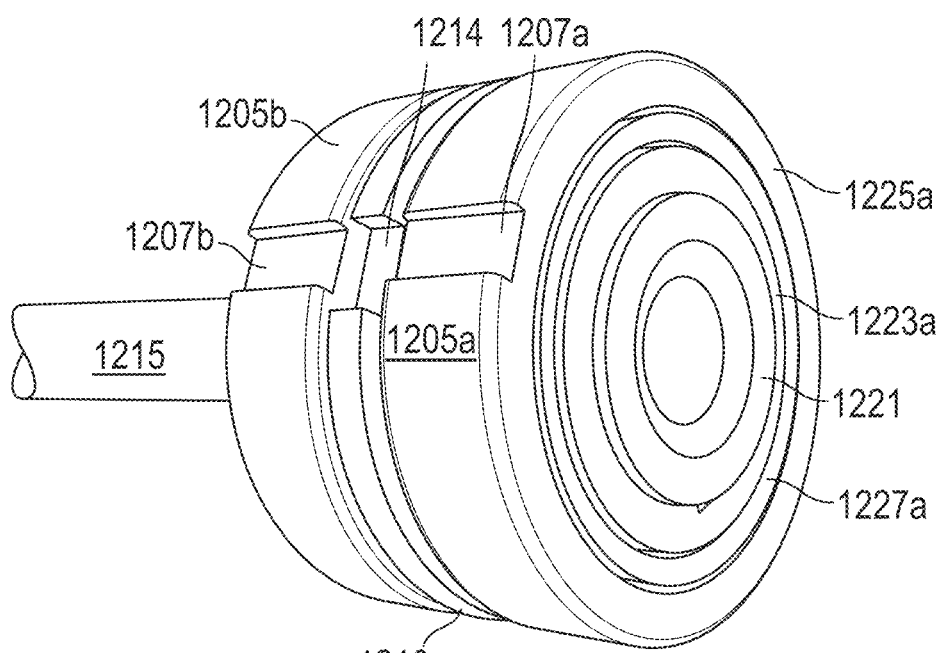

FIG. 12B shows a perspective view of the bearing assembly 1110. The bearing assembly 1110 shown includes the end cap 1221 of the shaft 1215, a portion of the middle section 1217 and the bearings 1205a and 1205b and the bearing spacer 1210 around the end section 1216. FIG. 12B also shows the gap between each of the bearings 1205a and 1205b and the bearing spacer 1210 on either side of the bearing spacer 1210. Additionally, FIG. 12B shows the keyways of the bearing 1205a, the bearing spacer 1210, and the bearing 1205b (for example, the keyway 1207a, the keyway 1214, and the keyway 1207b) aligned such that the key can pass through and lock the rotation of the outer ring of the bearing 1205a, the bearing spacer 1210, and the outer ring of the bearing 1205b within the bearing enclosure 1105.

Figure 12C:
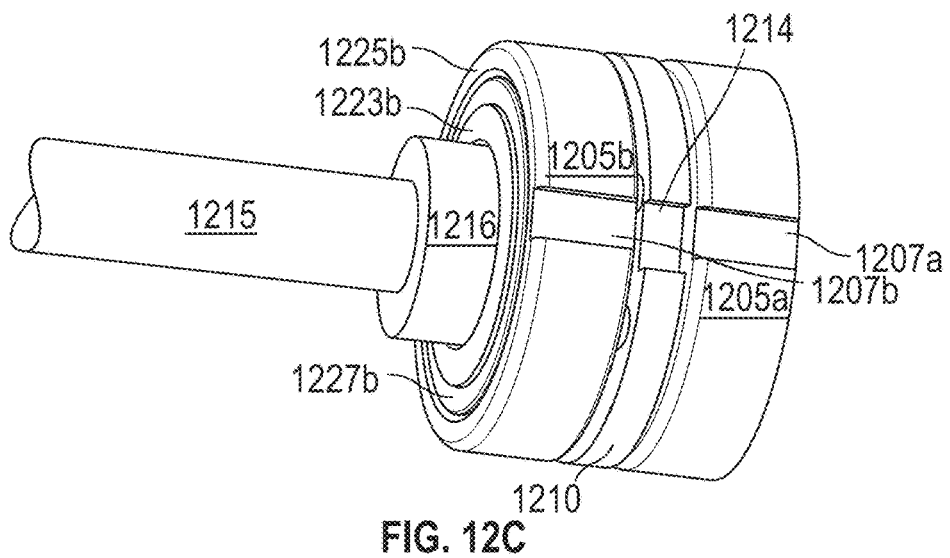

FIG. 12C shows an alternate perspective view of the bearing assembly 1110. The bearing assembly 1110 shown includes the end section 1216 of the shaft 1215, a portion of the middle section 1217, and the bearings 1205a and 1205b and the bearing spacer 1210 around the end section 1216. FIG. 12C also shows the gap between each of the bearings 1205a and 1205b and the bearing spacer 1210 on either side of the bearing spacer 1210. Additionally, FIG. 12C shows that the keyways 1207a, 1214, and 1207b are aligned such that the key can pass through them and lock the rotation of the bearing 1205, the bearing spacer 1210, and the bearing 1205b within the bearing enclosure 1105.

Figure 13:
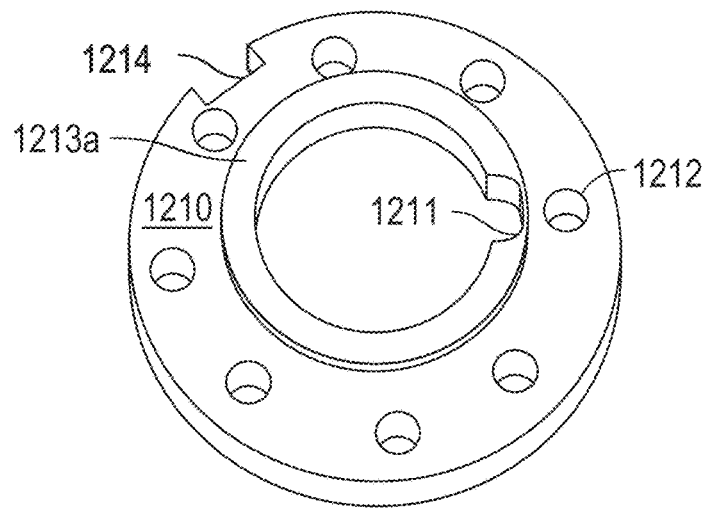
FIG. 13 shows a top-down view of the bearing spacer of the bearing assembly of FIGS. 11A-12C.

FIG. 13 shows a top-down view of the bearing spacer 1210 of the bearing assembly 1110 of FIGS. 11A-12C. The bearing spacer 1210 shown includes a number of holes 1212 that extend from a first side of the bearing spacer 1210 to a second side of the bearing spacer 1210 and through the bearing spacer 1210. The holes 1212 may be replaced by one or more slots, perforations, or other openings that connect the first and second sides of the bearing spacer 1210 through the bearing spacer 1210. The holes 1212 can further facilitate airflow through the bearing support 1100 and/or around the bearings 1205 in order to further dissipate heat and provide cooling. The bearing spacer 1210 also includes the keyway 1211 introduced above that can lock rotation of the bearing spacer 1210 around the end section 1216 and the keyway 1214 that can lock rotation of the bearing spacer 1210 inside the interior portion 1108.

In the illustrated embodiment of FIG. 13, on either side of the bearing spacer 1210, a lip 1213*a* and/or 1213*b* is affixed or otherwise extends (in a direction parallel to the axis of the shaft 1215, for example) from a main body of the bearing spacer 1210. The lips 1213*a* and 1213*b* may extend from the first and second sides of the bearing spacer 1210 and create the gaps between the bearing 1205*a* and the bearing spacer 1210 and the bearing spacer 1210 and the bearing 1205*b* discussed above. In some embodiments, the lips 1213*a* and 1213*b* have a height that defines the predetermined length gap. For example, the lips 1213*a* and 1213*b* have a height of 1 mm, 2 mm, 3 mm, 4 mm, 5 mm, 6, mm, 7 mm, 8 mm, 9 mm, or 10 mm in length and so forth, or any value therebetween. The height of the lips 1213 can be measured along a direction parallel to the axis of the shaft 1214 (when assembled). For example, the lips 1213 have a width (for example extending along the sides of the bearing spacer 1210) of 1 mm, 2 mm, 3 mm, 4 mm, 5 mm, 6, mm, 7 mm, 8 mm, 9 mm, or 10 mm in length and so forth, or any value therebetween. The width of the lips 1213 may be short enough to not impede air flow between the inner and outer rings of the bearing 1205*a* and 1205*b*. The width of the lips 1213 can be measured in a radial direction (e.g., a direction perpendicular to the axis of the shaft 1215 (when assembled)).

In some embodiments, the lips 1213 comprise one or more indentations, dimples, fingers, channels, or tabs (each hereinafter referred to as indentations) at a location where the bearings 1205 contact the lips 1213. The one or more indentations may allow air to flow around the bearing 1205 within the bearing enclosure 1105. Such air flow may further reduce heat build-up around the bearing 1205 when the bearing 1205 is enabling rotation or movement in the bearing enclosure 1105. In some embodiments, the one or more indentations may be of varying depths, shapes, lengths, and heights. For example, the one or more indentations in the lips 1213 may have a depth in the thousandths of an inch (for example, approximately 0.001", 0.002", 0.003", 0.004", 0.005", 0.006", 0.007", 0.008", 0.009", 0.1", 0.01", 0.02", and so forth, or any value therebetween). In some embodiments, the one or more indentations may have any shape or height or width (for example, approximately 0.001", 0.002", 0.003", 0.004", 0.005", 0.006", 0.007", 0.008", 0.009, 0.01", 0.02", 0.1" and so forth, or any value therebetween). Protrusions may also be used in place of the indentations.

Figure 14A:
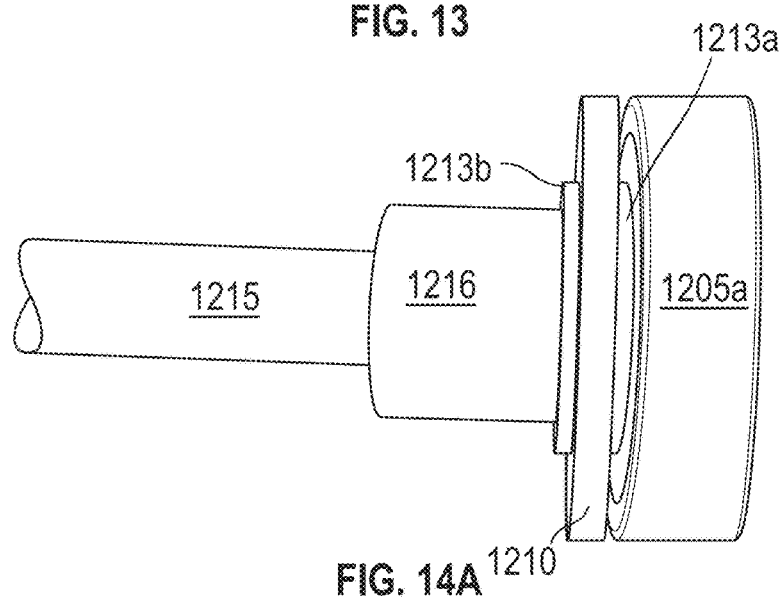
FIGS. 14A-14C show different views of a partial construction of the bearing assembly of FIGS. 12A-12C, the partial construction including a first bearing, the bearing spacer, and the shaft.
Figure 14B:
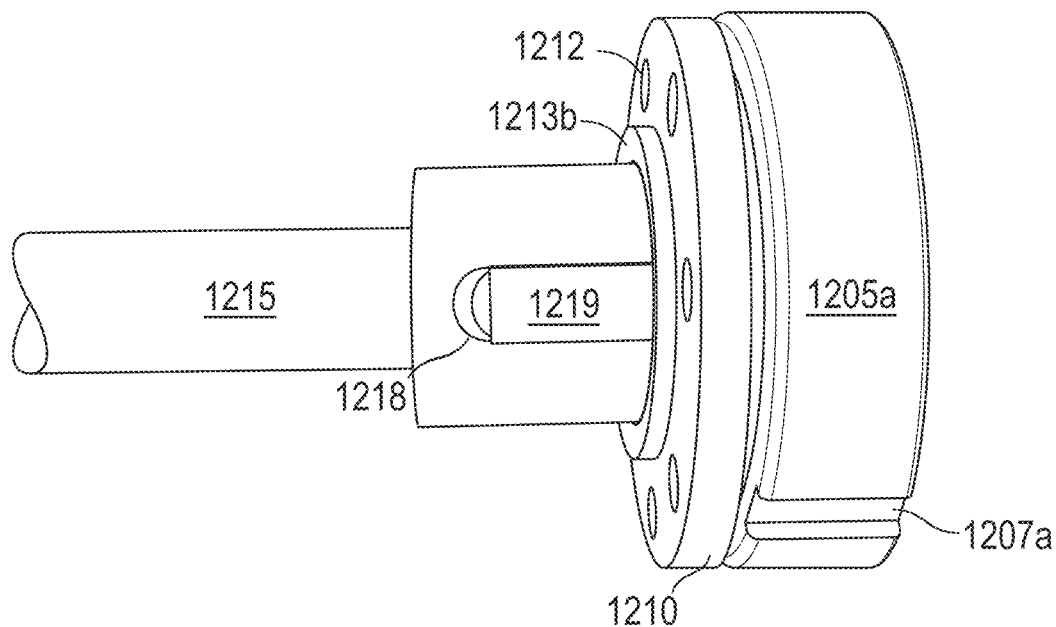
Figure 14C:
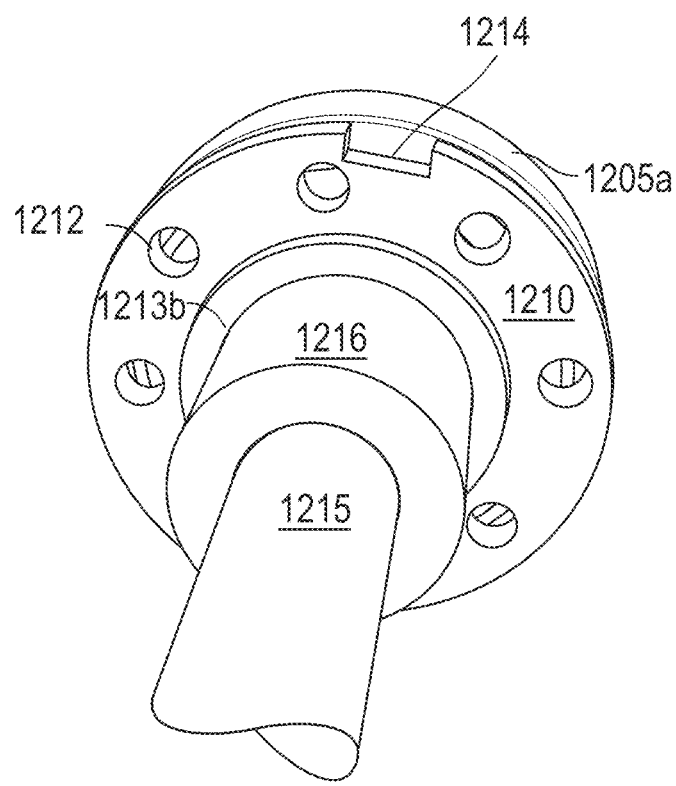

FIGS. 14A-14C show different views of a partial construction of the bearing assembly 1100 of FIGS. 11A-12C, the partial construction including the first bearing 1205*a*, the bearing spacer 1210, and the shaft 1215.

FIG. 14A shows a top down view of the partial construction of the bearing assembly 1110. The partial construction of the bearing assembly 1110 shown also includes the end section 1216 of the shaft 1215 and some of the middle section 1217. FIG. 14A also shows the gap between the bearing 1205*a* and the bearing spacer 1210. Further details regarding the bearing spacer 1210 are provided below with reference to FIG. 13.

FIG. 14B shows a slight perspective view of the partial construction of the bearing assembly 1110. The bearing assembly 1110 shown includes the end section 1216 of the shaft 1215, some of the middle section 1217, a portion of the keyway 1218 in the end section 1216 that prevents rotation of the bearings 1205*a* and 1205*b* and the bearing spacer 1210 around the end section 1216, and a portion of the key 1219 that slides into the keyway 1218 in the end section and into the keyways 1206*a* and 1206*b* of the bearings 1205*a* and 1205*b* and keyway 1211 of the bearing spacer 1210. FIG. 14B also shows the gap between the bearing 1205*a* and the bearing spacer 1210. Additionally, the bearing 1205*a* also includes the keyway 1207*a* that is shown in FIG. 12A, while the keyway 1211 for the bearing spacer 1210 is not shown. As shown, the key 1219 may prevent the first bearing 1205*a* and the bearing spacer 1210 from spinning or rotating on the end section 1216.

FIG. 14C shows a perspective view of the partial construction of the bearing assembly 1110. The bearing assembly 1110 shown also includes the end section 1216 of the shaft 1215 and some of the middle section 1217. FIG. 14C also shows the keyway 1214 of the bearing spacer 1210 and the lip 1213 that would separate the bearing spacer 1210 from the bearing 1205*b* with the gap between the bearing 1205*b* and the bearing spacer 1210 as described above. Additionally, the bearing spacer 1210 includes the number of holes 1212 that enable air flow between the first and second sides of the bearing spacer 1210.

Further Embodiments

In many instances, the BEV 100/500 described herein may comprise any battery or electric powered device. Different electric powered devices and BEVs may be powered by different voltages. In some instances, the OBCS 210 described herein may generate variable output voltages, thereby enabling use of the OBCS 210 on different electric powered devices, from electric scooters to electric vehicles to electric farm equipment. Similarly, the corresponding equipment (the fifth wheel 202, shaft 206, and so forth) may be sized according to the electric power device with which the OBCS 210 is being used. Furthermore, the OBCS 210 may comprise one or more components or equipment that enables the generation and output of the variable output voltages. In some instances, the electric power devices may comprise one or more fifth wheels 202 and corresponding equipment.

In some instances, the OBCS 210 may comprise or be coupled to a controller configured to automatically detect a voltage of the energy storage components and/or motors of the electric powered devices when the OBCS 210 is coupled to the electric powered devices, for example via a charge port of the electric powered devices. In some instances, based on the detected voltage of the energy storage components and/or motors of the electric powered devices, the OBCS 210 can automatically adapt or adjust its output voltage to appropriately charge the energy storage components of the electric powered devices. Similarly, the OBCS 210 may include one or more user controls that enable the user to adjust or change the output voltage of the OBCS 210.

Similarly, in some embodiments, the controller may enable retraction and/or extension of one or more of the multiple fifth wheels 202. Such control of the fifth wheels 202 may be based on an analysis of charge remaining in the energy storage components of the electric powered devices and/or a speed or other conditions of power generation using the fifth wheels 202. In some instances, the controller may determine that one or more of the fifth wheels should be extended to generate power based on the movement and/or other conditions of the electric powered device. In some instances, the fifth wheel 202 is coupled to a gearbox allowing one or more ratios of rotating components to be adapted to the movement of the electric powered device. The gearbox may allow the ratios of rotating components to be adjusted to change the amount of power generated by the fifth wheels 202, where the gearbox can allow for increased power generation as needed depending on various conditions.

Example Hypercapacitor For Storing Energy

Existing energy storage devices, such as batteries and capacitors, can be useful for storing energy but may have many undesirable limitations. For example, batteries such as lithium ion batteries are resilient to self-discharge but often require long charge times (e.g., 12-14 hours). In contrast, capacitors, such as ultracapacitors and supercapacitors are capable of being charged quickly (i.e., faster than batteries) but may be much less resilient to self-discharge than batteries. For example, ultracapacitors/supercapacitors may lose as much as 10-20% of their charge per day due to self-discharge. Additionally, although ultracapacitors/supercapacitors may be capable of withstanding more charge-discharge cycles than batteries without losing operational functionality, ultracapacitors/supercapacitors may not be capable of storing as much energy per weight as batteries.

In addition, batteries, such as lithium ion batteries present many environmental problems. For example, mining and disposing of lithium are both environmentally destructive. Furthermore, lithium ion batteries are capable of catching fire and burning at high temperatures for long amounts of time, which is also environmentally destructive and hazardous to human health.

Given the limitations of current energy storage devices (e.g., batteries, capacitors) in use today, an energy storage device is needed that may integrate, or marry, the benefits of standard storage devices (e.g., storage capacitors, battery fields, or battery storage devices) and standard ultracapacitors/supercapacitors (e.g., can charge quickly, is stable or resilient to self-discharge or bleeding of voltage, has high energy to weight ratio, can draw down voltage storage levels all the way down to 0 volts without jeopardizing degradation of performance or failure of the storage device) in a unitary device or package.

The present disclosure provides for an energy storage system (e.g., the hypercapacitor described below) that can incorporate ultracapacitors/supercapacitors and storage devices (e.g., capacitors, batteries) in a single assembly (e.g., as a single integrated unit or package) to provide synergistic results, or results that are not achievable, or are substantially reduced, when provided or used separately. The hypercapacitor (e.g., electrically integrated ultracapacitor/supercapacitor and energy storage device or energy retainer) overcomes the problems discussed herein. For example, the hypercapacitor can be charged much faster than a standalone battery (discussed in greater detail below) while simultaneously being much more resilient to self-discharge (i.e., maintains stable voltage levels within minimal bleeding) than a standalone ultracapacitor/supercapacitor due to energy stabilization between the ultracapacitor/supercapacitor and energy storage device or energy retainer (e.g., storage capacitor(s), battery field, and/or battery storage device(s) discussed in greater detail below). Additionally, the hypercapacitor may be capable of storing much more energy per weight than standalone storage devices, battery fields, or ultracapacitors/supercapacitors. In some implementations, the hypercapacitor does not include batteries (such as lithium-ion batteries) that are known to have a detrimental impact on the environment (for example, once they become environmental waste product after battery failure or exhaustion).

Thus, the hypercapacitor, described in greater detail below, provides for a superior energy storage device over standard energy storage devices in use today. The hypercapacitor may be incorporated into any device or system that requires energy storage and/or usage such as electric vehicles for transportation (e.g., electric cars, electric trucks, electric motorcycles, electric scooters, electric trains, electric boats, electric aircraft), electric vehicles or electric equipment for construction or farming (e.g., tractors, bulldozers, lawnmowers), power tools that have typically been powered by batteries (e.g., electric blowers, electric drills, electric lawnmowers, electric nail guns, electric saws), building energy/power systems, manufacturing energy/power systems, games, drones, robots, toys and the like. The hypercapacitor may replace standard energy storage devices (e.g., standard batteries, capacitors) in any of the devices or systems described.

Figure 22A:
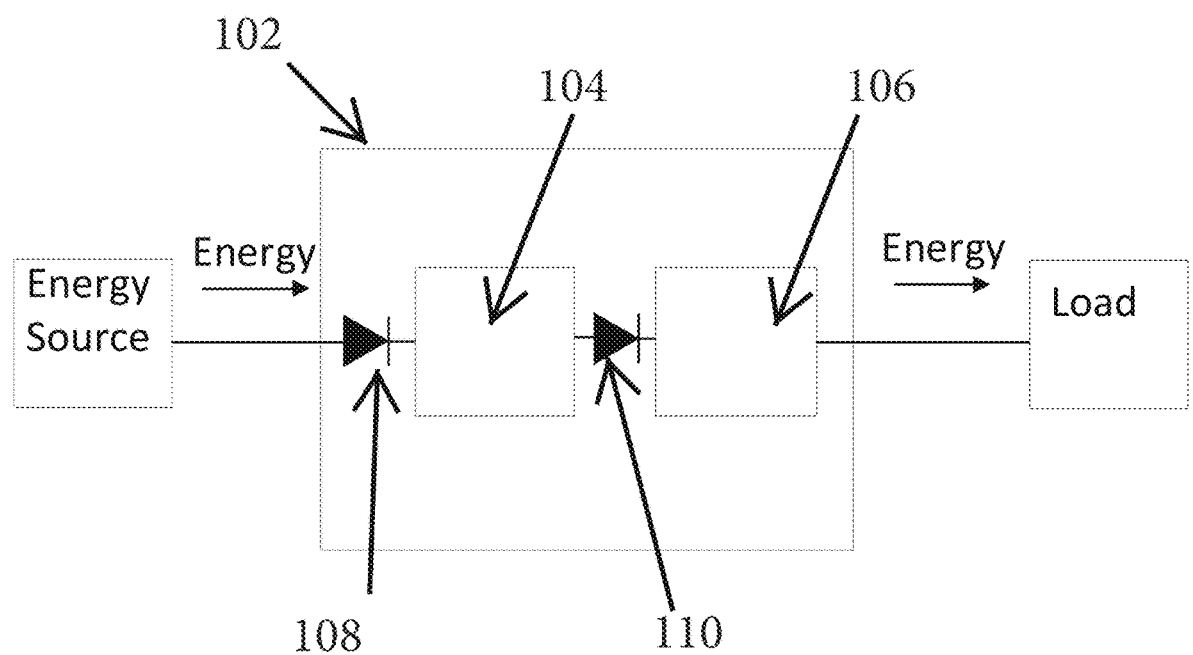
FIGS. 22A-22B illustrate diagrams of example embodiments of a hypercapacitor for storing and providing energy.

FIG. 22A schematically illustrates a diagram of an example embodiment of a hypercapacitor 2202 for storing energy (e.g., such as may be used in an electric vehicle), which may also be referred to as a hypercapacitor energy storage system or device. As shown, the hypercapacitor 2202 may comprise or consist essentially of an ultracapacitor portion 2204, an energy retainer portion 2206, one or more inbound diodes 2208, and one or more outbound diodes 2210. In some embodiments, the hypercapacitor 2202 may not comprise the inbound diode 2208 and/or the outbound diode 2210. In some embodiments, the hypercapacitor 2202 may comprise and/or may be electrically coupled to a battery management system (not shown) as discussed in greater detail below.

The ultracapacitor portion 2204 may be electrically coupled to the energy retainer portion 2206 and in some embodiments, together may comprise a single integrated unit or package (e.g., the hypercapacitor 2202). The ultracapacitor portion 2204 may provide energy to the energy retainer portion 2206 as the energy in the energy retainer portion 2206 is depleted (for example resulting from an energy demand at a load).

The electrical connection between the ultracapacitor portion 2204 and the energy retainer portion 2206 may stabilize the voltage levels of the ultracapacitor portion 2204 and prevent self-discharge as the energy retainer portion 2206 retains energy provided from the ultracapacitor portion 2204 via their electrical connection. Advantageously, stabilizing the voltage levels in the ultracapacitor portion 2204 by reducing and/or substantially eliminating self-discharge provides a superior energy device capable of storing energy (e.g., maintaining high voltage levels) for much longer than existing energy devices in widespread use today.

The ultracapacitor portion 2204 may be electrically coupled to an energy source as described in greater detail below. By receiving energy from the energy source at the ultracapacitor portion 2204, the hypercapacitor 2202 may be charged quickly, for example, in less than 15 minutes (e.g., 8 minutes, 4 minutes etc.). Advantageously, the ultracapacitor portion 2204 may facilitate quickly charging the hypercapacitor 2202 to the required or desired operational voltages in much shorter times than those required for standard energy devices (e.g., standard batteries) in use today.

The ultracapacitor portion 2204 of the hypercapacitor 2202 may comprise one or more ultracapacitors and/or supercapacitors. The ultracapacitor portion 2204 may incorporate structural and operational features described in connection with any of the embodiments of the capacitor module 502 described herein.

Figure 23:
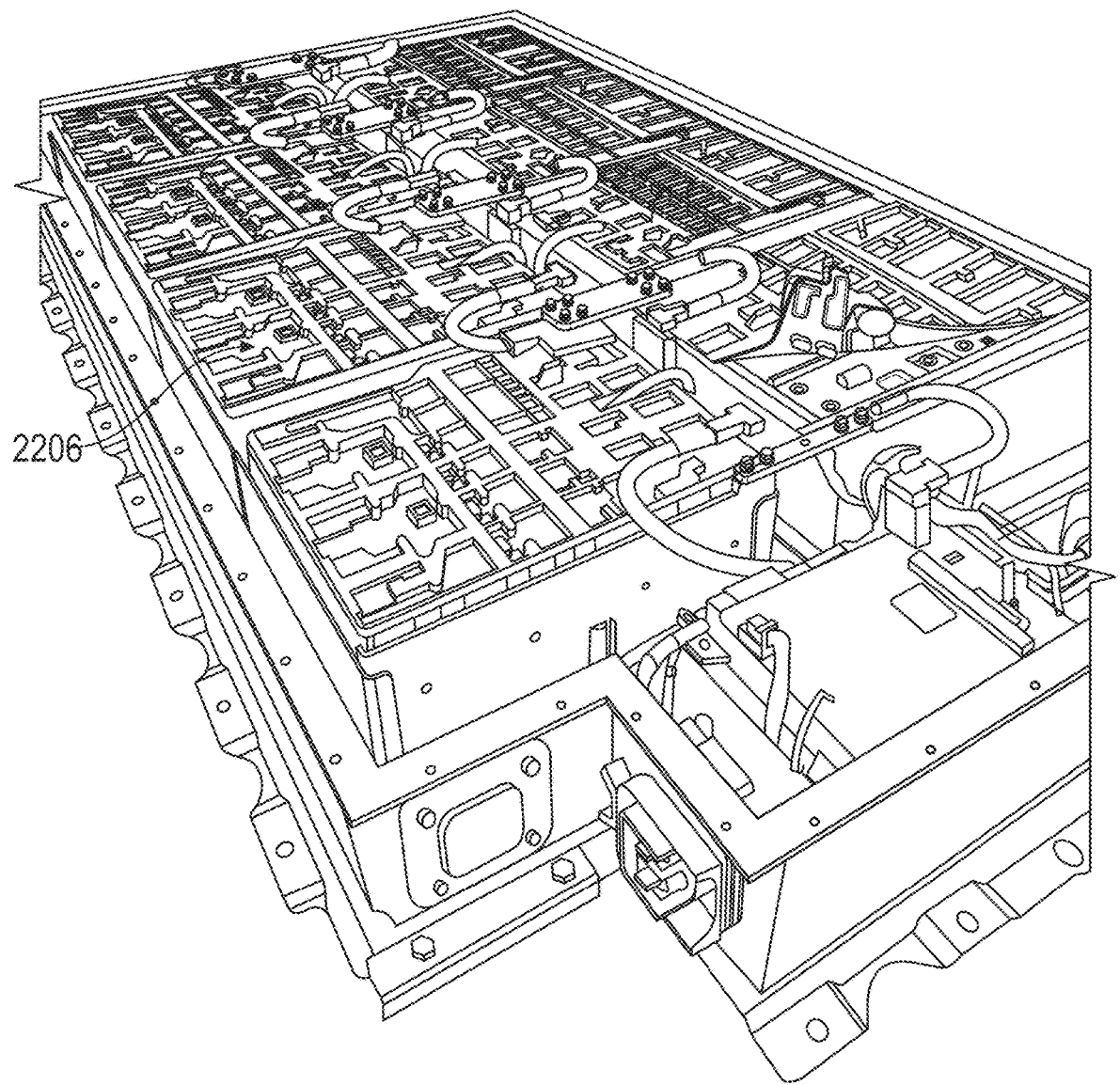
FIG. 23 illustrates an example embodiment of a battery that may be incorporated in a hypercapacitor for operation in a BEV.

The energy retainer portion 2206 may comprise a device or multiple devices capable of storing energy such as a battery, a battery field and/or a capacitor. For example, in some embodiments the energy retainer portion 2206 may include a battery such as the battery 102 described herein and may incorporate structural and operational features of the battery 102. In some embodiments, the energy retainer portion 2206 may include a battery field such as a battery field comprising batteries 102 such as shown in FIG. 5 or FIG. 23. In some embodiments, the energy retainer portion 2206 may comprise one or more capacitors, such as the capacitor module 502 described herein. In accordance with several embodiments, the energy retainer portion 2206 may advantageously not comprise lithium ion batteries, which may provide a benefit to quality of the environment for any or all of the reasons discussed above. In some embodiments, the energy retainer portion 2206 may comprise lithium ion batteries.

The hypercapacitor 2202 may be electrically couplable to an energy source, such as the generator of the OBCS 210 or the utility grid via a standard outlet plug and configured to receive energy as inbound energy from the energy source. The hypercapacitor 2202 may be configured to receive the inbound energy at the ultracapacitor portion 2204. The ultracapacitor portion 2204 may receive the inbound energy via one or more inbound diodes 2208. The inbound diode(s) 2208 may bias the direction of energy flow into the ultracapacitor portion 2204. The inbound diode(s) 2208 may comprise one or more diodes per ultracapacitor in embodiments where the ultracapacitor portion 2204 comprises more than one ultracapacitor. The inbound diode(s) 2208 may be arranged in series. The inbound energy provided to the hypercapacitor 2202 may charge the ultracapacitor portion 2204. The one or more ultracapacitors of the ultracapacitor portion 2204 may be charged simultaneously or sequentially. The one or more ultracapacitors of the ultracapacitor portion 2204 may be charged in an order that is determined based, at least in part, on their existing charge level, such as described above in connection with FIGS. 17A, 17B and 18.

The hypercapacitor 2202 may be electrically couplable to a power generation system or charging system, such as the OBCS 210 described herein. For example, the ultracapacitor portion 2204 of the hypercapacitor 2202 may be electrically couplable to a generator (e.g., generators 302, 1701) of the OBCS 210, which may generate energy, for example as a result of operation of the fifth wheel systems described herein. The generator 302 may provide energy to the ultracapacitor portion 2204 via the inbound diode 2208. The OBCS 210 and/or generator 302 may toggle between providing energy to the ultracapacitor portion 2204 and not providing energy to the ultracapacitor portion 2204 and may so toggle automatically and/or manually as discussed herein.

In some embodiments, the OBCS 210 and/or generator 302 may provide energy to the ultracapacitor portion 2204 when resistance in the inbound diode 2208 is sufficiently small and/or when the voltage in the ultracapacitor portion 2204 is sufficiently low. The amount of energy and/or the rate at which energy is provided to the ultracapacitor portion 2204 may be proportional to the resistance in the inbound diode 2208 and/or the voltage level of the ultracapacitor portion 2204. For example, the ultracapacitor portion 2204 may charge quicker (faster) when it has a low voltage level than when it has a high voltage level. In some embodiments, the OBCS 210 and/or the generator 302 may stop providing energy to the ultracapacitor portion 2204 when the resistance in the inbound diode 2208 is sufficiently high and/or when the voltage level of the ultracapacitor portion 2204 reaches a high threshold level, such as a high voltage level (e.g., more than 400 V), or any other voltage required or desired to operate the system (such as the BEV).

The hypercapacitor 2202 may be electrically couplable to power sources such as a utility grid or mains electricity. For example, the ultracapacitor portion 2204 of the hypercapacitor 2202 may be electrically couplable to a standard low voltage plug or outlet such as 110 volt outlets present in the United States utility power grid or 220 volt outlets of European utility power grids. Advantageously, the ultracapacitor portion 2204 may not require high voltage plugs to charge, such as are commonly required by standard BEVs. The ability to charge the ultracapacitor portion 2204 without the use of a high voltage plug may advantageously reduce the need for charging stations and at-home high voltage plugs, which may improve infrastructure and thereby provide a benefit to quality of the environment by reducing construction.

Energy from a low voltage plug (e.g. standard 100 or 110 volt outlet) may be provided to the hypercapacitor 2202 via the inbound diode(s) 2208 to charge the hypercapacitor 2202, for example in a similar manner as discussed above with reference to charging by the OBCS 210.

As discussed herein, capacitors such as the ultracapacitor portion 2204 may be charged quickly (e.g., much faster than batteries). Inbound energy, such as from the OBCS 210 generator and/or low voltage utility grid outlets (e.g., 110 volt outlets), provided to the ultracapacitor portion 2204 may charge the hypercapacitor 2202 quickly. For example, the hypercapacitor 2202 may be charged to a voltage level sufficient to operate a BEV (such as 400 volts) in less than 30 minutes, less than 15 minutes, less than 10 minutes, less than 5 minutes, or less than 1 minute. In some embodiments, the hypercapacitor 2202 may increase from zero volts to maximum voltage capacity (e.g., 400 volts or other voltage required to operate a BEV) in 15 minutes or less than 15 minutes, for example when plugged into the utility grid via a standard 110 volt outlet or 220 volt outlet.

As shown in FIG. 22A, the ultracapacitor portion 2204 may be electrically coupled to the energy retainer portion 2206. In some embodiments, the ultracapacitor portion 2204 may be directly connected to the energy retainer portion 2206. For example, the ultracapacitor portion 2204 and the energy retainer portion 2206 may comprise a single integrated unit or package. In some embodiments, the ultracapacitor portion 2204 may be wired to the energy retainer portion 2206 and/or connected via one or more high voltage lines. The ultracapacitor portion 2204 may provide energy to the energy retainer portion 2206 to charge the energy retainer portion 2206. In some embodiments, the ultracapacitor portion 2204 may provide energy to the energy retainer portion 2206 via one or more outbound diodes 2210. The outbound diode(s) 2210 may be arranged in series. The outbound diode(s) 2210 may bias the direction of flow of energy into the energy retainer portion 2206. The ultracapacitor portion 2204 may toggle between providing energy to the energy retainer portion 2206 and not providing energy to the energy retainer portion 2206 and may so toggle automatically and/or manually as discussed herein.

In some embodiments, the ultracapacitor portion 2204 may provide energy to the energy retainer portion 2206 when resistance in the outbound diode 2210 is sufficiently small and/or when the voltage in the energy retainer portion 2206 is sufficiently low. For example, resistance in the outbound diode 2210 may be sufficiently low to allow the transfer of energy from the ultracapacitor 2204 to the energy retainer portion 2206 to charge the energy retainer portion 2206 when the voltage level in the energy retainer portion 2206 is about 350V or 360V. In some embodiments, the ultracapacitor portion 2204 may provide energy to the energy retainer portion 2206 when the voltage in the energy retainer portion 2206 is sufficiently low relative to a voltage level in the ultracapacitor portion 2204. The amount of energy and/or the rate at which energy is provided to the energy retainer portion 2206 may be proportional to the resistance in the outbound diode 2210 and/or the voltage level of the energy retainer portion 2206. For example, the energy retainer portion 2206 may charge quicker (faster) when it has a low voltage than when it has a high voltage. In some embodiments, the ultracapacitor portion 2204 may stop providing energy to the energy retainer portion 2206 when the resistance in the outbound diode 2210 is sufficiently high and/or when the voltage level of the energy retainer portion 2206 reaches a high threshold level, for example 370V or 380V or 390V or 400V, any value between 370V and 400V, or another threshold voltage level, as desired or required.

The electrical connection of the ultracapacitor portion 2204 to the energy retainer portion 2206 may stabilize the voltage in the ultracapacitor portion 2204. For example, the ultracapacitor portion 2204 may maintain a high voltage level and may not lose voltage due to self-discharge because the ultracapacitor portion 2204 is coupled to the energy retainer portion 2206 and/or is able to provide energy thereto. Thus, the electrical connection of the ultracapacitor portion 2204 to the energy retainer portion 2206 may advantageously eliminate the high self-discharge rate problems associated with standard capacitors while also providing a system capable of fast charge times. Thus, the hypercapacitor 2202 described herein may provide an energy storage system capable of charging quickly and storing energy for long amounts of time without having the drawbacks or inefficiencies of standard battery or capacitor systems.

Figure 22B:
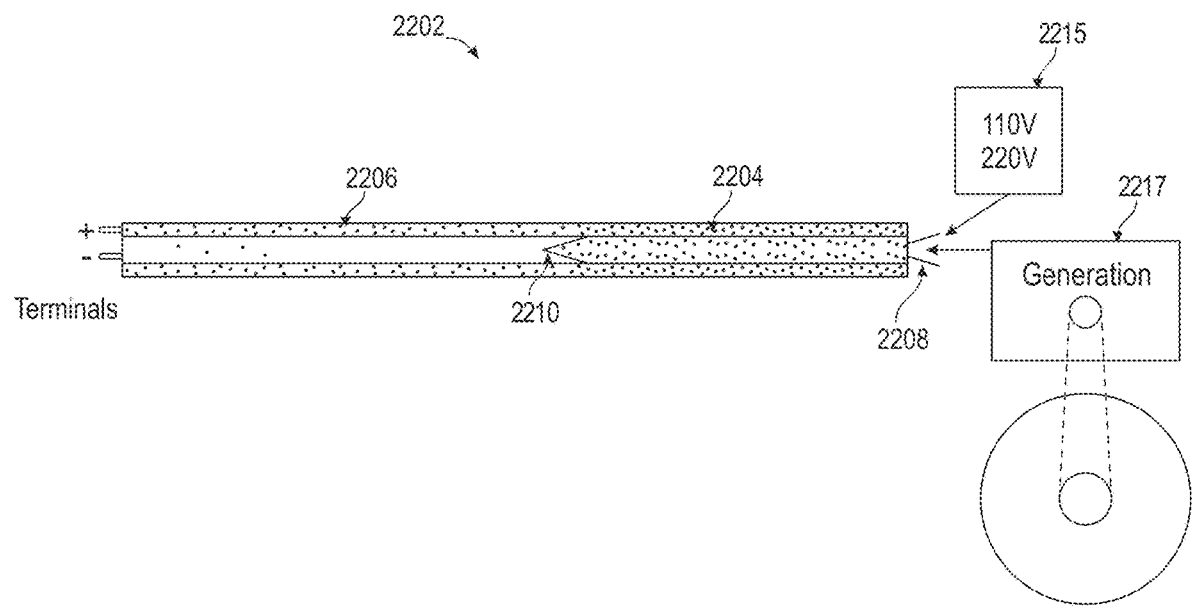

FIG. 22B illustrates example implementations of the hypercapacitor 2202. As discussed above, the hypercapacitor 2202 may be electrically couplable to an energy source and receive energy from the energy source. In some implementations, the energy source may comprise a power generation or charging system 2217 (such as the OBCS 210) and/or a power outlet 2215 of the utility grid.

In accordance with several embodiments, as the ultracapacitor portion 2204 is charged by inbound energy the voltage of the ultracapacitor portion 2204 will increase. The increase in energy (e.g., voltage) at the ultracapacitor portion 2204 is represented by the increased dot density shown in FIG. 22B. As the voltage of the ultracapacitor portion 2204 increases, the inbound diode(s) 2208 may trap energy in the ultracapacitor portion 2204 by biasing the direction of energy flow toward the ultracapacitor portion 2204. This may facilitate the transfer of energy from the ultracapacitor portion 2204 to the energy retainer portion 2206. As energy in the ultracapacitor portion 2204 (shown by dot density in FIG. 22B) increases relative to the energy in the energy retainer portion 2206 (shown by dot density in FIG. 22B), energy may be more likely to transfer from the ultracapacitor portion 2204 to the energy retainer portion 2206. The outbound diode(s) 2210 may trap energy in the energy retainer portion 2206 by biasing the direction of energy flow toward the energy retainer portion 2206. This may increase the energy stored in the energy retainer portion 2206 by facilitating the transfer of energy from the ultracapacitor portion to the energy retainer portion 2206. This may increase the operating time of the hypercapacitor 2202, for example in instances where the hypercapacitor 2202 is not receiving energy continuously from a power generation system 2217.

In some embodiments, the hypercapacitor 2202 may be used in conjunction with a power generation system 2217, such as the OBCS 210 described herein. In such embodiments, the power generation system 2217 may provide energy to the hypercapacitor 2202 to continuously charge the ultracapacitor portion 2204, for example as the BEV travels. This may significantly improve the range that the vehicle may travel because the hypercapacitor 2202 is being continuously charged as the vehicle travels. Additionally, in some embodiments, the hypercapacitor 2202 may be capable of being fully charged by the power generation system 2217, such as the OBCS 210, as the vehicle travels over a short distance, for example over less than a mile.

In some embodiments, the hypercapacitor 2202 may not be used in conjunction with a power generation system 2217 and may receive energy solely from a utility power grid via standard low voltage outlets 2215 such as from a standard 110 volt outlet or 220 volt outlet. In such embodiments, the outbound diode 2210 may increase the energy stored in the energy retainer portion 2206 by biasing the direction of energy flow into the energy retainer portion 2206. This would allow the energy retainer portion 2206 to maintain higher voltage levels for longer (without being continuously recharged by a power generation system 2217) until the hypercapacitor 2202 can be plugged into a power grid via an outlet 2215, for example, via a 110 volt outlet or 220 volt outlet.

In some embodiments, the hypercapacitor 2202 may be used in conjunction with a power generation system 2217 such as the OBCS 210 described herein and may also receive energy from a utility power grid via a standard low voltage outlet 2215. For example, the hypercapacitor 2202 may be electrically coupled to a power generation system 2217 and the utility power grid via an outlet 2215 simultaneously and/or sequentially.

The energy retainer portion 2206 may provide energy to a load such as any device that requires energy. For example, when the hypercapacitor 2202 is incorporated into a BEV, the energy retainer portion 2206 may provide energy to the motor of the vehicle, for example a traction motor (e.g., motors 104, 1710), and/or to other devices or systems of the vehicle that require energy or power.

With continued reference to FIG. 22A-22B, in some embodiments the hypercapacitor 2202 may comprise and/or be electrically coupled to a battery management system (not shown) or other control or management system. The battery management system may include a controller that may incorporate structural and functional features of the controllers described elsewhere herein. For example, the battery management system may monitor and control the flow of energy to and from the various components and the conditions under which the flow of energy is to occur. In some embodiments, the battery management system may be in electrical communication with the energy retainer portion 2206 and/or a load and may monitor and/or control the energy that is provided from the energy retainer portion 2206 to the load such as a motor of a BEV. In some embodiments, the battery management system may be in electrical communication with the ultracapacitor portion 2204 and may monitor and/or control the energy that is provided to the ultracapacitor portion 2204 from an energy source. In some embodiments, the battery management system may be in electrical communication with the ultracapacitor portion 2204 and the energy retainer portion 2206 and may monitor and/or control the energy that is provided to the ultracapacitor portion 2204 and the energy that is provided from the energy retainer portion 2206. In some embodiments, the battery management system may monitor and/or control the energy that is provided from the ultracapacitor portion 2204 to the energy retainer portion 2206.

Figure 22C:
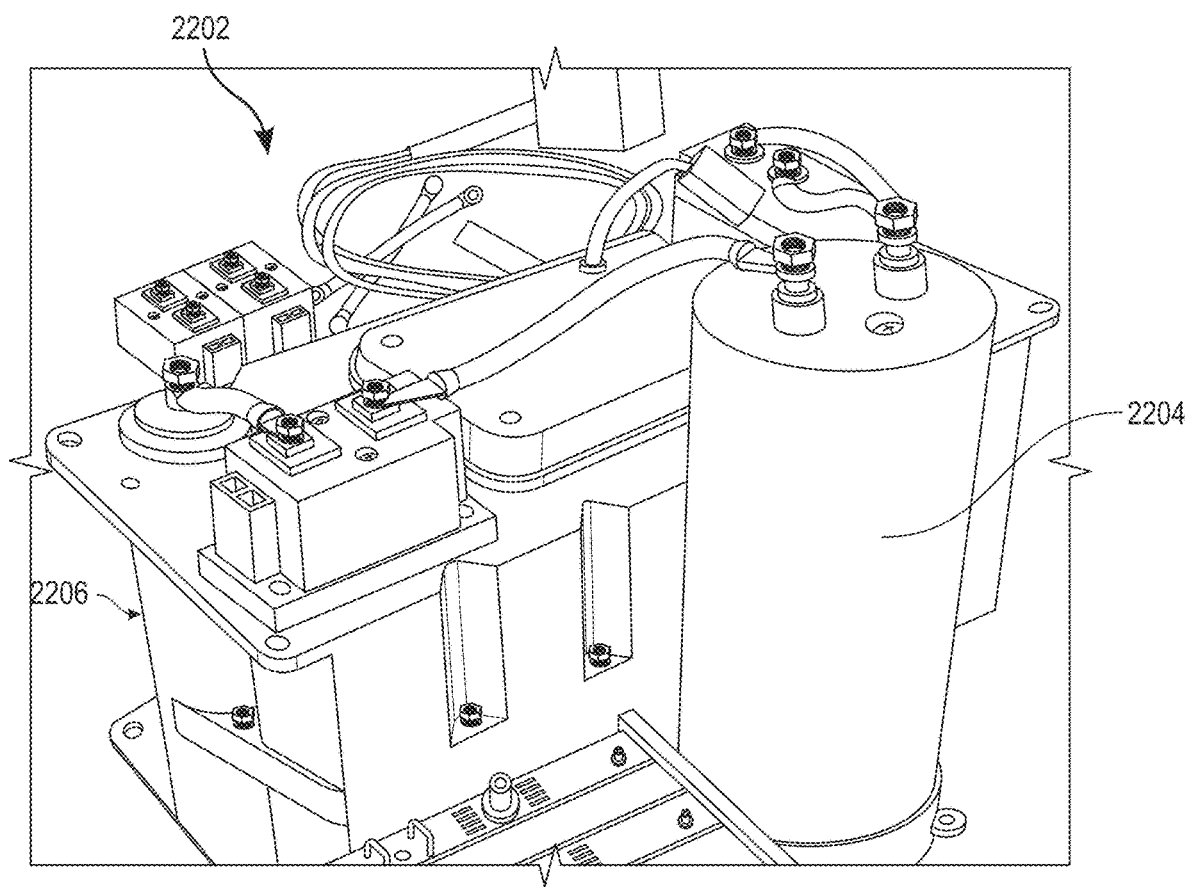
FIG. 22C illustrates an example embodiment of a hypercapacitor.

FIG. 22C illustrates an example embodiment of a hypercapacitor 2202. In this example, the hypercapacitor 2202 comprises an ultracapacitor 2204 and an energy retainer portion 2206. The energy retainer portion 2206 includes a battery (e.g., nickel-cadmium battery, lithium-ion battery or other type of battery). The ultracapacitor 2204 is electrically coupled to the energy retainer portion 2206. The hypercapacitor 2202 shown in FIG. 22C may operate as described with reference to FIGS. 22A-22B.

FIGS. 23-30 illustrate example embodiments of the hypercapacitor 2202 incorporated into an example electric vehicle. FIGS. 23-30 are not meant to be limiting. The hypercapacitor 2202 may be incorporated into any electric vehicle or any other system or device that uses or stores energy.

FIG. 23 illustrates an example embodiment of an energy retainer portion 2206 of a hypercapacitor 2202. The energy retainer portion 2206 may comprise a battery field comprising battery 102 described herein. The energy retainer portion 2206 may provide a 33 Kwh standard battery field, for example. The energy retainer portion 2206 may include a plurality of individual battery units or modules. For example, as shown in FIG. 23, the energy retainer portion 2206 may include eight individual battery units. The energy retainer portion 2206 may store energy used to drive the at least one electric motor of the BEV. In accordance with several embodiments, the energy retainer portion 2206 may not comprise lithium ion batteries, which may provide a benefit to quality of the environment.

Figure 24:
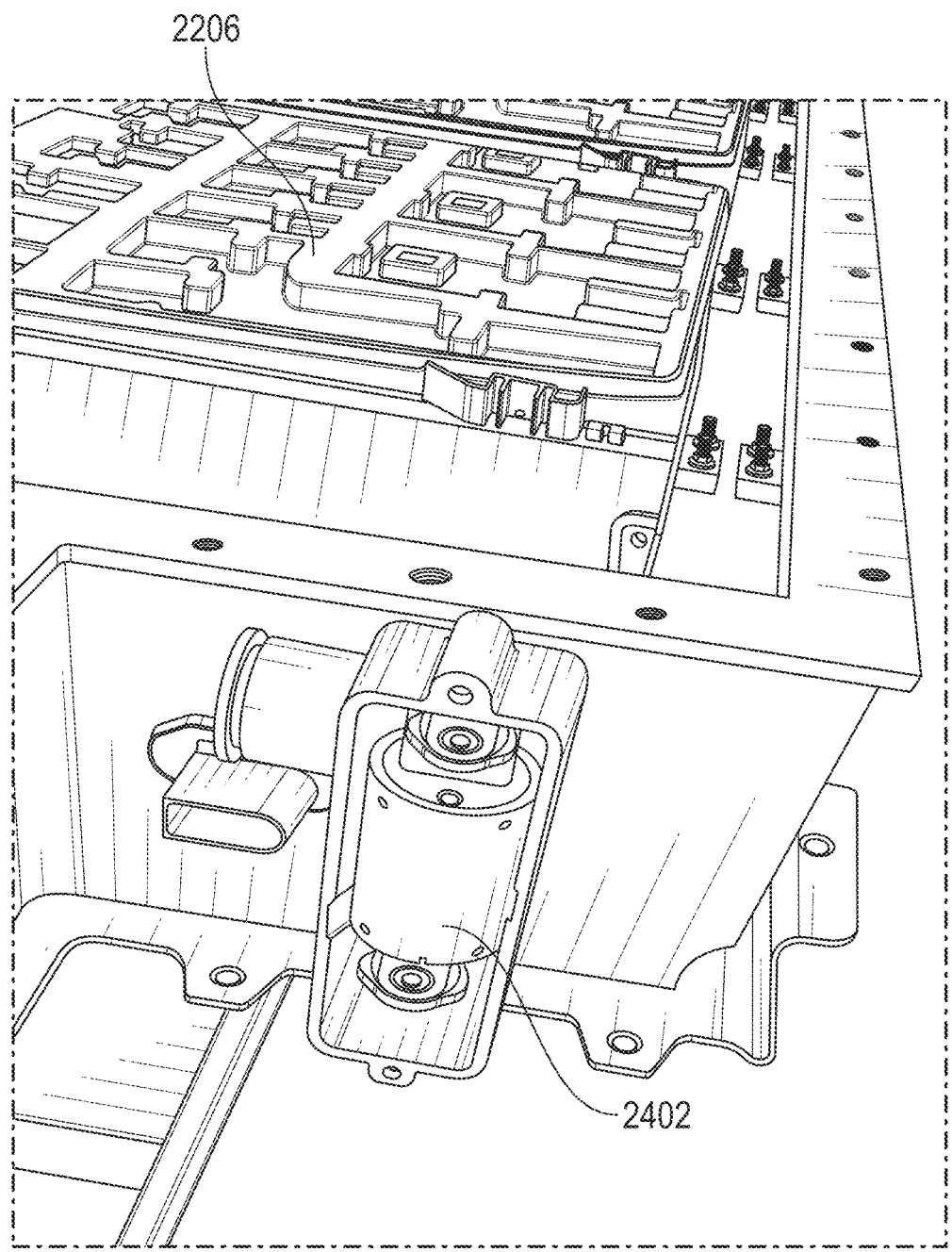
FIG. 24 illustrates an example embodiment of a fuse that may be connected to a battery incorporated in a BEV.

FIG. 24 illustrates an example embodiment of a fuse 2402. The fuse 2402 may be electrically coupled to the energy retainer portion 2206. The fuse 2402 may prevent the energy retainer portion 2206 from being overcharged and/or receiving too much energy (for example, from the ultracapacitor portion 2204 as shown in FIG. 22A). For example, if the energy retainer portion 2206 reaches a certain voltage level, the fuse 2402 may advantageously prevent the energy retainer portion 2206 from receiving any more energy to charge the energy retainer portion 2206.

Figure 25:
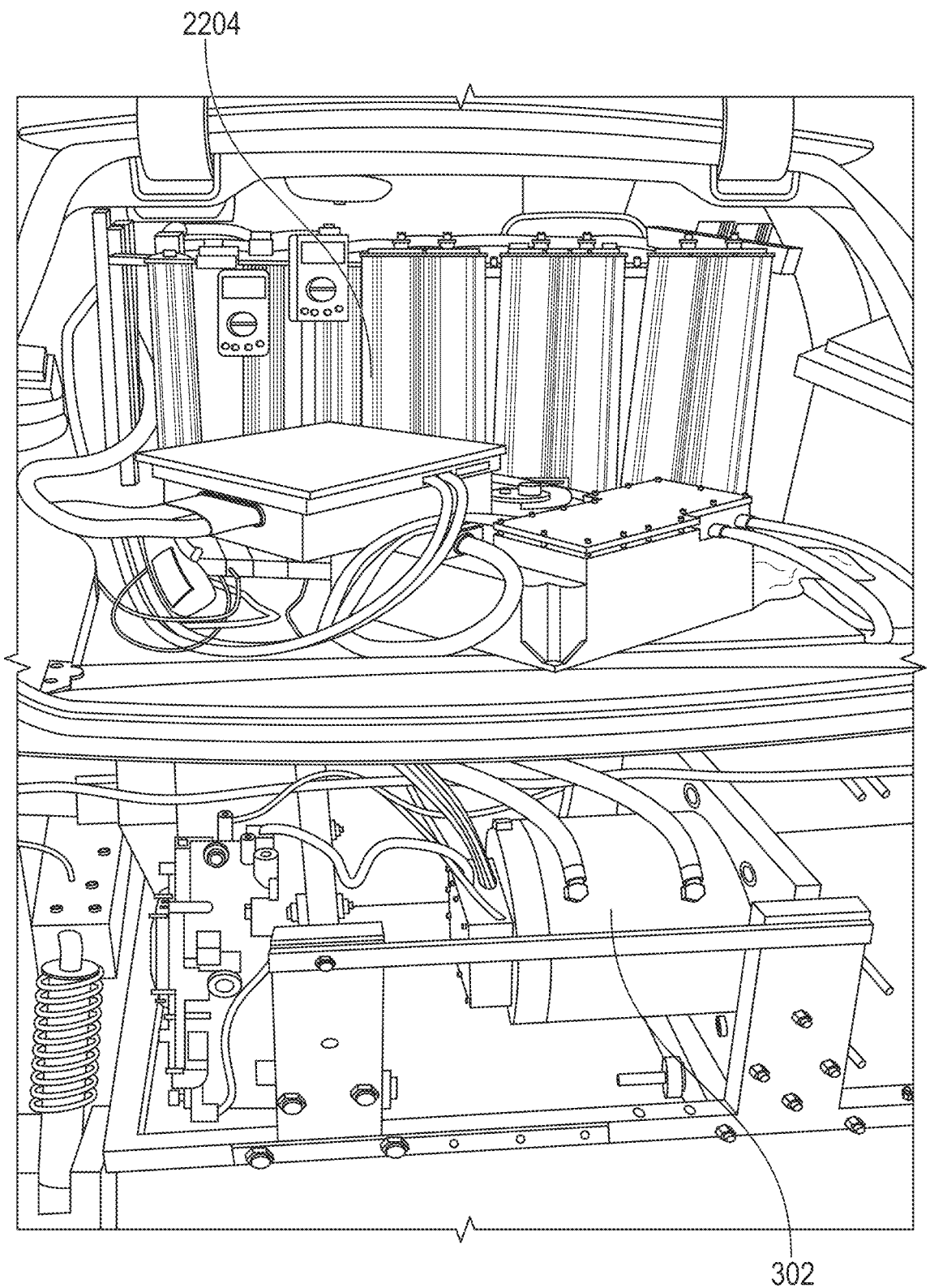
FIG. 25 illustrates an example embodiment of a capacitor of a hypercapacitor and a generator that may be used in a BEV.

FIG. 25 illustrates an example embodiment of an ultracapacitor portion 2204 of a hypercapacitor 2202 and a generator 302 of an OBCS. As discussed herein, the ultracapacitor portion 2204 may comprise one or more ultracapacitors and/or supercapacitors, such as described herein. The generator 302 may be electrically coupled to the ultracapacitor portion 2204 and may provide energy to the ultracapacitor portion 2204 to charge the ultracapacitor portion 2204, for example as the BEV is in motion. In some embodiments, the generator 302 may be electrically coupled to the ultracapacitor portion 2204 via high voltage wiring. In some embodiments, the generator 302 may be electrically coupled to the ultracapacitor portion 2204 without high voltage wiring. The ultracapacitor portion 2204 may be electrically coupled to the energy retainer portion 2206 (not shown) via high voltage line(s) and/or directly and/or via wiring which may stabilize the voltage of the ultracapacitor 2204 and prevent voltage loss due to self-discharge.

Figure 26:
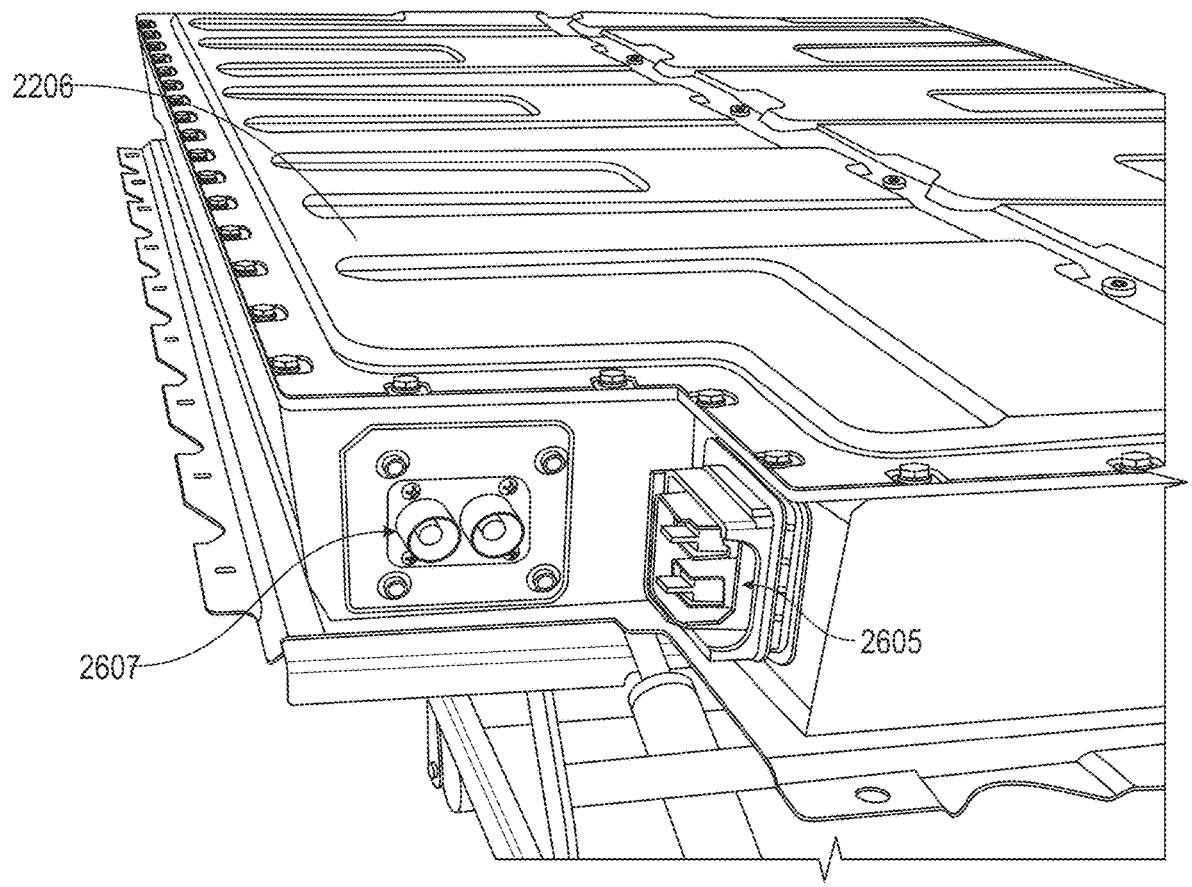
FIG. 26 illustrates an example embodiment of a battery of a hypercapacitor with electrical connections that may be incorporated into a BEV.

FIG. 26 illustrates an example embodiment of the energy retainer portion 2206. As shown in FIG. 26, the energy retainer portion 2206 may be enclosed by a housing such that the energy retainer portion 2206 is not substantially physically exposed. The housing of the energy retainer portion 2206 may include electrical connectors 2607, 2605. The electrical connectors 2607, 2605 may be electrically coupled to the energy retainer portion 2206 and may be capable of providing energy to the energy retainer portion 2206 to charge the energy retainer portion 2206. The electrical connectors 2607, 2605 may be configured to be removably electrically coupled to the ultracapacitor portion 2204. The ultracapacitor portion 2204 may provide energy to the energy retainer portion 2206 to charge the energy retainer portion 2206 directly via the electrical connectors 2607, 2605.

Figure 27:
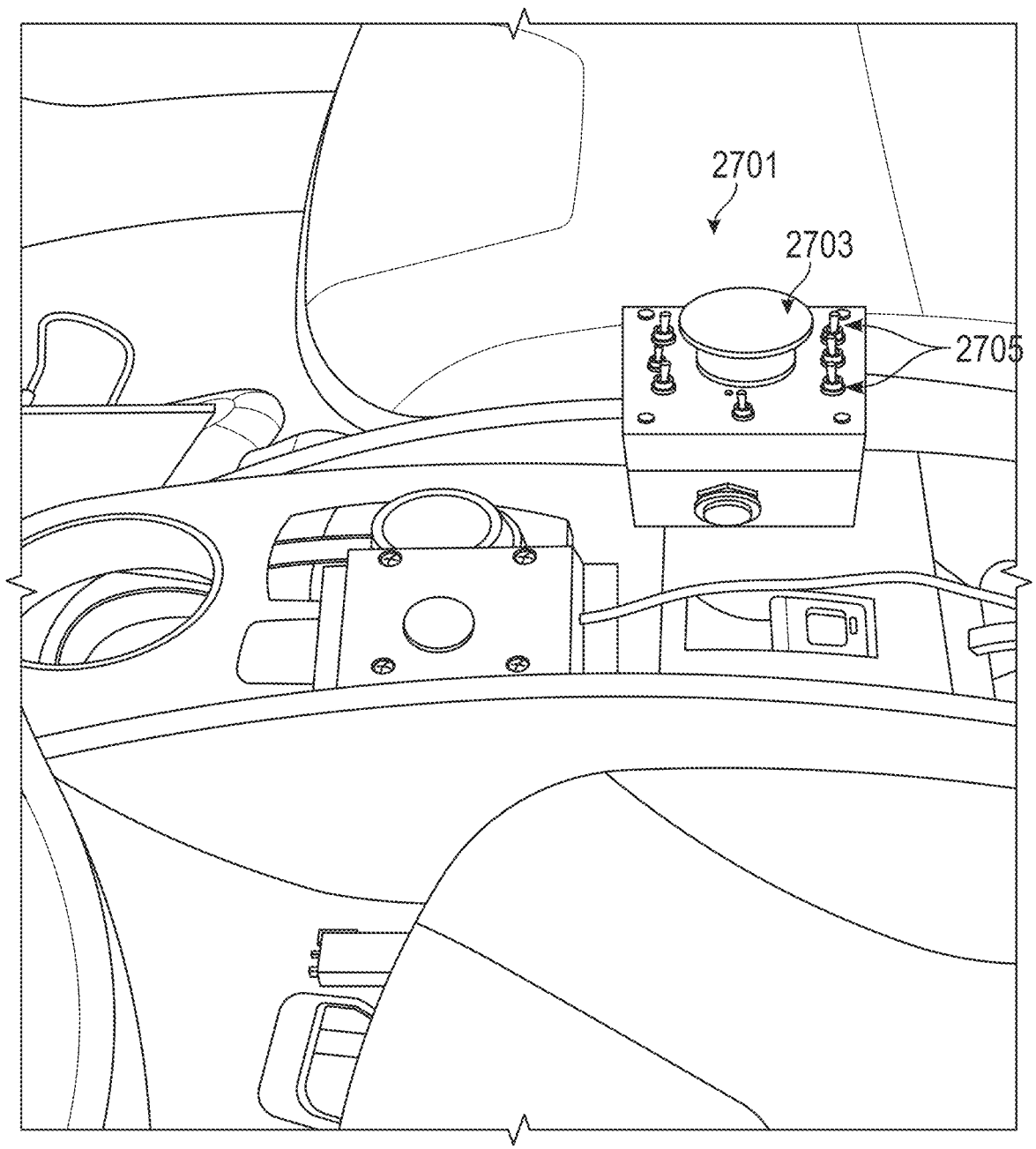
FIG. 27 illustrates an example embodiment of a toggle module for controlling the flow of energy between a generator, an ultracapacitor module, an energy retainer and/or a motor of a BEV.

FIG. 27 illustrates an example embodiment of a toggle module 2701. The toggle module 2701 shown in FIG. 27 may be incorporated into, implemented by, or used in conjunction with, the other systems, devices, or components described herein, such as the hypercapacitor 2202 and/or the OBCS 210. The toggle module 2701 may be electrically coupled to the generator 302 of the OBCS 210, the ultracapacitor portion 2204 (not shown) and the energy retainer portion 2206 (not shown) of the hypercapacitor 2202. The toggle module 2701 may control charging of the ultracapacitor portion 2204 and/or the energy retainer portion 2206. For example, the toggle module 2701 may control when the generator 302 provides energy to the ultracapacitor portion 2204 and/or when the ultracapacitor portion 2204 provides energy to the energy retainer portion 2206. The toggle module 2701 may be located within an interior region of a BEV, such as adjacent to a driver as shown in FIG. 27.

The toggle module 2701 may include one or more buttons, switches or other mechanisms that may be operated by a user, such as a driver of the BEV. For example, the toggle module 2701 may include a button 2703 and one or more switches 2705. The button 2703 and switches 2705 are given as examples of user-operable mechanisms and are not meant to be limiting. In some embodiments, toggle module 2701 may include other user-operable mechanisms, such as a capacitive touchscreen or electronic actuator. Operation of the one or more switches 2705, such as by a user, may cause the generator to charge the ultracapacitor portion 2204 or to cease charging the ultracapacitor portion 2204. Each of the one or more switches 2705 may correspond to a unique capacitor of the ultracapacitor portion 2204. Operation of the button 2703, such as by a user, may cause the ultracapacitor portion 2204 to charge the energy retainer portion 2206 or to cease charging the energy retainer portion 2206. Additionally, and/or alternatively to manually toggling between charging and not charging the ultracapacitor portion 2204 and/or the energy retainer portion 2206 described with reference to FIG. 27, automatically toggling may occur based on various resistances, voltages etc., as discussed herein.

Figure 28:
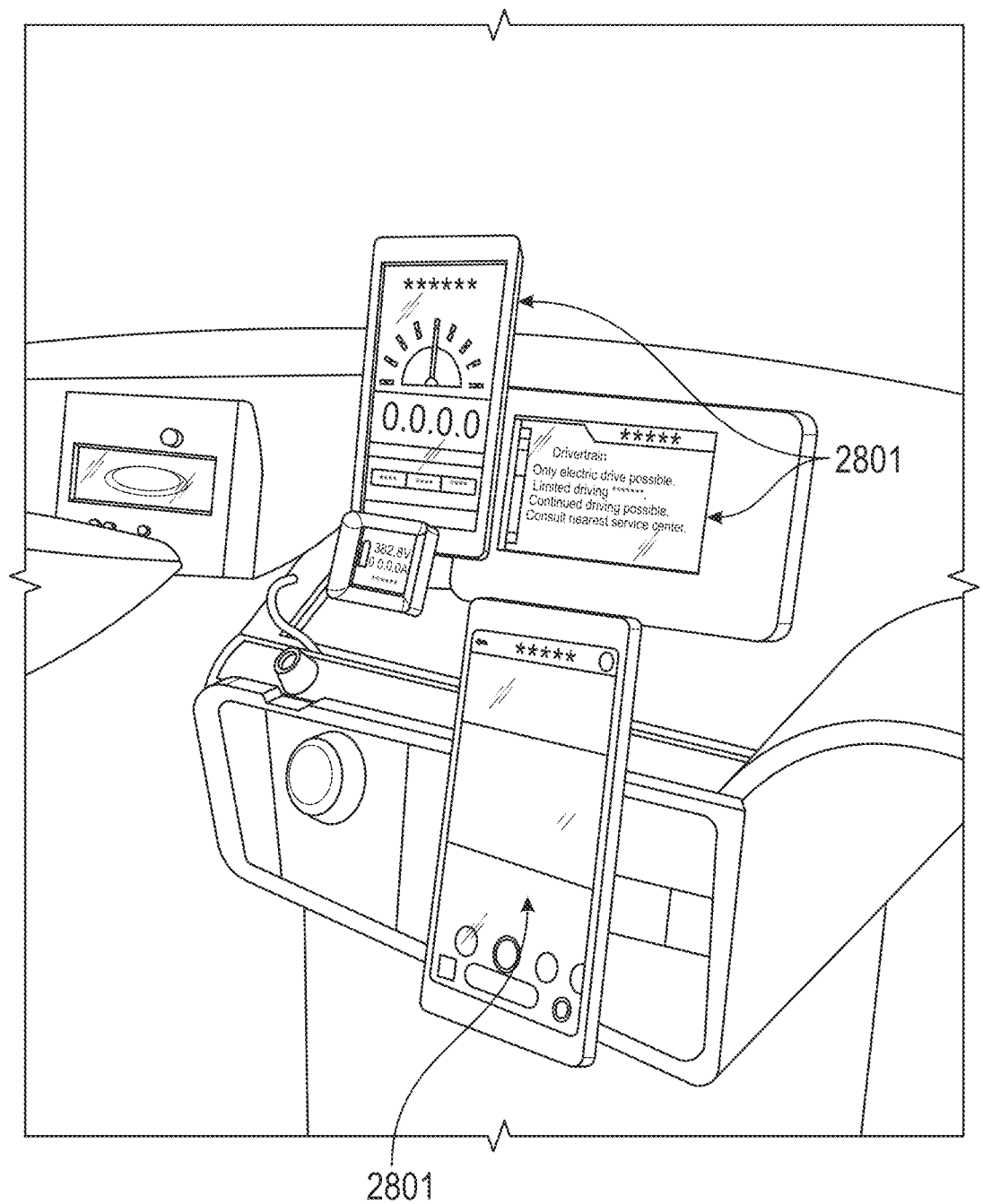
FIG. 28 illustrates example embodiments of instruments that may be incorporated in a BEV and used in conjunction with the other systems, devices, or components described herein.

FIG. 28 shows various instruments 2801 which may be incorporated into, implemented by, or used in conjunction with, the other systems, devices, or components described herein, such as the hypercapacitor 2202 and/or the OBCS 210. In some embodiments, the instruments 2801 may be configured to display information to a user, such as a driver of a BEV. For example, the instruments 2801 may display voltage and/or amperage of components of the BEV such as the hypercapacitor 2202 and/or the OBCS 210. The instruments 2801 may display, for example, charge rate and/or charge status of the ultracapacitor 2204 and the energy retainer portion 2206. In some embodiments, the instruments 2801 may be configured to receive user input, which may control operation and/or functionality of the systems as described herein.

Figure 29:
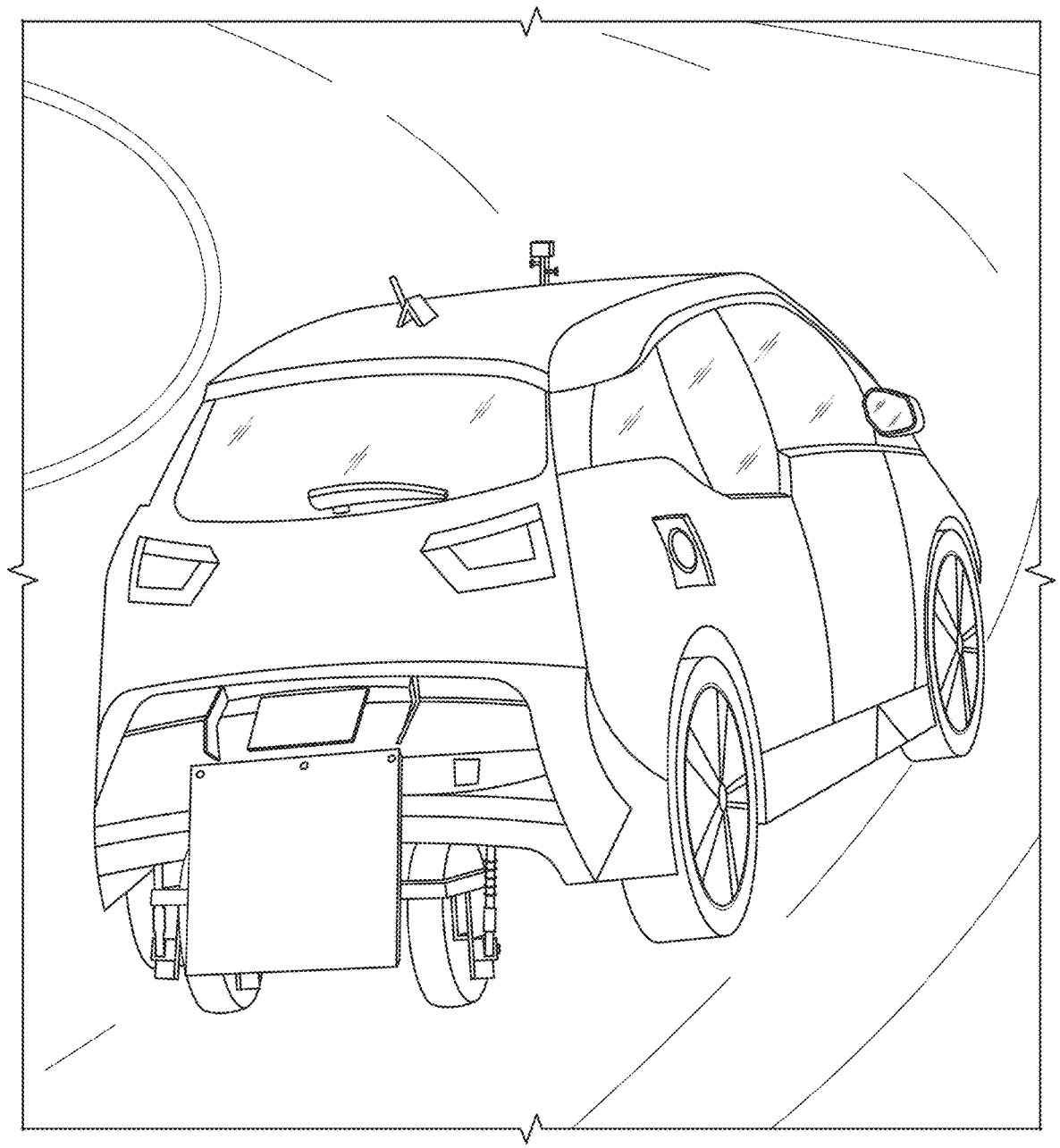
FIG. 29 illustrates an example BEV employing the systems and components discussed herein such as the one or more driven masses (e.g., fifth wheel), the OBCS and the hypercapacitor.

FIG. 29 shows an example BEV employing the systems and components as discussed herein such as the one or more driven masses (e.g., fifth wheel 202), the OBCS 210, hypercapacitor 2202 and other components discussed herein. The BEV shown in FIG. 29 is not meant to be limiting and any vehicle, vessel or equipment (such as those shown in FIGS. 31A-31M) may incorporate the systems and components discussed herein.

FIG. 30 illustrates a chart of example data relating to voltage generation and usage of an OBCS 210 and hypercapacitor 2202 operating in a BEV while travelling a distance. As shown in FIG. 30, the BEV starts at a location 0 and travels a distance of 6.6 miles during which the OBCS 210 and hypercapacitor 2202 are operating within the BEV. The chart of FIG. 30 shows the voltage generated by the OBCS 210 and provided to the ultracapacitor portion 2204 (left column; denominated ultracapacitor voltage) and the voltage provided from the energy retainer portion 2206 to the motor of the vehicle (right column; denominated battery field voltage). As shown in the chart of FIG. 30, the ultracapacitor voltage and energy retainer portion voltage begin at 352.4V and 351.2V, respectively, when the BEV is at location 0. Upon starting the vehicle, the voltage of the ultracapacitor portion 2204 and/or the energy retainer portion 2206 may decrease significantly, for example by about 5V. This may be due to the large amounts of energy required to start the motor of a vehicle and/or to accelerate the vehicle from rest.

In some embodiments, the fifth wheel 202 may be configured to not be in contact with the ground (for example in a position stored upward from the ground) as the vehicle accelerates (for example from rest) to reduce the drag on the vehicle as the vehicle accelerates and so to minimize the energy reduction in the ultracapacitor portion 2204 and/or energy retainer portion 2206 required for acceleration of the vehicle. The fifth wheel 202 may be configured to drop, for example automatically, to contact the ground to begin generating energy as discussed herein when the vehicle is not accelerating (for example from rest), for example when the vehicle has reached a substantially constant, non-zero velocity for example 25 miles per hour. The fifth wheel may be configured to automatically raise (to avoid contact with the ground to reduce drag on the vehicle) when the vehicle is accelerating and/or when the vehicle's acceleration is above a certain threshold, when the vehicle is accelerating within certain velocities and/or when the vehicle is moving within threshold velocities. The fifth wheel may be configured to automatically drop (to contact the ground to generate energy) when the vehicle is not accelerating, and/or when the vehicle's acceleration is below a certain threshold and/or when the vehicle is moving within threshold velocities.

As the vehicle travels, the driven mass, such as the fifth wheel 202, the OBCS 210 and other components described herein may generate energy to transfer to the ultracapacitor 2204. As the ultracapacitor portion 2204 receives energy, for example, from the generator 302, the ultracapacitor portion 2204 may increase in voltage. The ultracapacitor portion 2204 may transfer energy to the energy retainer portion 2206 to charge the energy retainer portion 2206.

As shown in the graph of FIG. 30, as the BEV travels from mile 1 to mile 6.6 the voltage in the ultracapacitor portion 2204 remains relatively constant (e.g., 345.3 to 345.5). The increase in the ultracapacitor portion 2204 voltage of 0.2V may be due to the energy received from the energy generating components such as the driven mass(es) (e.g., fifth wheel 202) and the generator 302.

As shown in the graph of FIG. 30, as the BEV travels from mile 1 to mile 6.6 the voltage in the energy retainer portion 2206 may increase from 346V to 349.02V. The increase in the energy retainer portion 2206 voltage of about 3V may be due to energy received from the ultracapacitor portion 2204. As shown by the data of the graph of FIG. 30, as the BEV travels, energy may be generated by the energy generating components such as the driven mass, the generator 302, etc., and may be provided to the ultracapacitor portion 2204 which may in turn provide the energy to the energy retainer portion 2206.

FIGS. 31A-31M illustrate various example vehicles or otherwise that may incorporate the various components and systems discussed herein such as a power generation system, which may also be referred to as a charging system, such as the OBCS 210, which may comprise a generator 302, one or more driven masses 3102, an energy storage system such as the hypercapacitor 2202 discussed herein, and a motor 104. The OBCS 210 may be coupled to the hypercapacitor 2202 and may be capable of providing energy to the hypercapacitor 2202, as discussed herein. The hypercapacitor 2202 may be coupled to the motor 104 and may be capable of providing energy to the motor 104.

FIGS. 31A-31M are shown as examples and are not meant to be limiting. In some embodiments, the example vehicles shown in FIGS. 31A-31M may not include one or more of the components shown, such as the hypercapacitor energy storage device 2202 and/or the charging system. For example, in some embodiments, a vehicle may incorporate a hypercapacitor 2202 and motor 104 but not a charging system and driven mass. In some embodiments, a vehicle may incorporate a charging system coupled directly to a motor 104 without a hypercapacitor 2202. In some embodiments, the hypercapacitor 2202 may be replaced with an alternative energy storage system, such as any of the energy storage system embodiments discussed herein. In some embodiments, the example vehicles shown in FIGS. 31A-31M may include additional components not shown in FIGS. 31A-31M. In some embodiments, the components shown in the example vehicles of FIGS. 31A-31M may be coupled according to any of the various example embodiments discussed herein which may or may not be shown in FIGS. 31A-31M. The OBCS 210 and hypercapacitor 2202 and other components show in FIGS. 31A-31M may operate as discussed in any of the examples herein. The driven mass 3102 may comprise a wheel (such as the fifth wheel 202) or other mechanism such as a propeller, rotor, turbine, or the like, as discussed herein.

Figure 31A:
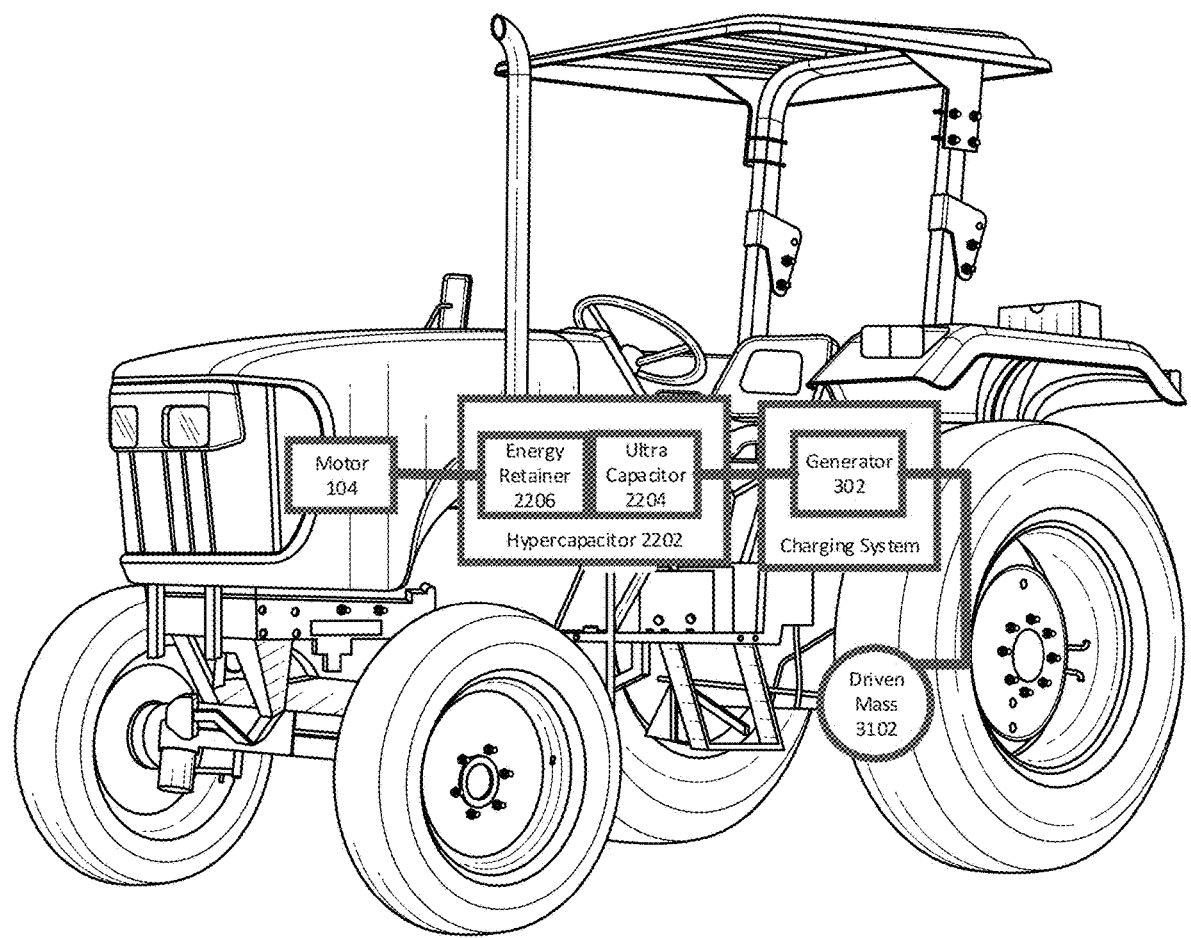
FIGS. 31A-31M illustrate various example vehicles or otherwise that may implement various components as discussed herein, such as an OBCS, and/or hypercapacitor energy storage device.
Figure 31B:
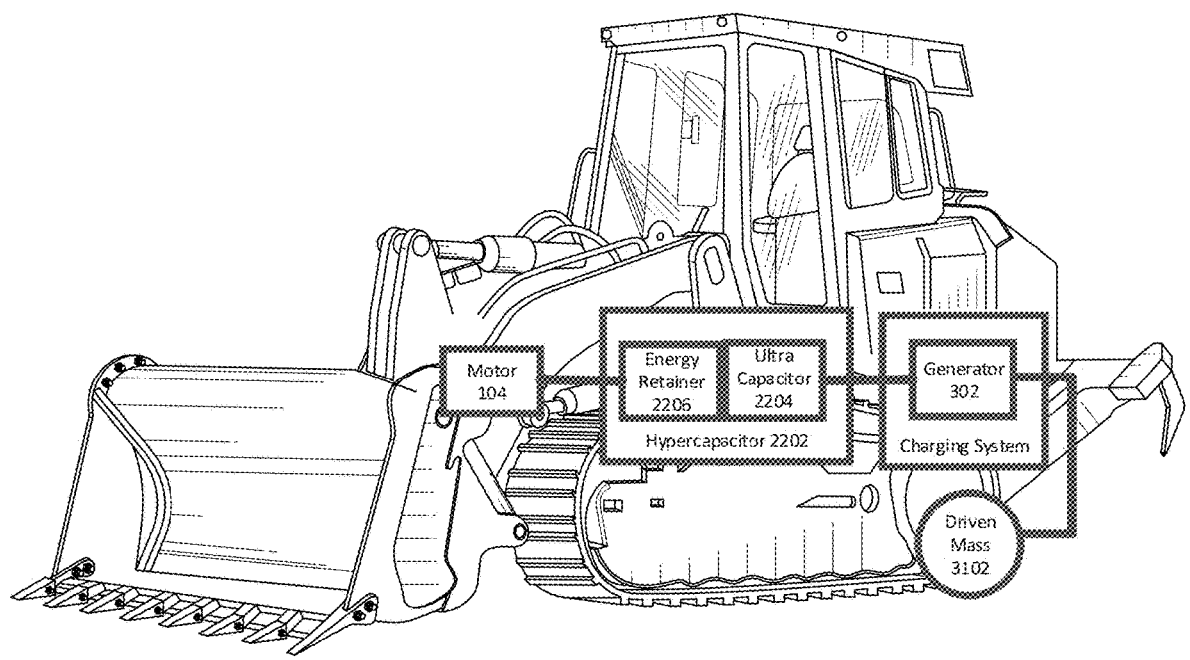

FIGS. 31A and 31B illustrate example farm and/or construction equipment that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31C:
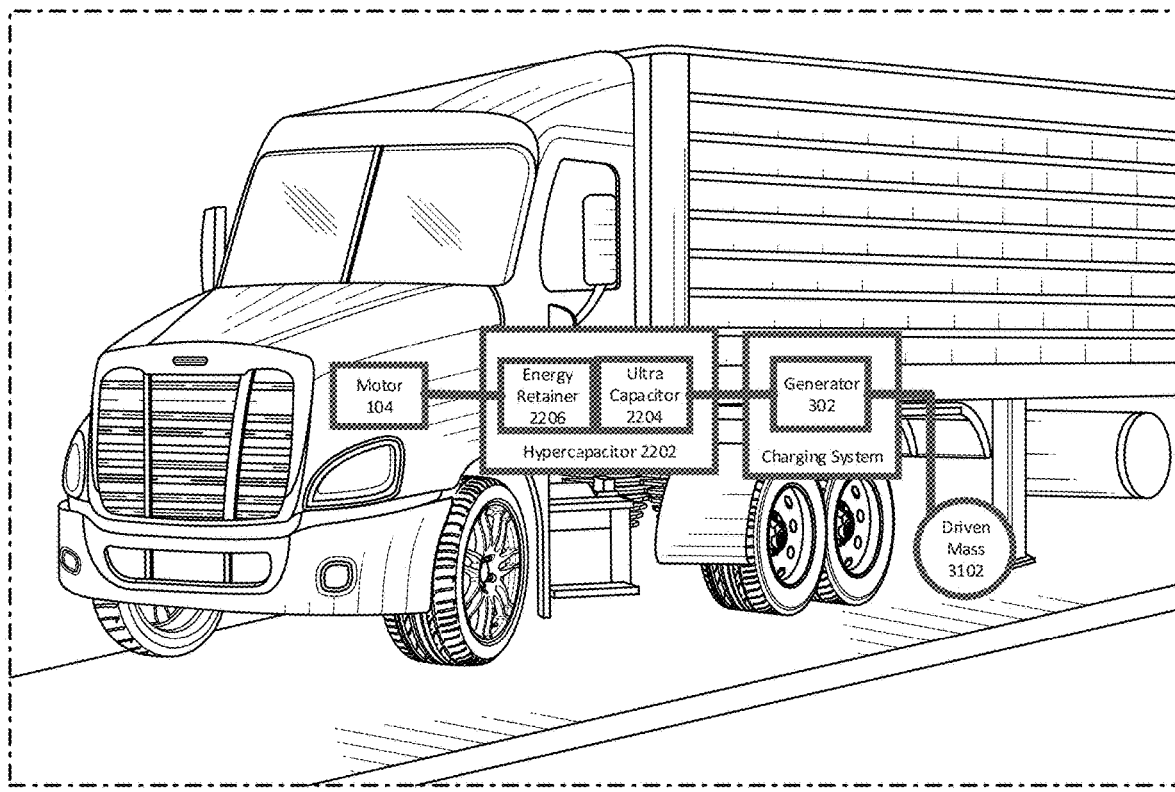

FIG. 31C illustrates an example commercial vehicle, such as a semi-truck, that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31D:
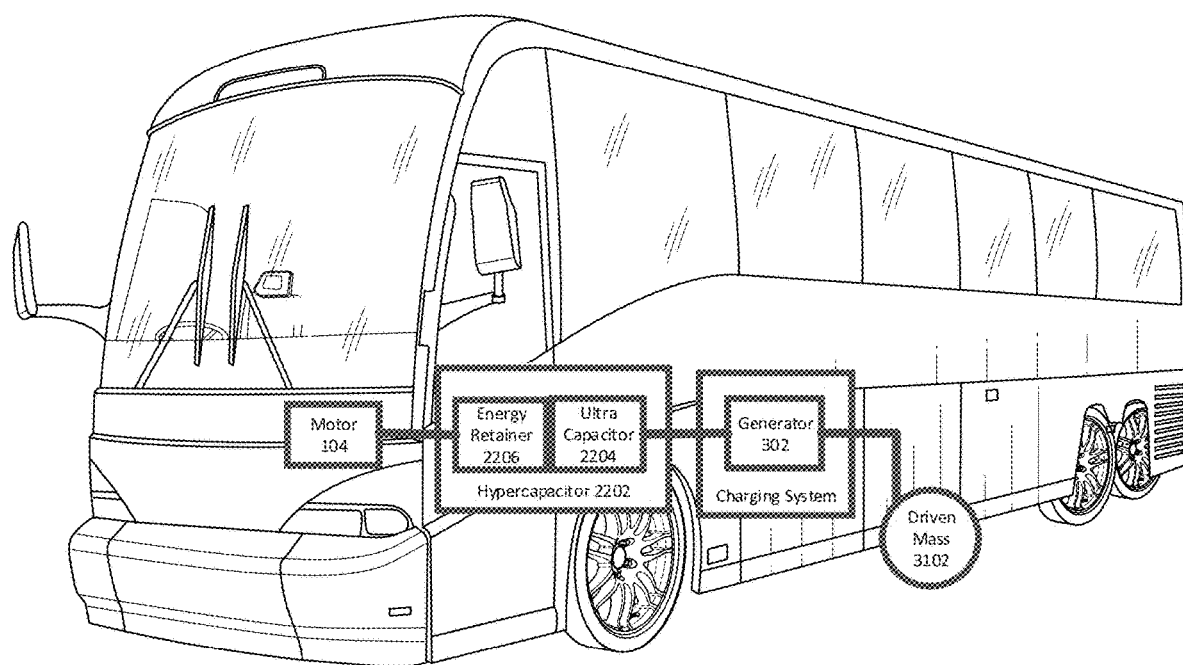

FIG. 31D illustrates an example electric bus that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31E:
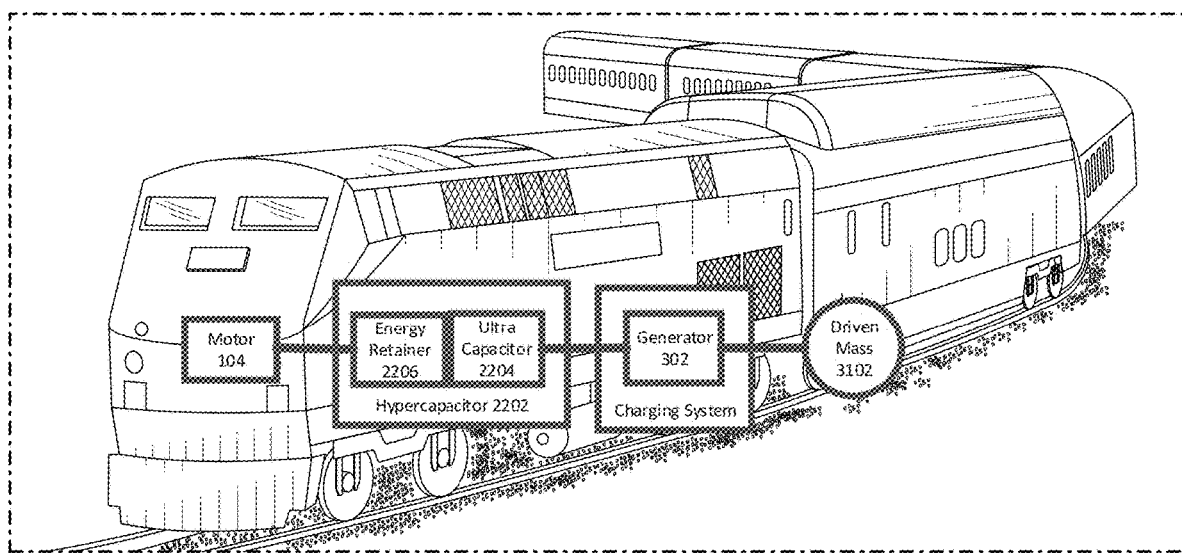

FIG. 31E illustrates an example electric rail vehicle that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31F:
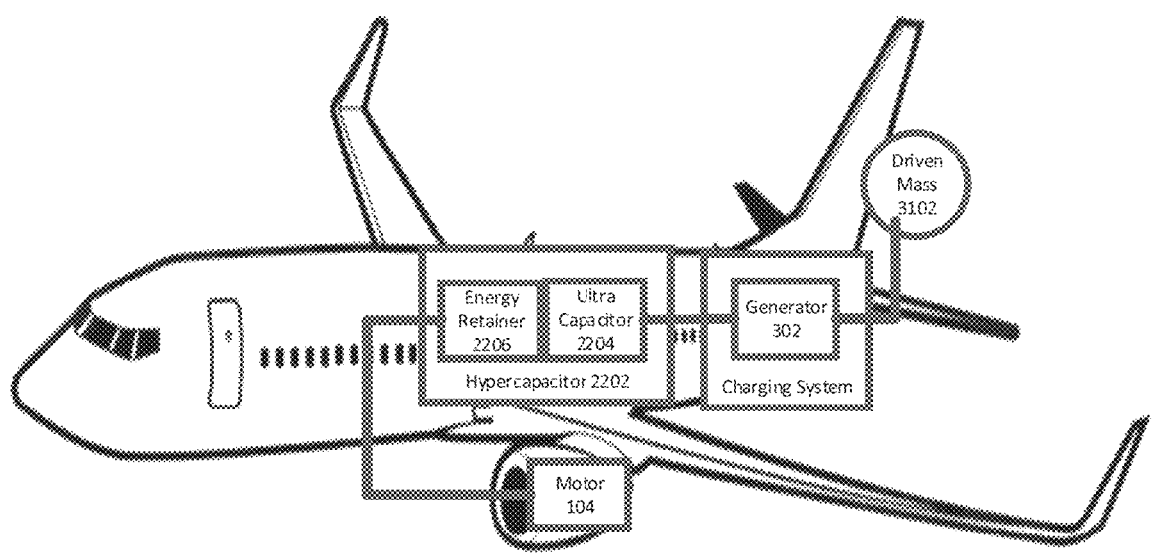
Figure 31G:
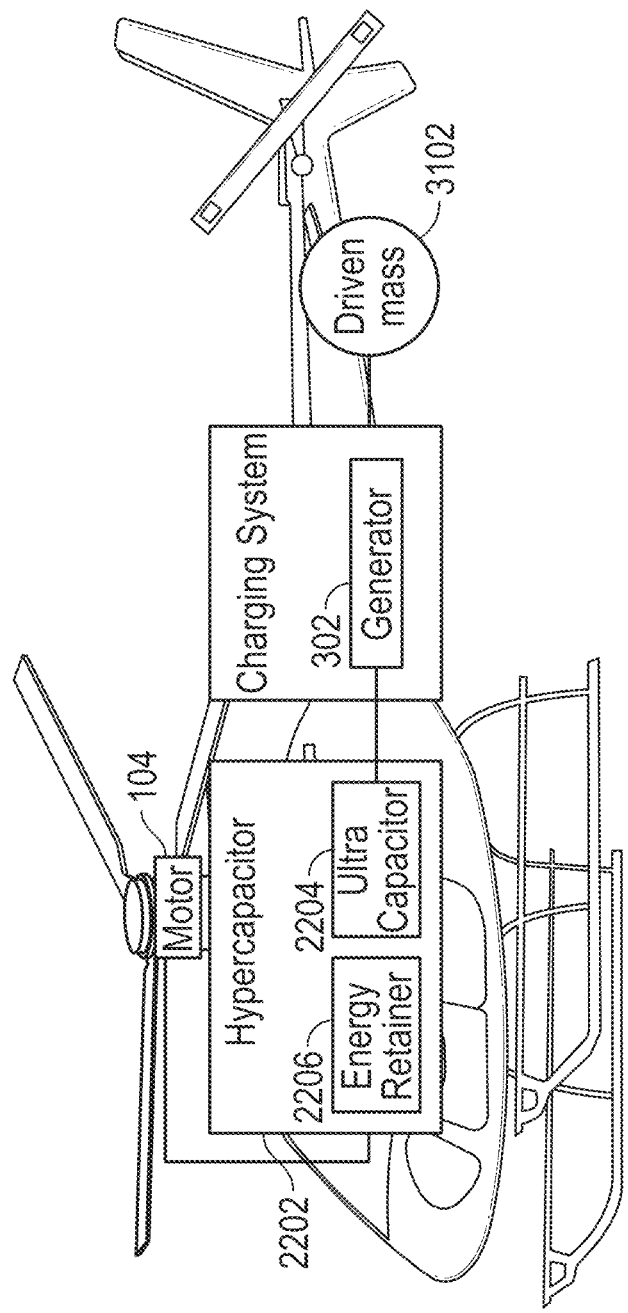

FIGS. 31F-31G illustrate example aircraft that may incorporate a power generation system such as the OBCS 210 discussed herein, a driven mass 3102 and/or an energy storage system such as the hypercapacitor 2202 discussed herein.

Figure 31H:
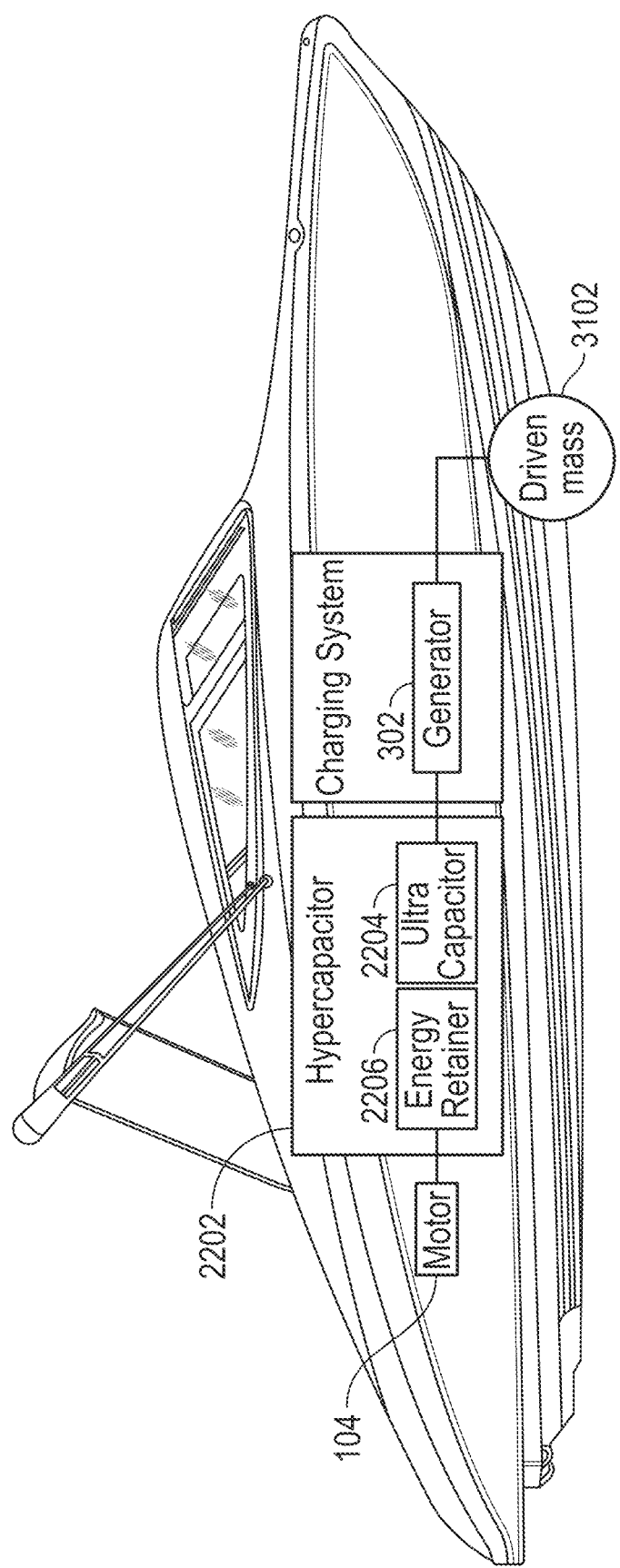

FIG. 31H illustrates an example watercraft that may incorporate a power generation system such as the OBCS 210 discussed herein, a driven mass 3102 and/or an energy storage system such as the hypercapacitor 2202 discussed herein.

Figure 31I:
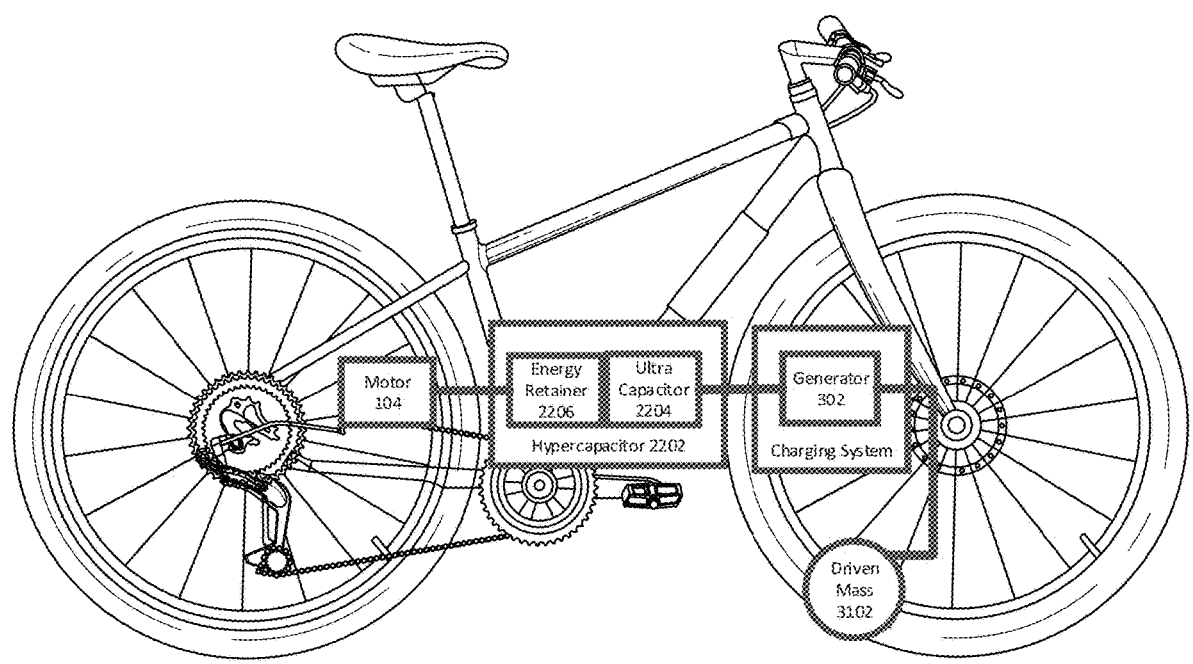

FIG. 31I illustrates an example electric bicycle that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31J:
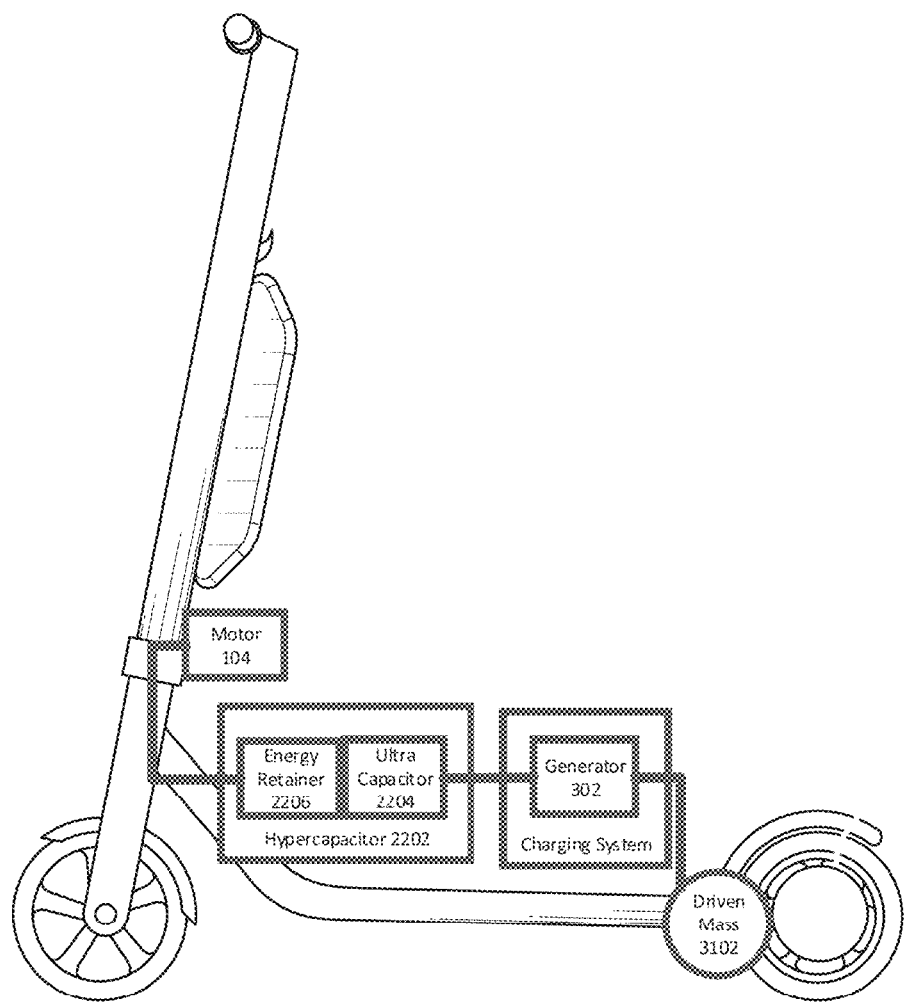

FIG. 31J illustrates an example electric scooter that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31K:
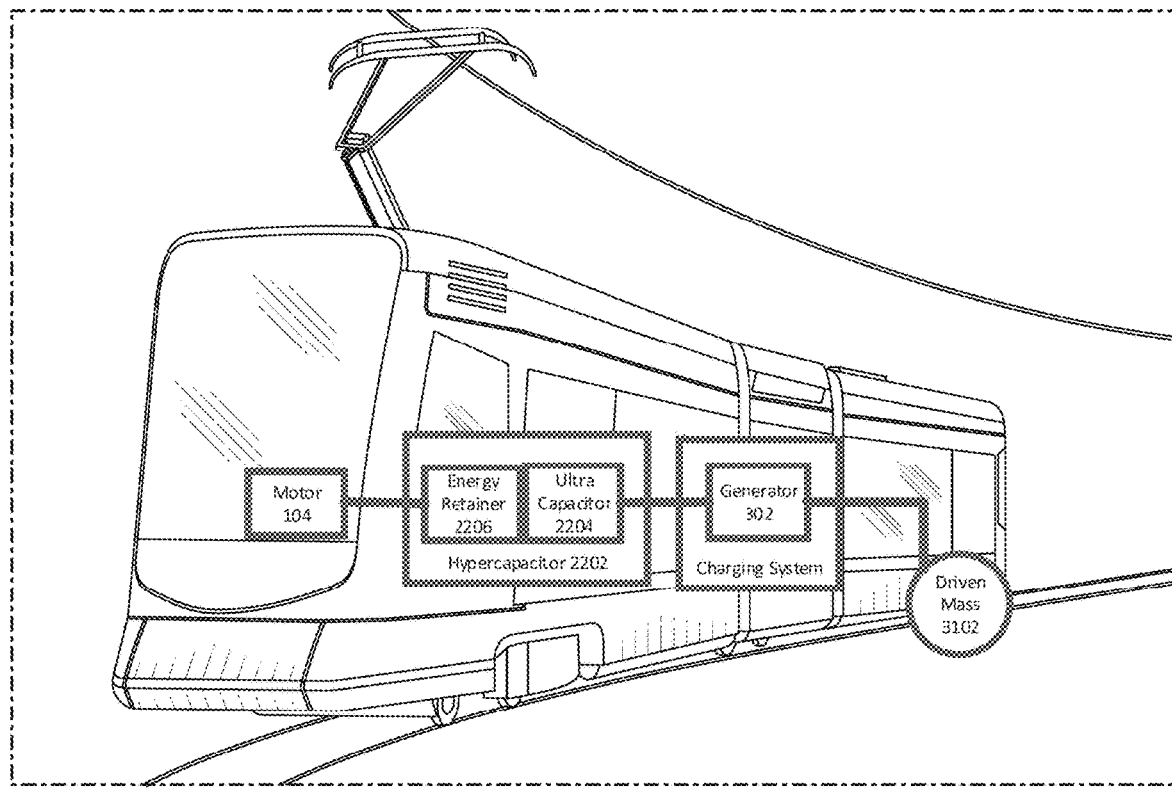

FIG. 31K illustrates an example electric tram or cable car that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31L:
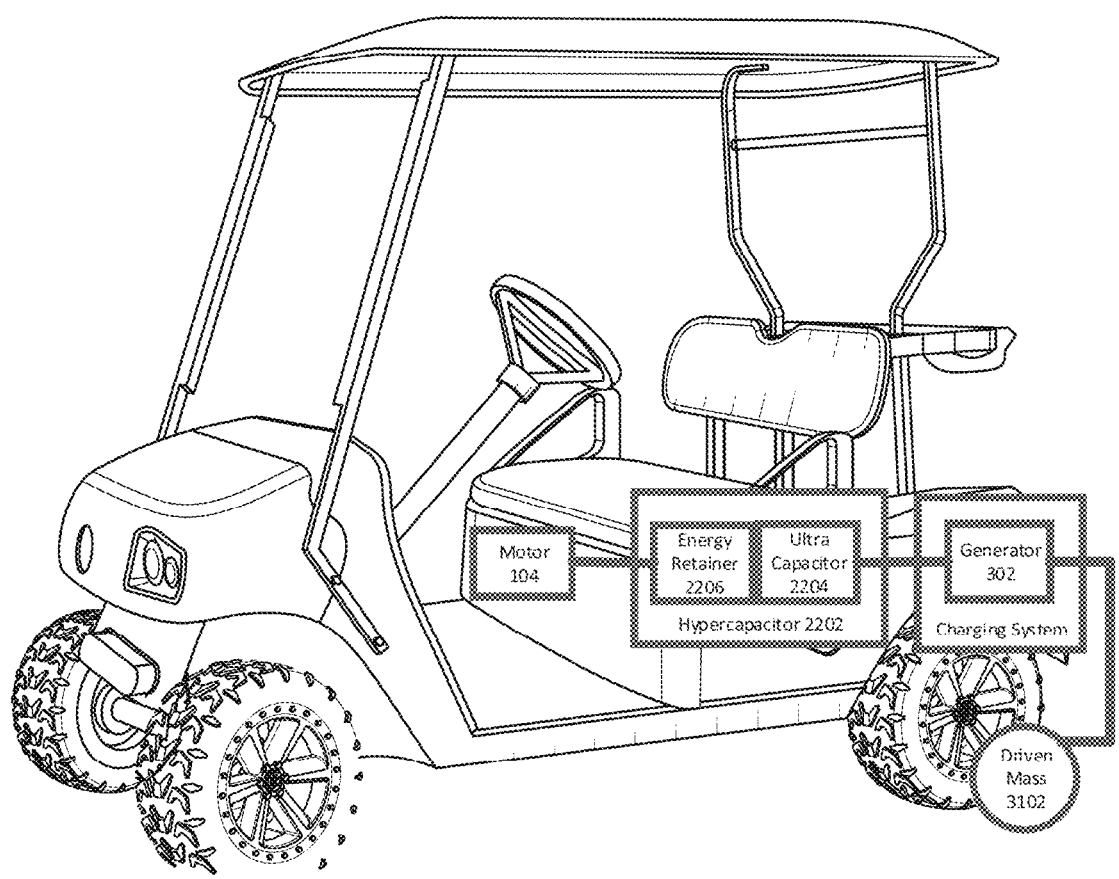

FIG. 31L illustrates an example electric cart such as a golf cart that may incorporate a power generation system such as the OBCS 210 discussed herein, a driven mass 3102, such as the one or more fifth wheels 202 discussed herein, and/or an energy storage system such as the hypercapacitor 2202 discussed herein.

Figure 31M:
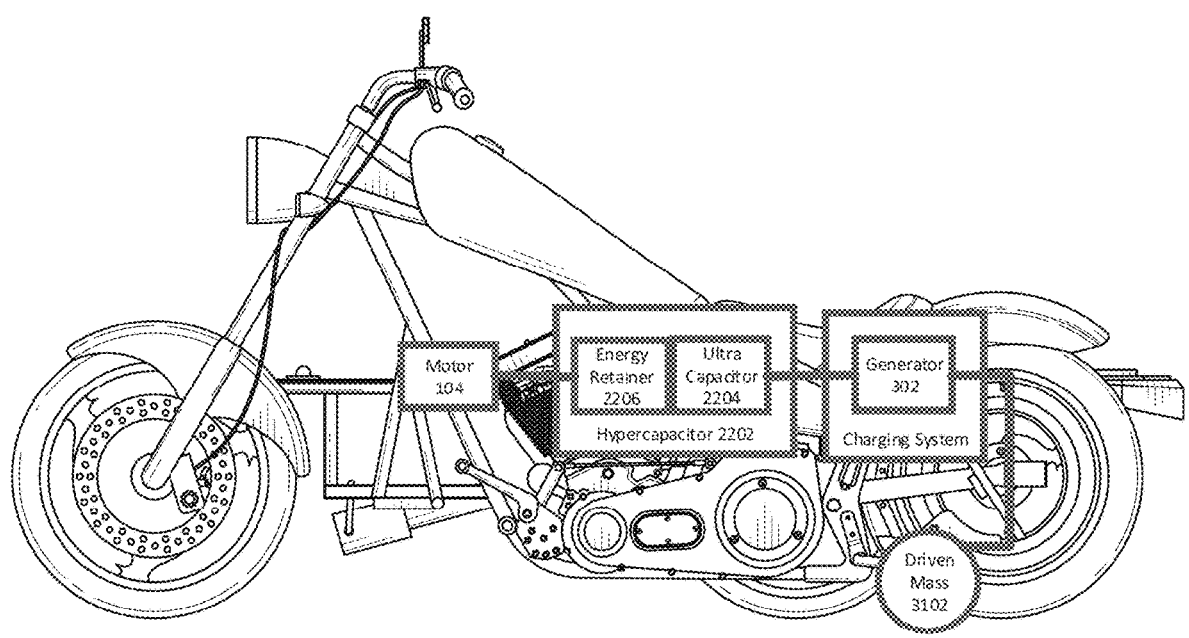

FIG. 31M illustrates an example electric motorcycle that may incorporate a power generation system such as the OBCS 210 discussed herein, a driven mass 3102, such as the one or more fifth wheels 202 discussed herein, and/or an energy storage system such as the hypercapacitor 2202 discussed herein.

Farm and Construction Equipment

In some instances, the OBCS 210 and the one or more fifth wheels 202 (and corresponding equipment) may be integrated with electric powered farm equipment and/or construction equipment. Such farm equipment may comprise an electric tractor, an electric swather, an electric sprayer, and the like. In such embodiments, the fifth wheel(s) 202 may be sized to rotate multiple times for each single rotation of a wheel of the electric powered farm equipment. Furthermore, the electric powered farm equipment may comprise multiple fifth wheels 202 and corresponding equipment. The electric power farm equipment may comprise multiple batteries and/or energy storage components. As such, the multiple fifth wheels 202 and corresponding equipment may be used to charge the energy storage components of the electric power farm equipment while the electric power farm equipment is in operation and/or in motion. In some instances, the OBCS 210 may comprise or be coupled to a controller configured to automatically detect a voltage of the energy storage components and/or motors of the electric powered farm equipment when the OBCS 210 is coupled to the electric power farm equipment, for example via a charge port of the electric power farm equipment. In some instances, based on the detected voltage of the energy storage components and/or motors of the electric powered farm equipment, the OBCS 210 can automatically adapt or adjust its output voltage to appropriately charge the energy storage components of the electric power farm equipment. Similarly, in some embodiments, the controller may enable retraction and/or extension of one or more of the multiple fifth wheels 202 to enable the controller to vary the amount of power generated by the multiple fifth wheels 202. In some instances, the OBCS 210 may vary energy generated and/or output by the OBCS 210 based on demand or the electric powered farm equipment. In some instances, the OBCS 210 may route power generated by the OBCS 210 based on demand, for example directly to motors powering the electric powered farm equipment in certain conditions, motors and batteries/capacitors of the electric powered farm equipment, and/or motors, batteries, and capacitors of the electric powered farm equipment. In some instances, such control of the fifth wheels 202 may be based on an analysis of charge remaining in the energy storage components of the electric powered farm equipment and/or current demand of operation of the electric powered farm equipment.

In some instances, the fifth wheel 202 may be coupled to a gearbox allowing one or more ratios of rotating components to be adapted to the movement of the electric powered farm equipment, enabling the OBCS 210 and/or an operator to mechanically control and/or adjust rates at which electricity is generated by generators coupled to the fifth wheel(s) 202. For example, the gearbox can enable changing of ratios between the rotation of the fifth wheel(s) 202 of the electric powered farm equipment based on a speed at which the electric powered farm equipment is traveling or a grade on which the electric powered farm equipment is traveling, thereby impacting rotations of the generator and electricity produced by the generator. For example, if the electric powered farm equipment is traveling slowly or up-hill, the gearbox can be adjusted such that the ratio of the generator and the fifth wheels 202 are closer to each other. If the electric powered farm equipment is traveling quickly or down-hill, the gearbox can be adjusted such that the ratio of the generator and the fifth wheels 202 are such that a single rotation of the fifth wheel 202 results in multiple rotations of the generator via the gearbox.

Transportation Equipment

In some instances, the OBCS 210 and the one or more fifth wheels 202 (and corresponding equipment) may be integrated with electric powered transportation equipment. Such transportation equipment may comprise an electric bus, an electric train, an electric plane, an electric watercraft, and the like. In such embodiments, the fifth wheel(s) 202 may be sized to rotate multiple times for each single rotation of a wheel of the electric powered transportation equipment. When the equipment comprises the electric plane, the fifth wheel(s) 202 may comprise wheels on the landing gear or rotation fans or similar components disposed on the plane that rotate in response to movement of the plane through the atmosphere or an environment (for example, caused to move by wind or resistance in the air, etc.). When the equipment comprises the electric watercraft, the fifth wheel(s) 202 may comprise one or more propellers in the water that rotate in response to the watercraft moving through the water or blades, fans, or similar components that rotate in response to movement of the watercraft through the atmosphere or an environment (for example, caused to move by wind or resistance in the air, etc.). Furthermore, the electric powered transportation equipment may comprise multiple fifth wheels 202 and corresponding equipment. The electric power transportation equipment may comprise multiple batteries and/or energy storage components. As such, the multiple fifth wheels 202 and corresponding equipment may be used to charge the energy storage components of the electric power transportation equipment while the electric power transportation equipment is in operation and/or in motion. In some instances, the OBCS 210 may comprise or be coupled to a controller configured to automatically detect a voltage of the energy storage components and/or motors of the electric powered transportation equipment when the OBCS 210 is coupled to the electric power transportation equipment, for example via a charge port of the electric power transportation equipment. In some instances, based on the detected voltage of the energy storage components and/or motors of the electric powered transportation equipment, the OBCS 210 can automatically adapt or adjust its output voltage to appropriately charge the energy storage components of the electric power transportation equipment. Similarly, in some embodiments, the controller may enable retraction and/or extension of one or more of the multiple fifth wheels 202 to enable the controller to vary the amount of power generated by the multiple fifth wheels 202. In some instances, the OBCS 210 may vary energy generated and/or output by the OBCS 210 based on demand or the electric powered transportation equipment. In some instances, the OBCS 210 may route power generated by the OBCS 210 based on demand, for example directly to motors powering the electric powered transportation equipment in certain conditions, motors and batteries/capacitors of the electric powered transportation equipment, and/or motors, batteries, and capacitors of the electric powered transportation equipment. In some instances, such control of the fifth wheels 202 may be based on an analysis of charge remaining in the energy storage components of the electric powered transportation equipment and/or current demand of operation of the electric powered transportation equipment.

In some instances, the fifth wheel 202 may be coupled to a gearbox allowing one or more ratios of rotating components to be adapted to the movement of the electric powered transportation equipment, enabling the OBCS 210 and/or an operator to mechanically control and/or adjust rates at which electricity is generated by generators coupled to the fifth wheel(s) 202. For example, the gearbox can enable changing of ratios between the rotation of the fifth wheel(s) 202 of the electric powered transportation equipment based on a speed at which the electric powered transportation equipment is traveling or a grade on which the electric powered transportation equipment is traveling, thereby affecting rotations of the generator and electricity produced by the generator. For example, if the electric powered transportation equipment is a watercraft traveling against a current or an aircraft flying into a headwind, the gearbox can be adjusted such that the ratio of the generator and the fifth wheels 202 are closer to each other. If the electric powered watercraft is traveling with current or is the electric power plane traveling with a tail-wind, the gearbox can be adjusted such that the ratio of the generator and the fifth wheels 202 are such that a single rotation of the fifth wheel 202 results in multiple rotations of the generator via the gearbox, and so forth.

In some instances, the fifth wheel 202 may be integrated with a non-driven wheel of a vehicle or motor powered device. For example, non-driven wheels 106 in the BEV 100 can be mechanically coupled to the generator 302 in a manner such that the non-driven wheels 106 can operate as the fifth wheel 202. As such, the non-driven wheels 106 can cause the generator 302 to rotate and create energy to charge the capacitor module 502 and/or the battery module 102. In some instances, the non-driven wheel 106 may comprise one of the wheels used for directional control of the BEV 100, for example one of the wheels that change orientation or direction in response to a steering instructions for the BEV 100.

Personalized Equipment

In some instances, the OBCS 210 and the one or more fifth wheels 202 (and corresponding equipment) may be integrated with personalized electric powered equipment, such as a bicycle, a motorized scooter, a skateboard, and the like. Such personalized powered equipment may comprise an electric bus, an electric train, an electric plane, an electric watercraft, and the like. In such embodiments, the fifth wheel(s) 202 may be sized to rotate multiple times for each single rotation of a wheel of the personalized powered equipment. When the equipment comprises the scooter or the skateboard, the fifth wheel(s) 202 may comprise wheels on a bottom of the scooter or skateboard that rotate in response to movement of the scooter or skateboard, for example on a road, sidewalk, or the like. When the scooter that operates in or under water, the fifth wheel(s) 202 may comprise one or more propellers in the water that rotate in response to the scooter moving through the water or one or more blades, fans, or similar components that rotate in response to movement of the watercraft through the atmosphere or an environment (for example, caused to move by resistance in the water, wind, air, etc.). The personalized powered equipment may comprise multiple fifth wheels 202 and corresponding equipment. The personalized power equipment may comprise multiple batteries and/or energy storage components. As such, the multiple fifth wheels 202 and corresponding equipment may be used to charge the energy storage components of the personalized power equipment while the personalized power equipment is in operation and/or in motion. In some instances, the OBCS 210 may comprise or be coupled to a controller configured to automatically detect a voltage of the energy storage components and/or motors of the electric powered transportation equipment when the OBCS 210 is coupled to the electric power transportation equipment, for example via a charge port of the personalized power equipment. In some instances, based on the detected voltage of the energy storage components and/or motors of the personalized powered equipment, the OBCS 210 can automatically adapt or adjust its output voltage to appropriately charge the energy storage components of the personalized power equipment. Similarly, in some embodiments, the controller may enable retraction and/or extension of one or more of the multiple fifth wheels 202 to enable the controller to vary the amount of power generated by the multiple fifth wheels 202. In some instances, the OBCS 210 may vary energy generated and/or output by the OBCS 210 based on demand or the personalized powered equipment. In some instances, the OBCS 210 may route power generated by the OBCS 210 based on demand, for example directly to motors powering the personalized powered equipment in certain conditions, motors and batteries/capacitors of the personalized powered equipment, and/or motors, batteries, and capacitors of the personalized powered equipment. In some instances, such control of the fifth wheels 202 may be based on an analysis of charge remaining in the energy storage components of the personalized powered equipment and/or current demand of operation of the personalized powered equipment.

As described with reference to other embodiments herein, the fifth wheel 202 may be coupled to a gearbox allowing one or more ratios of rotating components to be adapted to the movement of the personalized powered transportation equipment, enabling the OBCS 210 and/or an operator to mechanically control and/or adjust rates at which electricity is generated by generators coupled to the fifth wheel(s) 202. Additionally, the fifth wheel 202 may be integrated with a non-driven wheel of the personalized power equipment. As such, the non-driven wheels 106 can cause the generator 302 to rotate and create energy to charge the capacitor module 502 and/or the battery module 102 without requiring an additional wheel 202.

As described herein, the OBCS 210 may be interchangeable with various electric powered devices. For example, the OBCS 210 for a general BEV 100 may be interchangeable with those for farm equipment, within a specified operation range. This may allow a user to purchase a single OBCS 210 and use it for multiple electric powered devices. For example, a homeowner may purchase a single OBCS 210 even through the homeowner has two vehicles because the single OBCS 210 can be easily removed and integrated with both of the vehicles. Similarly, an airline may purchase a smaller number OBCS 210 than aircraft knowing that an OBCS 210 from one airplane can be moved to and integrated with a different aircraft as needed or on demand.

In the various equipment described above, the transportation equipment may comprise a passenger vehicle (or similar personal use vehicle) travels on a road. A driven mass, as used herein, for the passenger vehicle may comprise a wheel placed in contact with a surface of the road and rotate while the passenger vehicle is in motion. Similarly, the vehicle may comprise a commercial vehicle that travels on a road, and the driven mass may comprise a wheel placed and that rotates when in contact with the surface of the road and the commercial vehicle is in motion. Example commercial vehicles may include trucks, semi-trucks, tractor-trailers, semi-tractors, transport trucks, refrigerator trucks, flatbed trucks, tow-trucks, dump trucks and the like.

In embodiments where the vehicle comprises a rail vehicle that travels along a railway or corridor, the driven mass comprises a wheel placed and that rotates when in contact with a surface of the railway or corridor and the rail vehicle is in motion.

In some embodiments, the vehicle is a piece of farm equipment that travels on the ground. The driven mass may comprise a wheel placed in contact with a surface of the ground; when the piece of farm equipment is in motion and the wheel is in contact with the surface of the ground, the driven mass may rotate with the movement of the piece of farm equipment.

In some embodiments, the vehicle is an aircraft that travels through the air. In such embodiments, the driven mass comprises one or more of a rotor assembly or a wind turbine that rotates while the aircraft travels through the air. For example, such driven mass embodiments may be placed in various locations of the aircraft where airflow would be greatest and, thus, where energy generation would be greatest.

In some embodiments, the vehicle may comprise a piece of construction equipment that travels on the ground. The piece of construction equipment may comprise a driven mass that is a wheel placed in contact with a surface of the ground that rotates when the piece of construction equipment is in motion.

In some instances, the vehicle comprises a watercraft that travels in water. The driven mass of the watercraft may comprise a rotor assembly or a turbine that rotates while the watercraft travels through the water. In some instances, the rotor assembly or turbine rotates when in contact with the water or that rotates when open to the air. Such a driven mass may rotate in response to moving through either the water or the air and thus result in the generation of energy as described herein.

In some instances, the vehicle comprises a cycle that travels on the ground, and the driven mass of the vehicle comprises a wheel that rotates while placed and that rotates when in contact with a surface of the ground and the motorized cycle is in motion.

In some embodiments, the vehicle comprises a tram or cable car that travels along a cable. The driven mass of such a vehicle comprises a wheel that rotates while placed and that rotates when in contact with a surface of the cable and the tram or cable car is in motion.

In some instances, the OBCS 210 may be moved between vehicles and be configured to provide different output power requirements. In some embodiments, the OBCS 210 may comprise a hardware controller that helps control a variable output charging unit. The hardware controller may identify control signals to convey to the output charging unit based on the vehicle in which the OBCS 210 is installed based on the identified output power parameters for the vehicle in which the OBCS 210 is installed. Thus, the OBCS 210 may be moved between vehicles, for example between different passenger vehicles, commercial vehicles, and so forth. This may allow a single entity (for example, a family) purchase a single OBCS 210 and corresponding equipment described herein and swap it between vehicles owned by the family to reduce upfront costs but maintain the ability to improve all vehicles owned and/or operated by the family.

Details of Electronics

In some embodiments, the vehicle comprises various components used to control the generation, storage, and consumption of electricity by the vehicle. For example, the vehicle may comprise one or more energy storage management components and/or circuits. In some instances, the energy storage management circuit may comprise one or more inverters that can be used to generate electricity in a range of DC voltages. For example, an inverter, or a combination of multiple inverters, may be used to convert an AC voltage generated by the generator(s) for storage and/or consumption into DC voltage in a range of 48-480 V, or higher. In some instances, a pair of inverters can be used, in combination, to generate higher voltages as needed for the specific requirements of the vehicle. For example, where different electric vehicles operate at or with different voltages, different numbers of inverters can be utilized to help ensure interchangeability of components and/or systems between different vehicles and different types of vehicles.

In some instances, the electrical connections of the OBCS 210 with the electric vehicle may vary based on the type of electric vehicle to which the OBCS 210 is being integrated. For example, if the electric vehicle comprises a charging connector (for example, a connector capable of receiving a charge via Level 1 charger or a Level 2 charger), then the OBCS 210 may comprise a connector that can couple to the charging connector and provide energy to the electric vehicle via the charging connector. In other instances, the OBCS 210 may be hardwired to particular terminals in the electric vehicle.

In some instances, one or more components of the OBCS 210 can communicate with the BEV 100 via a CAN network, which enables communications between different components of the BEV 100. In some instances, the CAN network can identify when the OBCS 210 includes multiple generators 302 and similar components that allows for operation at different voltage levels and speeds. For example, the BEV 100 and the OBCS 210 may include a first generator 302 mechanically coupled to the fifth wheel 202 that is geared and/or sized to operate most efficiently at speeds less than 30 miles per hour. Similarly, a second generator 302 of the OBCS 210 mechanically coupled to the fifth wheel 202 is geared and/or sized to operate most efficiently at speeds greater than 30 miles per hour. The OBCS 210 and the BEV 100 may cause the first and second generators 302 to switch between operation based on the speed of the BEV 100. For example, a relay or similar controlled switchable element may cause only one of the first and second generators 302 to convey generated energy to one or more of the capacitor module 502, battery module 102, and the motor 104 (for example, via an inverter or drive unit). In some instances, the first and second generators may be simultaneously connected to one or more of the capacitor module 502, battery module 102, and the motor 104 (for example, via an inverter or drive unit) when the two generators 302 together are most efficient for charging the battery module 102 or capacitor module 502.

In such instances, the controller for the BEV 100 or the OBCS 210 may monitor the speed of the BEV 100 and efficiency levels of the various components of the OBCS 210 and switch between components accordingly. For example, the BEV 100 and the OBCS 210 can control whether the charging of the battery module 102 or the capacitor module 502 is performed at Level 3 or Level 2. In some instances, the controller of the OBCS 210 and/or the BEV 100 can monitor errors and adapt charging levels and parameters to reduce errors.

In some instances, the CAN network can be used to wake up one or more of the generators 302 at corresponding speeds of the BEV 100. For example, the OBCS 210 may generate necessary controls to turn on the first generator 302 at lower speeds (e.g., 0-30 miles per hour) and turn on the second generators 302 at higher speeds (e.g., 30-70 miles per hour) and both generators 302 at highest speeds (e.g., 70+ miles per hour). Alternatively, selection between generators 302 (and/or other components) may be based on a number of rotations of the fifth wheel 202 and/or rotations of the input shaft of the generators 302. Additionally, the OBCS 210 and the CAN network can be used to release energy in the generator 302, for example by disengaging the generator 302 from the fifth wheel 202 or disconnect the generators 302 from the load. Such a release of energy may occur automatically based on an interval, charge level in the generator 302, charge levels of the battery module 102 and/or the capacitor module 502, and the like.

In some instances, the capacitor module 502 comprises multiple capacitor modules in parallel or series dependent on at total voltage storage value desired. For example, if the generator 302 generates an output voltage of 350V, then the capacitor module 502 may comprise two capacitor modules 502 at approximately 180V. In some instances, the generators 302 may generate AC output voltages and feed into a AC/DC converter to convert generated AC voltage to DC for storage and/or consumption in one or more of the capacitor module 502, the battery module 102, and the motor 104 (e.g., via a drive or inverter). In some instances, the generators 302 may generate DC output voltages and not need any AC/DC converter.

Figure 15:
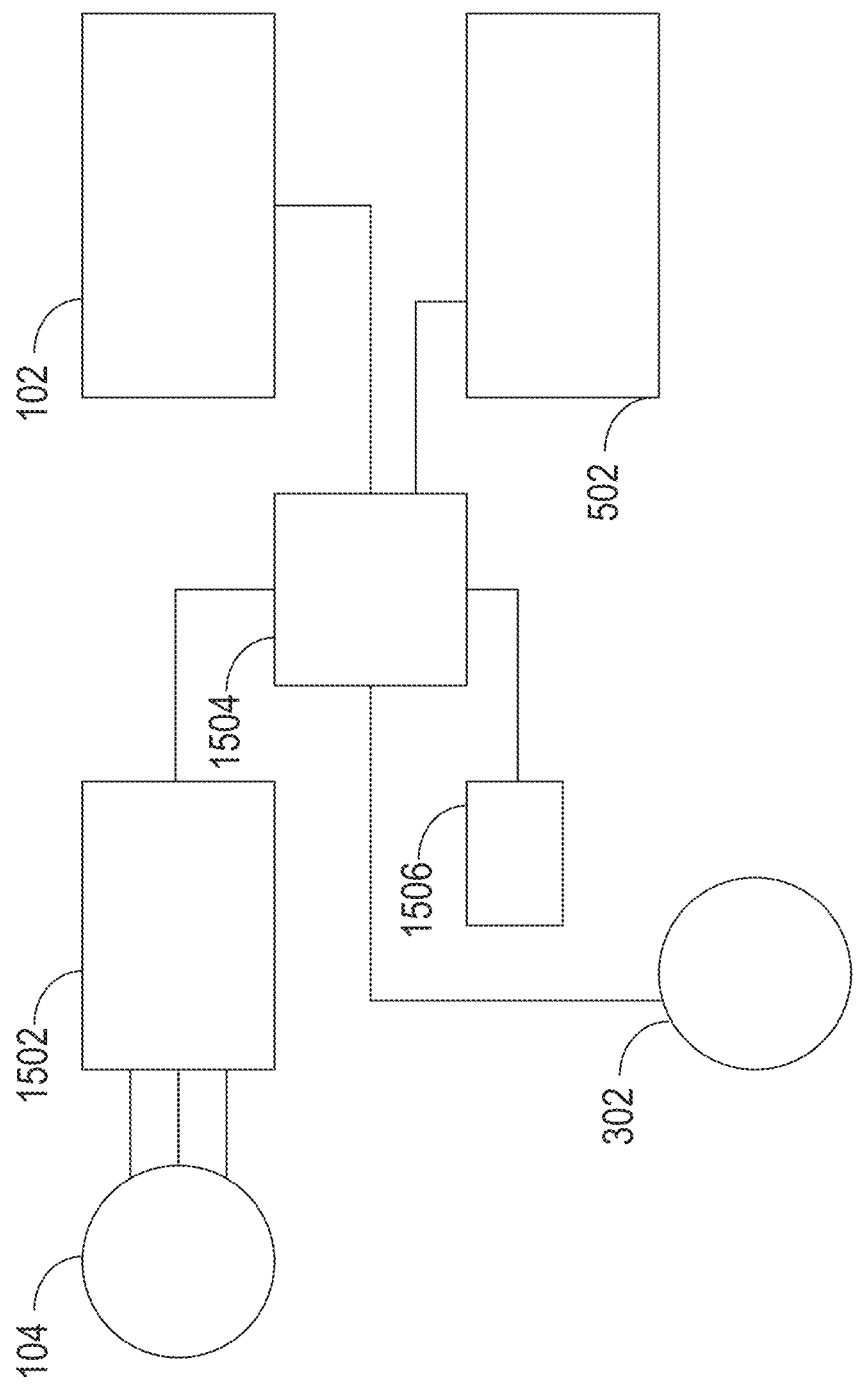
FIG. 15 shows an example simplified circuit diagram for controlling energy flow between a generator coupled to a fifth wheel and the motor driving the BEV.

FIG. 15 shows an example simplified circuit diagram 1500 for controlling energy flow between generator 302 coupled to a fifth wheel 202 and the motor 104 driving the BEV 100. The diagram 1500 includes the motor 104 electrically connected to a variable drive 1502 that controls the output of the motor 104, for example based on frequency (for example, for AC motors 104), speed (for AC and/or DC motors 104), and the like. The diagram 1500 may show the components that enable charging of the battery module 102 and/or the capacitor module 502 with energy generated by the generator 302 and discharging of the battery module 102 and/or the capacitor module 502 to power the variable drive 1502.

The variable drive 1502 may comprise an inverter and/or inverter/controller unit or similar component or combination of components that otherwise condition, limit, control, and/or change a power signal received from a power source (for example, one or more of the battery module 102 and the capacitor module 502). In some instances, the variable drive 1502 may receive an input (for example, from a controller, not shown in FIG. 15) that directs the variable drive 1502 to provide the motor 104 with a particular signal to control how the motor 104 runs. The variable drive 1502 may receive energy from one or more of the battery module 102 and the capacitor module 502 via a relay 1504. The relay 1504 may be controlled via the controller (not shown) and enable either or both of the battery module 102 and the capacitor module 502 to provide power to the variable drive 1502. Similarly, the relay 1504 may enable the battery module 102 and/or the capacitor module 502 to receive power generated by the generator 302. In some instances, the relay 1504 may comprise one or more components able to condition or otherwise adapt the power provided to the battery module 102 from the generator 302, to the capacitor module 502 from the generator 302, to the variable drive 1502 from the battery module 102, and/or to the variable drive 1502 from the capacitor module 502. In some instances, the relay 1504 may comprise one or more circuit protection components to protect any devices connected to the relay 1504 from experiencing damaging conditions through the relay 1504, for example a surge or short condition.

In some instances, the relay 1504, and other components of the diagram 1500, may be controlled with one or more controllers, for example a remote controller 1506. The remote controller 1506 may comprise a control unit or interface accessible to an operator of the BEV 100. Alternatively, the remote controller 1506 may comprise a controller component for the BEV 100 (for example, an engine control module (ECM) or powertrain control module (PCM) in the BEV 100). The remote controller 1506 may control flow through the relay 1506 based on various conditions for the BEV 100. For example, the remote controller 1506 may monitor energy demand by the motor 104 and control the relay 1504 to enable one or both of the battery module 102 and the capacitor module 502 to convey energy stored therein to the motor 104 via the variable drive 1502 based on the monitored energy demand of the motor 104 and variable drive 1502. In some instances, the remote controller 1506 may control flow through the relay 1504 based on a voltage of the battery module 102. For example, as the voltage of the battery module 102 fluctuates, energy from the generator 302 may be conveyed to the battery module 102 to maintain the voltage of the battery module 102 at a desired threshold or within a desired range. Similarly, the remote controller 1506 may control flow through the relay 1504 to charge the battery module 102 via the capacitor module 502 based on a desire to maintain the voltage of the battery module 102 at the desired threshold or within the desired range. In some instances, the remote controller 1506 may control flow through the relay 1506 to charge the capacitor module 502 with the generator 302 based on a desire to maintain a voltage of the capacitor module 502 at a desired threshold voltage or within a desired voltage range.

In some embodiments, the relay 1504 may be configured to limit flow of energy between components. For example, the relay 1504 may limit the capacitor module 502 to providing energy to the battery module 102 such that the capacitor module 502 is used to recharge the battery module 102 as the battery module 102 voltage is consumed by the motor 104. The relay 1504 may receive control signals from the remote controller 1506, which may be an automated controller or receive command inputs from a user or operator of the electric vehicle. For example, the user can cause the relay 1504 to enable charge from the capacitor module 502 to feed to one of the motor 104 and the battery module 102 and/or cause the relay 1504 to feed a charge from the battery module 102 to the motor 104 or the capacitor module 502.

In some instances, the filtering or conditioning circuit (for example, the relay 1504) is coupled to the generator 302. The filtering or conditioning circuit may receive energy from the generator 302 and a control signal from the remote controller 1506, generate a charge output based on the energy and the control signal, and convey the charge output to the electric vehicle. In some embodiments, the remote controller 1506 may monitor parameters for the electric vehicle (for example, voltage and/or current settings) and use these monitored parameters to control operation of the OBCS 210. For example, the remote controller 1506 may cause the OBCS 210 to operate to generate energy at specific parameters for the electric vehicle in which the OBCS 210 is installed so that the OBCS 210 can provide power to the electric vehicle. In some instances, the filtering or conditioning circuit comprises a charging circuit (for example, the charger 403). In some instances, the relay 1504 may create open circuits between components to prevent energy flow and closed circuits to enable energy flow, for example between the generator 302 and a charging port of the BEV 100. Additionally, a second filtering circuit may be disposed between the generator 302 and the charger 403 that filters the output from the generator 302 via one or more of filtering, cleaning, matching, and converting the electrical output to reduce risk of damage to any components of the electric vehicle.

The diagram 1500 may be utilized with any features described herein, including the retractable fifth wheel 202. In some instances, the OBCS 210, via one or more components described herein, may provide power to the motor 104, the battery module 102, and/or the capacitor module 502 within an approximate range of between 24 volts and 800 volts DC, inclusive.

Figure 16:
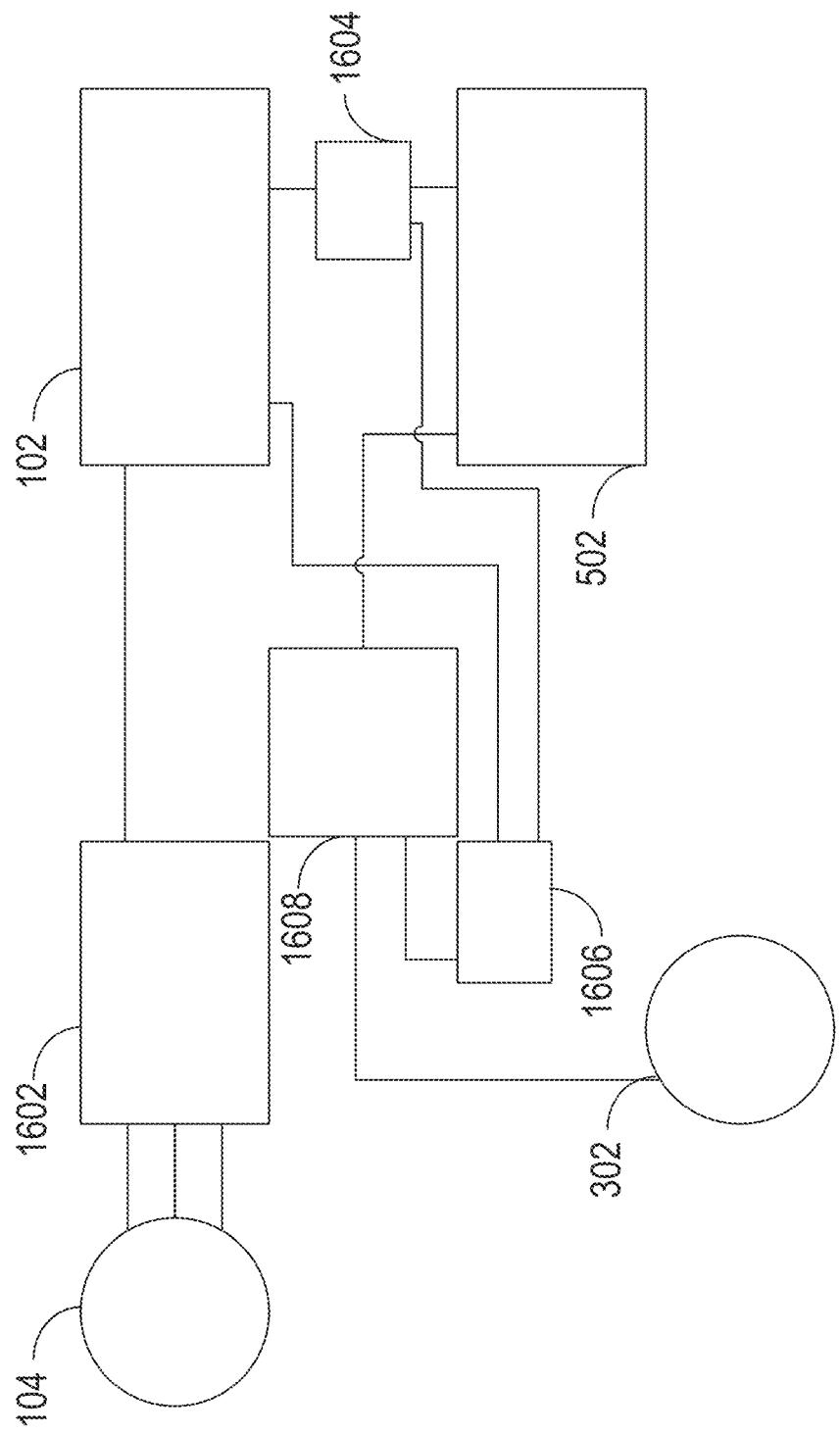
FIG. 16 shows an example simplified circuit diagram for controlling energy flow between a generator coupled to a fifth wheel (not shown) and the motor driving the BEV.

FIG. 16 shows an example simplified circuit diagram 1600 for controlling energy flow between a generator 302 coupled to a fifth wheel 202 (not shown) and the motor 104 driving the BEV 100. The diagram 1600 includes the motor 104 electrically connected to a variable drive 1602 that controls the output of the motor 104, for example based on frequency (for example, for AC motors 104), speed (for AC and/or DC motors 104), and the like. The diagram 1600 may show the components that enable charging of the battery module 102 and/or the capacitor module 502 with energy generated by the generator 302 and discharging of the battery module 102 and/or the capacitor module 502 to power the variable drive 1602.

The variable drive 1602 may comprise an inverter and/or inverter/controller unit or similar component or combination of components that otherwise condition, limit, control, and/or change a power signal received from a power source (for example, one or more of the battery module 102 and the capacitor module 502). In some instances, the variable drive 1602 may receive an input (for example, from a controller) that directs the variable drive 1602 to provide the motor 104 with a particular signal to control how the motor 104 runs. The variable drive 1602 may receive energy from the battery module 102, in some instances via a relay 1604. Alternatively, or additionally, relay 1604 may be controlled via a controller and enable charging of the battery module 102 by the capacitor module 502 as the battery module 102 discharges from providing power to the inverter 1602. Similarly, the relay 1604 may enable the capacitor module 502 to receive power generated by the generator 302 (for example, via a filtering or conditioning circuit 1608). In some instances, the relay 1604 may comprise one or more components able to condition or otherwise adapt the power conveyed between other components shown in FIG. 16, for example from the capacitor module 502 to the battery module 102, from the battery module 102 to the variable drive 1602, and/or from the filtering circuit 1608 to the capacitor module 1602). In some instances, the relay 1604 may comprise one or more circuit protection components to protect any devices connected to the relay 1604 from experiencing damaging conditions through the relay 1604, for example a surge or short condition. Similarly, the filtering or conditioning circuit 1608 may comprise one or more circuit protection components to protect any devices connected to the filtering or conditioning circuit 1608 from experiencing damaging conditions from energy conveyed through the filtering or conditioning circuit 1608, for example a surge or short condition.

In some instances, the relay 1604, and other components of the diagram 1600, may be controlled with one or more controllers, for example a remote controller 1606. The remote controller 1606 may comprise a control unit or interface accessible to an operator of the BEV 100. Alternatively, the remote controller 1606 may comprise a controller component for the BEV 100 (for example, an engine control module (ECM) or powertrain control module (PCM) in the BEV 100). The remote controller 1606 may control flow through the relay 1604 based on various conditions for the BEV 100. For example, the remote controller 1606 may monitor energy demand by the motor 104 and control the relay 1604 to enable the battery module 102 to convey energy stored therein to the motor 104 via the variable drive 1602 based on the monitored energy demand of the motor 104 and variable drive 1602. Similarly, the remote controller 1606 may monitor energy demand by the battery module 102 and control the relay 1604 to enable the capacitor module 502 to convey energy stored therein to the battery module 102 when the battery module 102 voltage drops below a specified voltage threshold. In some instances, the remote controller 1606 may control flow through the relay 1604 based on information received from one or more components shown in FIG. 16 and in the BEV 100. For example, as the voltage of the battery module 102 fluctuates, energy from the capacitor module 502 is used to recharge the battery module 102 to maintain the voltage of the battery module 102 at a desired threshold or within a desired range.

Similarly, the remote controller 1606 may control flow through the relay 1604 to charge the battery module 102 via the capacitor module 502 based on a desire to maintain the voltage of the battery module 102 at the desired threshold or within the desired range. In some instances, the remote controller 1606 may control flow through the relay 1604 to charge the capacitor module 502 with the generator 302 based on a desire to maintain a voltage of the capacitor module 502 at a desired threshold voltage or within a desired voltage range.

In some embodiments, the relay 1604 may be configured to limit flow of energy between components. For example, the relay 1604 may limit the capacitor module 502 to providing energy to the battery module 102 such that the capacitor module 502 is used to recharge the battery module 102 as the battery module 102 voltage is consumed by the motor 104. The relay 1604 may receive control signals from the remote controller 1606, which may be an automated controller or receive command inputs from a user or operator of the electric vehicle. For example, the user can cause the relay 1604 to enable charge from the capacitor module 502 to feed to one of the motor 104 and the battery module 102 and/or cause the relay 1604 to feed a charge from the battery module 102 to the motor 104 or the capacitor module 502.

Example Data

A 50-mile test was performed to determine power (e.g., electricity, voltage, charge output) generated by driving a battery electric vehicle (BMW i3 electric vehicle with 33 kw/h, 400 volt capacity) configured with embodiments of the power generation technology described herein (e.g., embodiments including the features of claim 1 or 21 herein). The data in the table below shows performance results of the power generation technology from the 50-mile test. As shown, the power-generation technology not only recovered the voltage used to travel the 50 miles but also generated or produced net positive voltage beyond the recovery voltage.

| 50 Mile Test Results | |
|---|---|
| Standard BMW i3 with 33 kw/h, 400 Volt Capacity Without Power Generation Technology | Model 1 |
| Starting Voltage | 360 volts |
| Distance Traveled | 50 miles |
| Volts used to travel 50 miles | −50 volts |
| Remaining battery field volts | 310 volts |
| When the battery field drops below 320-340 volts, the standard BMW without power-generation technology stops and must be charged | |
| With Power Generation Technology | |
| Starting Voltage | 360 volts |
| Distance Traveled | 50 miles |
| Volts used to travel 50 miles (based on BMW model) | −50.0 volts |
| Voltage recovered that was used in Model 1 (BMW) | +50.0 volts |
| Additional Voltage Gained beyond recovery | +10.3 volts |
| Total Voltage Gained over Model 1 (BMW) | +60.3 volts |
| Remaining battery field volts | 370.3 volts |

Additional Embodiments

As described herein, the generators 302a and 302b may be configured to generate a voltage of any amount, type, and so forth, for example, as specified by an operating voltage of the battery 102 and/or a bus voltage of the BEV 100/500. As such, any of the deep cycle battery 504 and the capacitor modules 502 may also have operating voltages corresponding to that of the battery 102. In some embodiments, the deep cycle battery 504 and/or the capacitor modules 502 have different operating voltages and are coupled to the battery 102 via one or more converter devices, for example the DC-to-DC converter 506. As such, the OBCS 210 and corresponding components described herein may operate at various voltages for the BEV 100/500.

As used herein, "system," "instrument," "apparatus," and "device" generally encompass both the hardware (for example, mechanical and electronic) and, in some implementations, associated software (for example, specialized computer programs for graphics control) components.

Further, the data processing and interactive and dynamic user interfaces described herein are enabled by innovations in efficient data processing and interactions between the user interfaces and underlying systems and components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein a "data storage system" may be embodied in computing system that utilizes hard disk drives, solid state memories and/or any other type of non-transitory computer-readable storage medium accessible to or by a device such as an access device, server, or other computing device described. A data storage system may also or alternatively be distributed or partitioned across multiple local and/or remote storage devices as is known in the art without departing from the scope of the present disclosure. In yet other embodiments, a data storage system may include or be embodied in a data storage web service.

As used herein, the terms "determine" or "determining" encompass a wide variety of actions. For example, "determining" may include calculating, computing, processing, deriving, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (for example, send or receive data) in accordance with one or more of the aspects described.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A system for providing power to a vehicle, the system comprising:
   a driven mass configured to rotate in response to a kinetic energy of the vehicle, the driven mass coupled to a shaft such that rotation of the driven mass causes the shaft to rotate;
   a generator configured to generate an electrical output at a generator output terminal based on a mechanical input, the mechanical input mechanically coupled to the shaft such that rotation of the shaft causes the mechanical input to rotate; and
   a hypercapacitor comprising:
      at least one ultracapacitor electrically coupled to the generator output terminal via one or more inbound diodes, wherein the one or more inbound diodes are biased toward the at least one ultracapacitor and wherein the at least one ultracapacitor is configured to:
         receive, via the one or more inbound diodes, inbound energy from the generator; and
         store the inbound energy as a first energy in an electric field of the at least one ultracapacitor; and
      an energy retainer electrically coupled to the at least one ultracapacitor via one or more outbound diodes, wherein the one or more outbound diodes are biased toward the energy retainer and wherein the energy retainer is configured to:
         receive, via the one or more outbound diodes, outbound energy from the at least one ultracapacitor in response to a voltage level of the energy retainer dropping below a threshold value;
         store said outbound energy as a second energy of the energy retainer; and
         convey the second energy to a traction motor of the vehicle.

2. The system of claim 1, wherein the hypercapacitor is further configured to be electrically couplable to a utility grid via a standard 110 volt or 220 volt outlet, and wherein the at least one ultracapacitor of the hypercapacitor is further configured to:
   be electrically couplable to the standard 110 volt or 220 volt outlet of the utility grid;

receive, via the one or more inbound diodes, inbound energy from the standard 110 volt or 220 volt outlet; and store the inbound energy as a first energy in an electric field of at least one ultracapacitor; and wherein the energy retainer is further configured to not receive outbound energy from the at least one ultracapacitor in response to a voltage level of the energy retainer reaching a high threshold voltage value.

3. The system of claim 1, wherein the at least one ultracapacitor comprises multiple ultracapacitors.

4. The system of claim 1, wherein the energy retainer comprises one or more batteries.

5. The system of claim 1, wherein the energy retainer comprises one or more capacitors.

6. The system of claim 1, wherein the energy retainer does not comprise lithium ion batteries.

7. The system of claim 1, wherein the electrical coupling between the energy retainer and the at least one ultracapacitor stabilizes the voltage of the at least one ultracapacitor to prevent voltage loss of the first energy of the at least one ultracapacitor due to self-discharge.

8. The system of claim 1, wherein the energy retainer is further configured to convey all of the second energy to the traction motor of the vehicle.

9. The system of claim 1, wherein the vehicle comprises a commercial vehicle.

10. The system of claim 1, wherein the vehicle comprises farm or construction equipment.

11. A method for providing energy to a vehicle, the method comprising:

rotating a driven mass in response to a kinetic energy of the vehicle, wherein the driven mass is coupled to a shaft such that rotation of the driven mass causes the shaft to rotate;

generating an electrical output at a generator based on a rotation of the shaft;

conveying the electrical output from the generator to at least one ultracapacitor electrically coupled to the generator via one or more inbound diodes biased toward the at least one ultracapacitor;

storing the electrical output from the generator as a first energy in an electric field of the at least one ultracapacitor;

conveying at least a portion of the first energy from the at least one ultracapacitor to an energy retainer electrically coupled to the at least one ultracapacitor via one or more outbound diodes biased toward the energy retainer based at least in part on a voltage level of the energy retainer dropping below a threshold;

storing the at least the portion of the first energy from the at least one ultracapacitor as a second energy of the energy retainer; and conveying the second energy from the energy retainer to a traction motor of the vehicle.

12. The method of claim 11, further comprising:

electrically coupling the at least one ultracapacitor to a utility grid via a standard 110 volt or 220 volt outlet;

receiving, via the one or more inbound diodes, inbound energy at the at least one ultracapacitor from the standard 110 volt or 220 volt outlet; and storing the inbound energy as a second energy in an electric field of at least one ultracapacitor.

13. The method of claim 11, wherein the at least one ultracapacitor comprises multiple ultracapacitors.

14. The method of claim 11, further comprising, by the electrical coupling between the energy retainer and the at least one ultracapacitor, stabilizing the voltage of the at least one ultracapacitor to prevent voltage loss of the first energy of the at least one ultracapacitor due to self-discharge.

15. The method of claim 11, further comprising conveying all of the second energy from the energy retainer to the traction motor of the vehicle.

16. The method of claim 11, wherein the energy retainer comprises one or more batteries.

17. The method of claim 11, wherein the energy retainer comprises one or more capacitors.

18. The method of claim 11, wherein the energy retainer does not comprise lithium ion batteries.

19. The method of claim 11, wherein the vehicle comprises a commercial vehicle.

20. The method of claim 11, wherein the vehicle comprises farm or construction equipment.

* * * * *